US012780277B2

(12) United States Patent
Bilodeau et al.

(10) Patent No.: US 12,780,277 B2
(45) **Date of Patent: *Nov. 3, 2026**

(54) RAILCAR ACOUSTIC MONITORING SYSTEM AND METHOD OF USE

(71) Applicant: VOESTALPINE SIGNALING USA INC., Loveland, CO (US)

(72) Inventors: James R. Bilodeau, Loveland, CO (US); John D. Ritchey, Loveland, CO (US); Eric C. Sprengle, Loveland, CO (US); Jody Lutz, Loveland, CO (US)

(73) Assignee: VOESTALPINE SIGNALING USA INC.

( * ) Notice: Subject to any disclaimer, the term of this patent is extended or adjusted under 35 U.S.C. 154(b) by 22 days.

This patent is subject to a terminal disclaimer.

(21) Appl. No.: 18/961,958

(22) Filed: Nov. 27, 2024

(65) Prior Publication Data

US 2025/0171063 A1 May 29, 2025

Related U.S. Application Data

(63) Continuation of application No. 18/380,367, filed on Oct. 16, 2023, now Pat. No. 12,168,468, which is a (Continued)

(51) Int. Cl.
*B61L 27/53* (2022.01)
*B61K 9/08* (2006.01)

(Continued)

(52) U.S. Cl.
CPC ................ *B61L 27/53* (2022.01); *B61K 9/08* (2013.01); *B61L 1/06* (2013.01); *G01B 17/04* (2013.01); *H04R 29/005* (2013.01)

(58) Field of Classification Search
CPC .. B61L 27/53; B61L 1/06; B61K 9/08; G01B 17/04; H04R 29/005

(Continued)

(56) References Cited

U.S. PATENT DOCUMENTS 4,781,060 A * 11/1988 Berndt .................... B61K 9/12 73/146
4,843,885 A * 7/1989 Bambara ................ G01N 29/14 73/660

(Continued)

*Primary Examiner* — Luis A Martinez Borrero
(74) *Attorney, Agent, or Firm* — Polsinelli PC

(57) ABSTRACT

A microphone assembly including an outer housing, an inner housing, a printed circuit board (PCB) and a cord. The outer housing includes an outer surface, an inner surface opposite the outer surface and defining an opening there through, and a plurality of attachment structures protruding from the inner surface thereof. The inner housing includes an outer surface, an opening, and a plurality of attachment structures protruding from the outer surface thereof. The PCB includes at least one micro-electromechanical systems (MEMS) microphone including an acoustic port. The PCB is coupled to the inner housing such that the acoustic port of the at least one MEMS microphone is positioned within the opening. The cord interconnects the attachment structures of the outer and inner housings, respectively, together.

22 Claims, 43 Drawing Sheets
(26 of 43 Drawing Sheet(s) Filed in Color)

Related U.S. Application Data continuation of application No. 17/069,999, filed on Oct. 14, 2020, now Pat. No. 11,787,454, which is a continuation of application No. 16/555,650, filed on Aug. 29, 2019, now Pat. No. 10,864,930.

(60) Provisional application No. 62/725,076, filed on Aug. 30, 2018.

(51) Int. Cl.
*B61L 1/06* (2006.01)
*G01B 17/04* (2006.01)
*H04R 29/00* (2006.01)

(58) Field of Classification Search
USPC ..................................................... 73/778
See application file for complete search history.

(56) References Cited

U.S. PATENT DOCUMENTS

| | | | | |
|---|---|---|---|---|
| 5,265,831 | A * | 11/1993 | Muller | B61L 29/224 246/270 R |
| 5,713,540 | A * | 2/1998 | Gerszberg | B61L 1/06 73/645 |
| 5,804,731 | A * | 9/1998 | Jaeggi | G01N 29/28 73/620 |
| 5,822,450 | A * | 10/1998 | Arakawa | G06T 7/0006 382/152 |
| 6,216,985 | B1 * | 4/2001 | Stephens | B61K 9/10 246/473 R |
| 7,213,789 | B1 * | 5/2007 | Matzan | G01M 17/10 246/169 R |
| 7,392,117 | B1 * | 6/2008 | Bilodeau | G01K 1/022 246/246 |
| 8,326,582 | B2 * | 12/2012 | Mian | G01N 29/4463 702/56 |
| 8,577,546 | B2 * | 11/2013 | Gunther | G01M 17/10 701/33.6 |
| 9,310,340 | B2 * | 4/2016 | Mian | G01N 29/12 |
| 9,651,649 | B1 * | 5/2017 | Salloum | G01S 3/8083 |
| 10,167,003 | B1 * | 1/2019 | Bilodeau | B61L 3/16 |
| 10,435,052 | B2 * | 10/2019 | Mesher | G01B 11/2522 |
| 10,543,861 | B1 * | 1/2020 | Bartek | G01M 5/0058 |
| 10,582,187 | B2 * | 3/2020 | Mesher | B61K 9/08 |
| 10,805,702 | B2 * | 10/2020 | Loeppert | H04R 19/04 |
| 10,864,930 | B2 * | 12/2020 | Bilodeau | B61L 1/06 |
| 11,787,454 | B2 * | 10/2023 | Bilodeau | B61K 9/08 701/19 |
| 12,168,468 | B2 * | 12/2024 | Bilodeau | B61K 9/08 |
| 2001/0015104 | A1 * | 8/2001 | Wooh | G01N 29/40 73/598 |
| 2004/0003662 | A1 * | 1/2004 | Kenderian | G01N 29/12 73/579 |
| 2004/0105608 | A1 * | 6/2004 | Sloman | B61K 9/10 385/12 |
| 2006/0201253 | A1 * | 9/2006 | Gonzales | G01N 29/11 73/643 |
| 2007/0163352 | A1 * | 7/2007 | Nielsen | G01N 29/2418 73/668 |
| 2009/0001226 | A1 * | 1/2009 | Haygood | G01H 1/06 701/19 |
| 2010/0161255 | A1 * | 6/2010 | Mian | G01N 29/4463 702/56 |
| 2012/0199700 | A1 * | 8/2012 | Li | B61L 23/045 246/120 |
| 2012/0217351 | A1 * | 8/2012 | Chadwick | B61L 1/06 246/182 R |
| 2012/0308045 | A1 * | 12/2012 | Minoo | H04R 1/342 381/111 |
| 2013/0047729 | A1 * | 2/2013 | Wigh | G01N 29/069 73/636 |
| 2013/0151203 | A1 * | 6/2013 | McEwen-King | G06F 17/00 702/189 |
| 2013/0248659 | A1 * | 9/2013 | Lingvall | B61L 25/04 246/126 |
| 2013/0312524 | A1 * | 11/2013 | Mian | G01N 29/4427 73/579 |
| 2014/0241548 | A1 * | 8/2014 | Kim | H04R 3/005 381/91 |
| 2014/0312179 | A1 * | 10/2014 | Chen | B61L 15/0027 246/169 D |
| 2015/0198502 | A1 * | 7/2015 | Phares | G01M 5/0008 702/42 |
| 2016/0073208 | A1 * | 3/2016 | Ancona | H04S 7/301 381/58 |
| 2016/0216363 | A1 * | 7/2016 | Martin | G01S 3/801 |
| 2016/0320351 | A1 | 11/2016 | Mian et al. | |
| 2016/0370255 | A1 * | 12/2016 | Zahdeh | G01M 15/12 |
| 2017/0106887 | A1 * | 4/2017 | Mian | B61L 3/02 |
| 2017/0169575 | A1 * | 6/2017 | Pérez Acal | G01B 11/16 |
| 2018/0041843 | A1 * | 2/2018 | Sibbald | H04R 5/033 |
| 2018/0091881 | A1 * | 3/2018 | Evans | H04R 1/08 |
| 2018/0222498 | A1 * | 8/2018 | Kelley | G01H 9/004 |
| 2018/0279056 | A1 * | 9/2018 | Venalainen | H04R 19/005 |
| 2018/0354534 | A1 * | 12/2018 | Cole | B61L 25/025 |
| 2019/0154791 | A1 * | 5/2019 | Jowett | G01S 5/22 |
| 2019/0225250 | A1 * | 7/2019 | Esprey | B61L 1/06 |
| 2019/0232988 | A1 * | 8/2019 | Lang | B61L 25/025 |
| 2019/0391049 | A1 * | 12/2019 | Jones | B61L 15/0081 |
| 2020/0070862 | A1 * | 3/2020 | Bilodeau | B61L 1/06 |
| 2020/0190971 | A1 * | 6/2020 | Thiruvenkatanathan | G01V 1/288 |
| 2021/0041232 | A1 * | 2/2021 | Bilodeau | B61K 9/08 |
| 2022/0017129 | A1 * | 1/2022 | Mian | G06N 20/00 |
| 2024/0109571 | A1 * | 4/2024 | Bilodeau | B61K 9/08 |

* cited by examiner

PL(250, :, :, 4)

RAILCAR ACOUSTIC MONITORING SYSTEM AND METHOD OF USE

CROSS-REFERENCE TO RELATED APPLICATION

This application is a continuation of U.S. application Ser. No. 18/380,367, filed Oct. 16, 2023, which application is a continuation of U.S. application Ser. No. 17/069,999, filed Oct. 14, 2020, now U.S. Pat. No. 11,787,454, which application is a continuation of U.S. application Ser. No. 16/555,650, filed Aug. 29, 2019, now U.S. Pat. No. 10,864,930, which application claims the benefit of U.S. Provisional Application No. 62/725,076, filed Aug. 30, 2018. Each of the above-referenced applications is hereby incorporated by reference in its entirety into the present application.

TECHNICAL FIELD

Aspects of the present disclosure involve an acoustic monitoring system, and, more particularly, an acoustic monitoring system for railcars and locomotives.

BACKGROUND

Wheelsets of a railcar or locomotive (collectively referred to as "railcar" and "railcars"), including the wheels, axles, and bearings, are subjected to extreme loads, which can lead to fatigue failure, and fracture, among other modes of failure. Detecting failure in railcar wheelsets is critical in the railroad industry as a seized bearing or fractured axle can potentially cause serious safety issues such as fire, and derailment of the train, as well as the associated bodily risk to the operators and passengers of the train. In addition to the safety concerns, service delays can cause massive costs to the train operator because of delayed arrival times and repairs. A stuck train obviously affects the travel of other trains on the rail, which may be unable to be rerouted around the stuck train.

Rail monitoring systems have been developed to detect degradation of components of the wheelsets of railcars prior to a complete failure (e.g., seized bearing, axle fracture). Conventionally, these systems are large, cumbersome, expensive, and lack the precision capable to accurately locate and identify the points of degradation and failure. With these thoughts in mind, among others, aspects of the railcar acoustic monitoring system and method of use disclosed herein was conceived.

BRIEF SUMMARY

Aspects of the present disclosure may involve a computer-implemented method for identifying a defect of a passing train via acoustic monitoring. The passing train may include wheels and bearings. The train may travel on first and second rails of a track. The method may include the steps of receiving data from the passing train within a zone of observance using a plurality of microphone assemblies of an acoustic monitoring system that are positioned around a section of the track. The plurality of microphone assemblies may be in communication with at least one data acquisition module of the acoustic monitoring system. The method may further include processing the data to determine pressure levels received by each of the plurality of microphone assemblies. The method may further include computing a theoretical pressure level for each of the plurality of microphone assemblies at a plurality of points within a three-dimensional coordinate space representing at least part of the zone of observance, the three-dimensional coordinate space including coordinate locations for each of the plurality of microphone assemblies. The method may further include determining one or more locations within the three-dimensional coordinate space where the theoretical pressure levels represent actual pressure levels. The method may further include isolating acoustic signatures of the noise source in the one or more locations, and determining a type of defect based on the acoustic signatures.

Aspects of the present disclosure may involve a computer-implemented method for identifying a defect of a passing train via acoustic monitoring. The passing train may include wheels and bearings, and the train may be traveling on first and second rails of a track. The method may include the steps of: receiving data from the passing train within a zone of observance using an array of microphone assemblies of an acoustic monitoring system that are positioned around a section of the track. The array of microphone assemblies may be in communication with at least one data acquisition module of the acoustic monitoring system. The method may further include processing the data to determine pressure levels received by each of the array of microphone assemblies. The method may further include calculating a theoretical pressure level for a plurality of points within a three-dimensional space for each microphone of the array of microphone assemblies. The three-dimensional coordinate space may be defined at least partially by the zone of observance. The array of microphone assemblies may be defined in the three-dimensional coordinate space. For each of the plurality of points the theoretical pressure levels may be calculated assuming its position within the three-dimensional coordinate space is an origin point of the pressure levels received by each of the array of microphone assemblies. The method may further include determining one or more locations within the three-dimensional coordinate space that represents an origin of a noise source indicating the defect. The method may further include isolating acoustic signatures of the noise source in the one or more locations. And the method may further include determining a type of defect based on the acoustic signatures.

In certain instances, determining the one or more locations within the three-dimensional coordinate space that represents the origin of the noise source may include determining which of the plurality of points within the three-dimensional space exhibit an inverse correlation between linear distance to each of the array of microphone assemblies and the pressure levels received by each of the array of microphone assemblies.

In certain instances, isolating acoustic signatures of the noise source in the one or more locations may include extracting vectors corresponding to locations of the wheels and bearings of the train.

In certain instances, determining the type of defect based on the acoustic signatures may include comparing the acoustic signatures to a database of acoustic signatures having known defects.

In certain instances, determining the type of defect based on the acoustic signatures may include fitting mathematical models of failure modes to the acoustic signatures.

In certain instances, the mathematical models include bearing and wheel failures.

In certain instances, the method may further include removing noise unassociated with the noise source indicating the defect.

In certain instances, the data may include acoustic wave information.

In certain instances, the array of microphone assemblies may include a first, second, third, fourth, fifth, sixth, seventh, and eighth microphone assembly, and In certain instances, the data may include first, second, third, fourth, fifth, sixth, seventh, and eighth data received by the respective first, second, third, fourth, fifth, sixth, seventh, and eighth microphone assembly.

In certain instances, the array of microphone assemblies includes a first plurality of microphone assemblies positioned in between the first and second rails and a second plurality of microphone assemblies positioned outside the first and second rails.

In certain instances, processing the data may include enveloping the data.

Aspects of the present disclosure may involve a computer-implemented method for identifying a defect of a passing train via acoustic monitoring. The passing train may include wheels and bearings. The train may travel on first and second rails of a track. The method may include the steps of: receiving data from the passing train within a zone of observance using a plurality of microphone assemblies of an acoustic monitoring system that are positioned around a section of the track. The plurality of microphone assemblies may be in communication with at least one data acquisition module of the acoustic monitoring system. The method may further include processing the data to determine pressure levels received by each of the plurality of microphone assemblies. The method may further include computing a four-dimensional pressure array by computing a theoretical pressure level for each of the plurality of microphone assemblies at a plurality of points within a three-dimensional coordinate space. The plurality of microphone assemblies may have defined locations within the three-dimensional coordinate space and relative to the plurality of points. The method may further include determining one or more locations within the three-dimensional coordinate space that represents an origin of a noise source indicating the defect. The method may further include isolating acoustic signatures of the noise source in the one or more locations. And the method may further include determining a type of defect based on the acoustic signatures.

In certain instances, for each of the plurality of points, the theoretical pressure levels is calculated assuming its position within the three-dimensional coordinate space is an origin point of the pressure levels received by each of the array of microphone assemblies.

In certain instances, isolating acoustic signatures of the noise source in the one or more locations may include extracting vectors corresponding to locations of the wheels and bearings of the train.

In certain instances, determining the type of defect based on the acoustic signatures may include comparing the acoustic signatures to a database of acoustic signatures having known defects.

In certain instances, determining the one or more locations within the three-dimensional coordinate space that represents an origin of a noise source indicating the defect may include the steps of: defining, for each of the plurality of points within the three-dimensional coordinate space, a first vector based on distances between each of the plurality of microphone assemblies and each of the plurality of points. The steps may also include defining, for each of the plurality of points within the three-dimensional coordinate space, a second vector based on the theoretical pressure value computed at each of the plurality of points for each of the plurality of microphone assemblies. The steps may also include computing a correlation coefficient, for each of the plurality of points, between the first vector and the second vector. The steps may also include summing the correlation coefficients along an axis within the three-dimensional coordinate space. The steps may also include identifying the one or more locations within the three-dimensional coordinate space with the lowest values of correlation.

Aspects of the present disclosure may involve a microphone assembly that may include an outer housing, an inner housing a PCB, and a cord. The outer housing may include an outer surface, an inner surface opposite the outer surface and defining an opening there through, and a plurality of attachment structures protruding from the inner surface thereof. The inner housing may include an outer surface, an opening, and a plurality of attachment structures protruding from the outer surface thereof. The printed circuit board (PCB) may include at least one micro-electromechanical systems (MEMS) microphone may include an acoustic port, the PCB coupled to the inner housing such that the acoustic port of the at least one MEMS microphone is positioned within the opening. And the cord may interconnect the attachment structures of the outer and inner housings, respectively, together.

In certain instances, the at least one MEMS microphone may include a first and a second MEMS microphone.

In certain instances, the microphone assembly may further include a water resistant membrane positioned over the acoustic port of the at least one MEMS microphone.

In certain instances, the microphone assembly may further include a microphone windscreen positioned over the acoustic port of the at least one MEMS microphone.

In certain instances, the microphone assembly may further include a screen positioned over the microphone windscreen, and a retention ring secured to the outer housing and supporting the screen in position over the microphone windscreen.

In certain instances, the microphone assembly may further include a heat ring attached to the retention ring, the heat ring configured to prevent freezing near the PCB.

In certain instances, the cord interweaves through apertures of the attachment structures of the inner and outer housing, respectively.

In certain instances, the cord is an elastic cord.

In certain instances, the microphone assembly may further include a speaker configured to emit a known waveform so as to test the functionality of the at least one MEMS microphone.

Aspects of the present disclosure may involve a railcar acoustic monitoring system for determining defects of a passing train traveling on first and second rails of a railroad track. The first and second rails may be supported on a plurality of railroad ties may include first and second railroad ties. The railcar acoustic monitoring system may include a first trackside frame assembly that may include a first outer frame assembly, a second outer frame assembly, and a first inner frame assembly. The first outer frame assembly may include a first frame member configured to couple to a first end of the first railroad tie via a first bracket assembly, and a first microphone assembly coupled to the first frame member such that the first microphone assembly is positioned on a first outer side of the first rail of the railroad track. The first microphone assembly may be oriented to receive acoustic signals associated with the passing train. The second outer frame assembly may include a second frame member configured to couple to a second end of a second railroad tie via a second bracket assembly, and a second microphone assembly coupled to the second frame member such that the second microphone assembly is positioned on a second outer side of a second rail of the railroad track, the second microphone assembly may be oriented to receive acoustic signals associated with the passing train. The first inner frame assembly may be configured to couple to a midsection of the first railroad tie between first and second rails of the railroad track via a third bracket assembly, the first inner frame assembly may include a first housing, a third microphone assembly oriented to receive acoustic signals emanating from the first rail, and a fourth microphone assembly oriented to receive acoustic signals associated with the passing train.

In certain instances the railcar acoustic monitoring system may further include a second trackside frame assembly that may include a third outer frame assembly, a fourth outer frame assembly, and a second inner frame assembly. The third outer frame assembly may include a third frame member configured to couple to a first end of a second railroad tie via a fourth bracket assembly, and a fifth microphone assembly coupled to the third frame member such that the fifth microphone assembly is positioned on the first outer side of the first rail of the railroad track, the fifth microphone assembly oriented to receive acoustic signals associated with the passing train. The fourth outer frame assembly may include a fourth frame member configured to couple to a second end of the second railroad tie via a fifth bracket assembly, and a sixth microphone assembly coupled to the fourth frame member such that the sixth microphone assembly is positioned on the second outer side of the second rail of the railroad track, the sixth microphone assembly oriented to receive acoustic signals associated with the passing train. The second inner frame assembly configured to couple to a midsection of the second railroad tie between first and second rails of the railroad track via a sixth bracket assembly, the second inner frame assembly may include a second housing, a seventh microphone assembly oriented to receive acoustic signals emanating from the first rail, and an eighth microphone assembly oriented to receive acoustic signals associated with the passing train.

Aspects of the present disclosure may involve a computer-implemented method for identifying defects of a train via acoustic monitoring. The method may include the step of receiving a plurality of signals from a plurality of microphone assemblies at a data acquisition module of a field sensor system when the train passes the plurality of microphones. The plurality of microphones may be in communication with the data acquisition module. The plurality of microphone assemblies may be positioned proximate the first and second rails of the track. The plurality of microphone assemblies may include a first, second, third, and fourth microphone assemblies. The first microphone assembly may be positioned on outward of the first rail, the second microphone assembly may be positioned outward of the second rail, and the third and fourth microphone assemblies may be positioned inward of the first and second rails. The plurality of signals may include a first signal received by the first microphone assembly, a second signal received by the second microphone assembly, a third signal received by the third microphone assembly, and a fourth signal receive by the fourth microphone assembly. The first, second, third, and fourth microphone assemblies may be generally positioned in a first plane extending vertically and transverse to the first and second rails, the plurality of signals emanating from a noise source of a defect associated with the train as the train passes the plurality of microphone assemblies. The method may further include identifying a location of the noise source within the first plane. The method may further include identifying an intensity of the noise source at the location within the first plane. The method may further include determining a defect-type based on the location and the intensity of the noise source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Example embodiments are illustrated in referenced figures of the drawings. It is intended that the embodiments and figures disclosed herein are to be considered illustrative rather than limiting.

DETAILED DESCRIPTION

I. Acoustic Monitoring System

The present application incorporates by reference in their entireties the following U.S. Patent Application Numbers: 62/162,521, entitled "Automated Rail Inspection System," filed May 15, 2015; 62/162,509, entitled "Calibration Method for Strain Gage Based Neutral Temperature Measurement Systems," filed May 15, 2015; Ser. No. 15/156,034, entitled "Automated Rail Inspection System," filed May 16, 2016; Ser. No. 12/716,247, now U.S. Pat. No. 8,155,809, filed Mar. 2, 2010; Ser. No. 12/138,617, now U.S. Pat. No. 7,698,028, filed Jun. 13, 2008; Ser. No. 10/979,870, now U.S. Pat. No. 7,392,117, filed Nov. 2, 2004.

Figure 1:
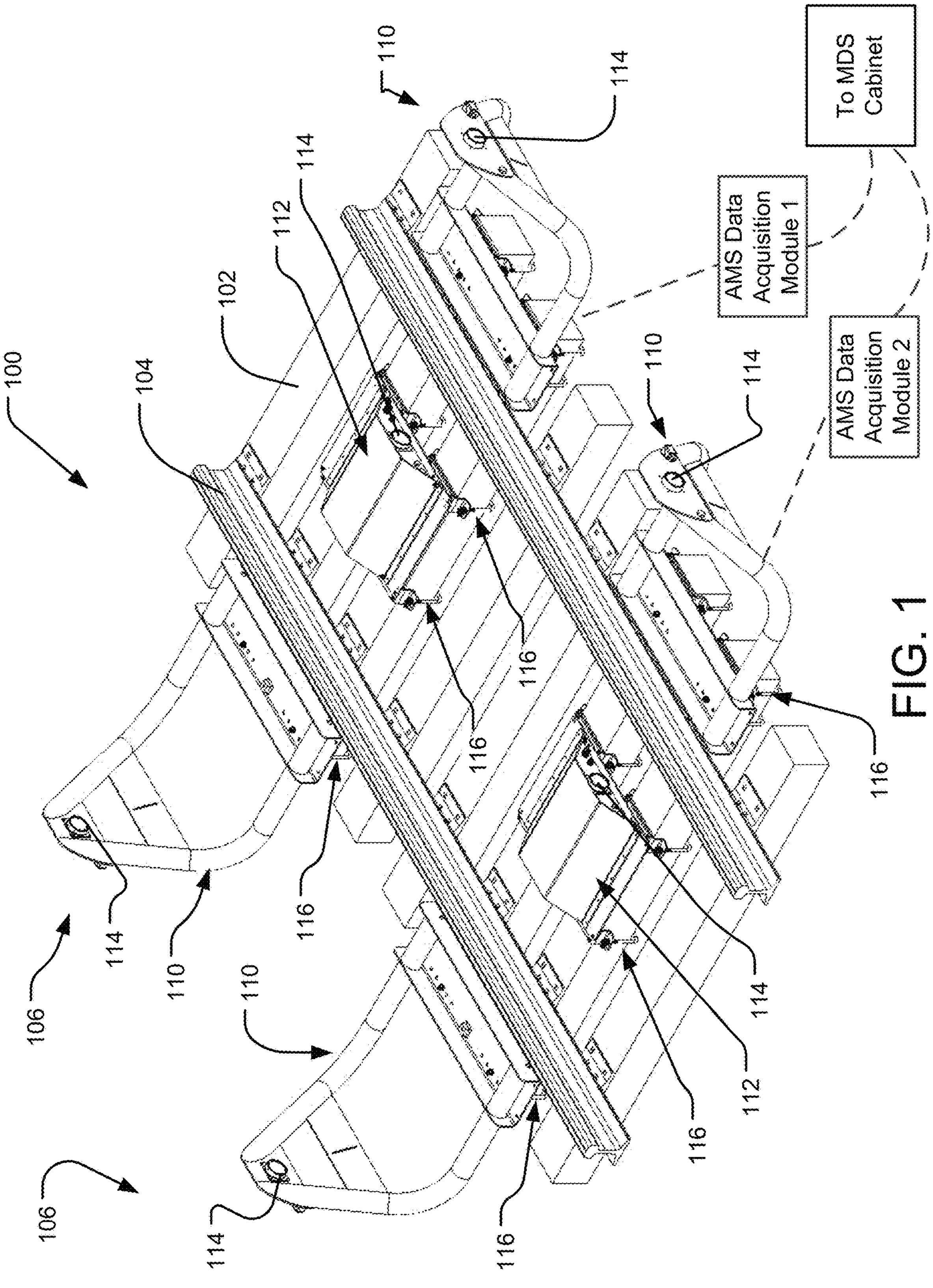
FIG. 1 is an isometric view of the railcar acoustic monitoring system.

Aspects of the present disclosure involve a railcar acoustic monitoring system 100, as seen in an isometric view in FIG. 1. The railcar acoustic monitoring system 100 can also be seen in a top view in FIG. 2, and in a front view (which is identical to a rear view) in FIG. 3.

Figure 2:
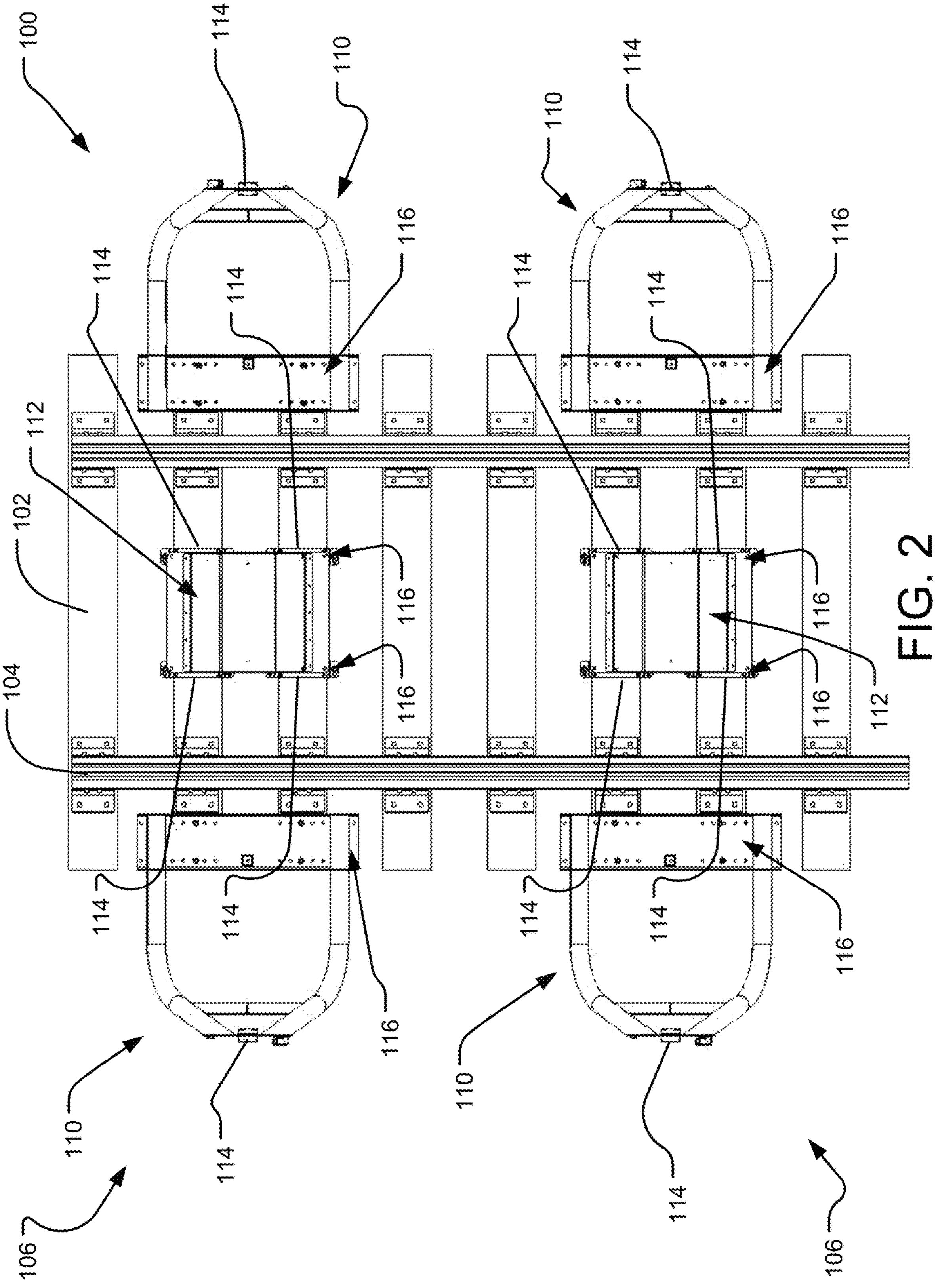
FIG. 2 is a top view of the railcar acoustic monitoring system.
Figure 3:
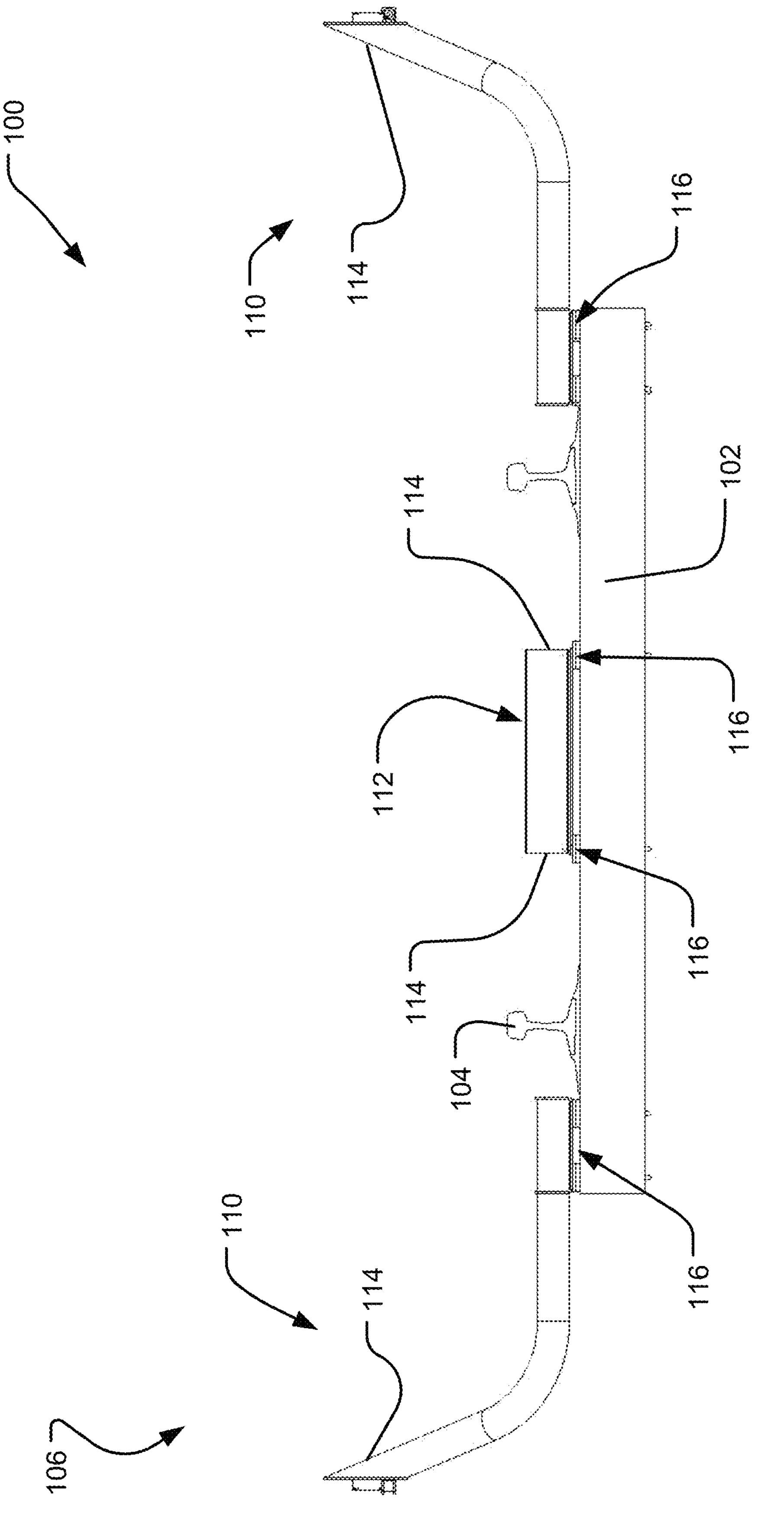
FIG. 3 is a front view of the railcar acoustic monitoring system.

As seen in FIGS. 1-3, the acoustic monitoring system 100 is coupled to the ties (otherwise known as sleepers) 102 of a railroad track 104. As seen in FIGS. 1 and 2, the acoustic monitoring system 100 may include a pair of trackside frame assemblies 106 spaced apart longitudinally along the rails of the track 104. While the figures depict two trackside frame assemblies 106, the disclosure contemplates as few as one trackside frame assembly 106, and more than two trackside frame assemblies 106. In certain instances, the acoustic monitoring system 100 may include three trackside frame assemblies 106. In certain instances, the acoustic monitoring system 100 may include four trackside frame assemblies 106. In certain instances, the acoustic monitoring system 100 may include five trackside frame assemblies 106. In certain instances, the acoustic monitoring system 100 may include six trackside frame assemblies 106. In certain instances, the acoustic monitoring system 100 may include more than six trackside frame assemblies 106.

Each trackside frame assembly 106 may include two outer frame assemblies 110, and an inner frame assembly 112. Each of the outer frame assemblies 110 is mounted to a pair of adjacent ends of railroad ties 102. The pair of outer frame assemblies 110 may be mounted to the same railroad ties 102 in an opposing fashion. The inner frame assemblies 112 are mounted between the pair of outer frame assemblies 110 on the same railroad ties 102 to which the outer frame assemblies 110 are mounted.

Each of the outer frame assemblies 110 may include a microphone assembly 114, and each of the inner frame assemblies 112 may include two microphone assemblies 114 oriented in opposite of each other. Each of the outer frame assemblies 110 may be mounted to the railroad ties 102 via a pair of mounting assemblies 116. Each of the inner frame assemblies 112 may be mounted to the railroad ties 102 via four mounting assemblies 116.

Figure 4:
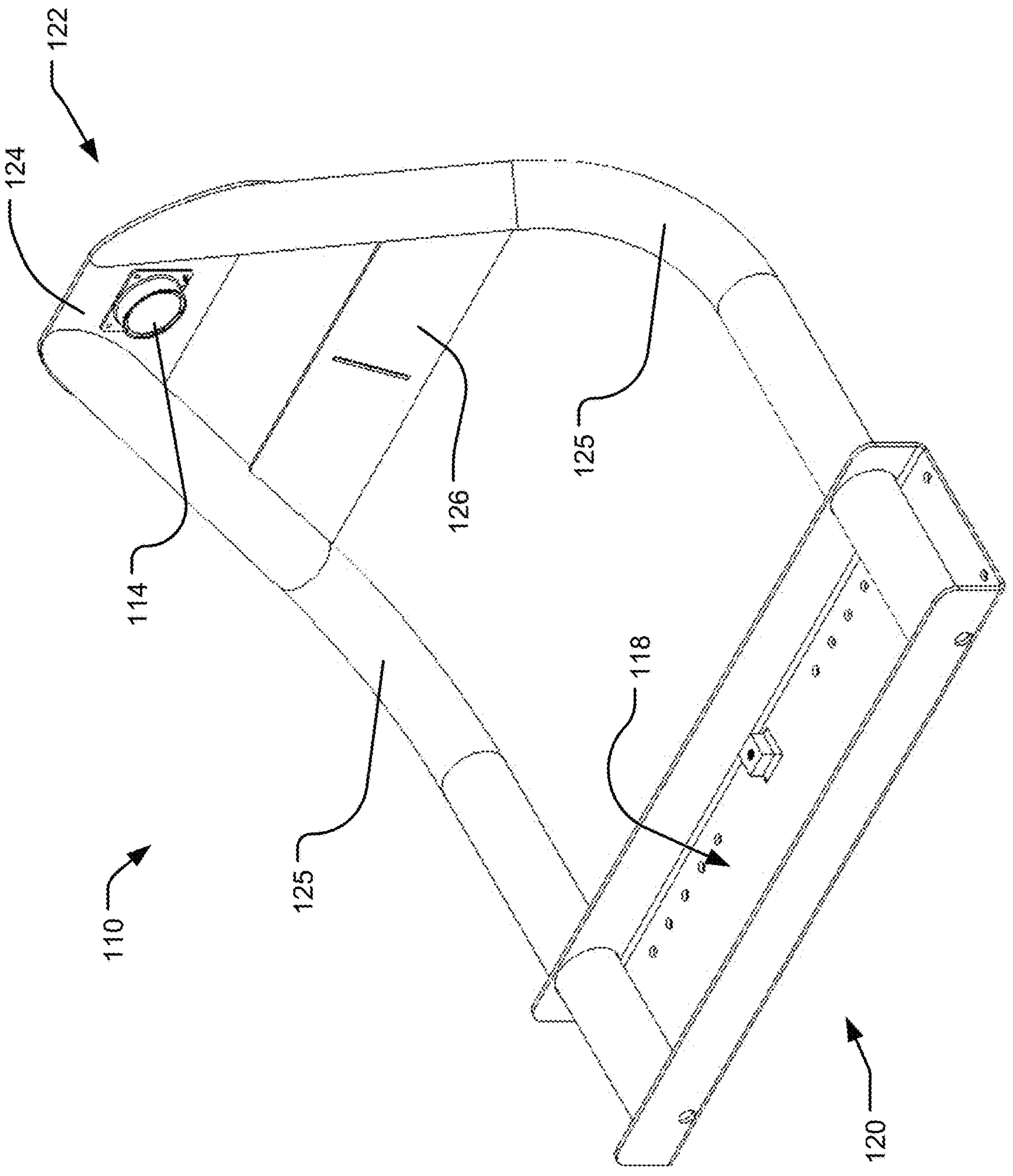
FIG. 4 is an isometric view of an outer frame assembly.
Figure 5:
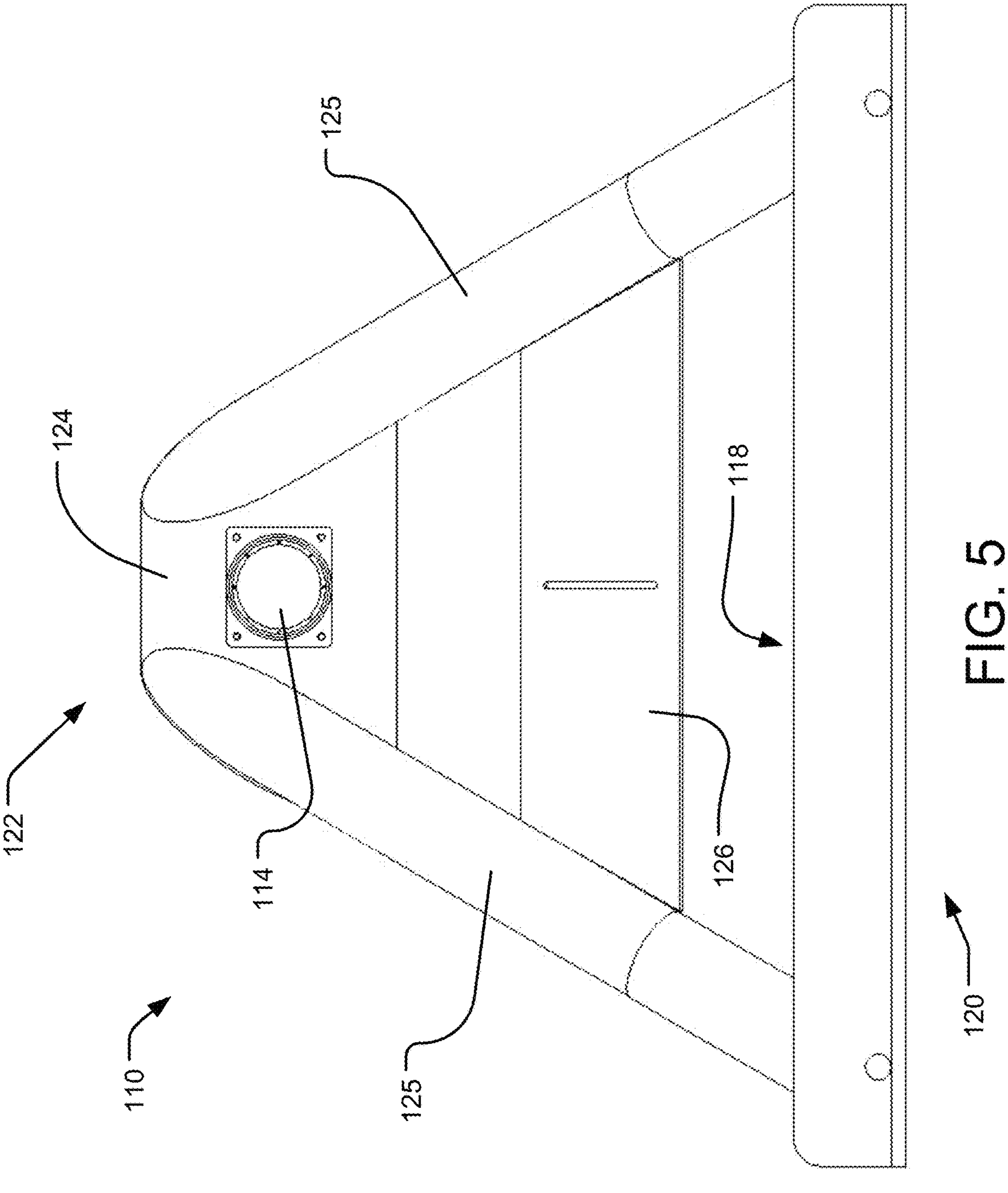
FIG. 5 is a side view of the outer frame assembly.
Figure 6:
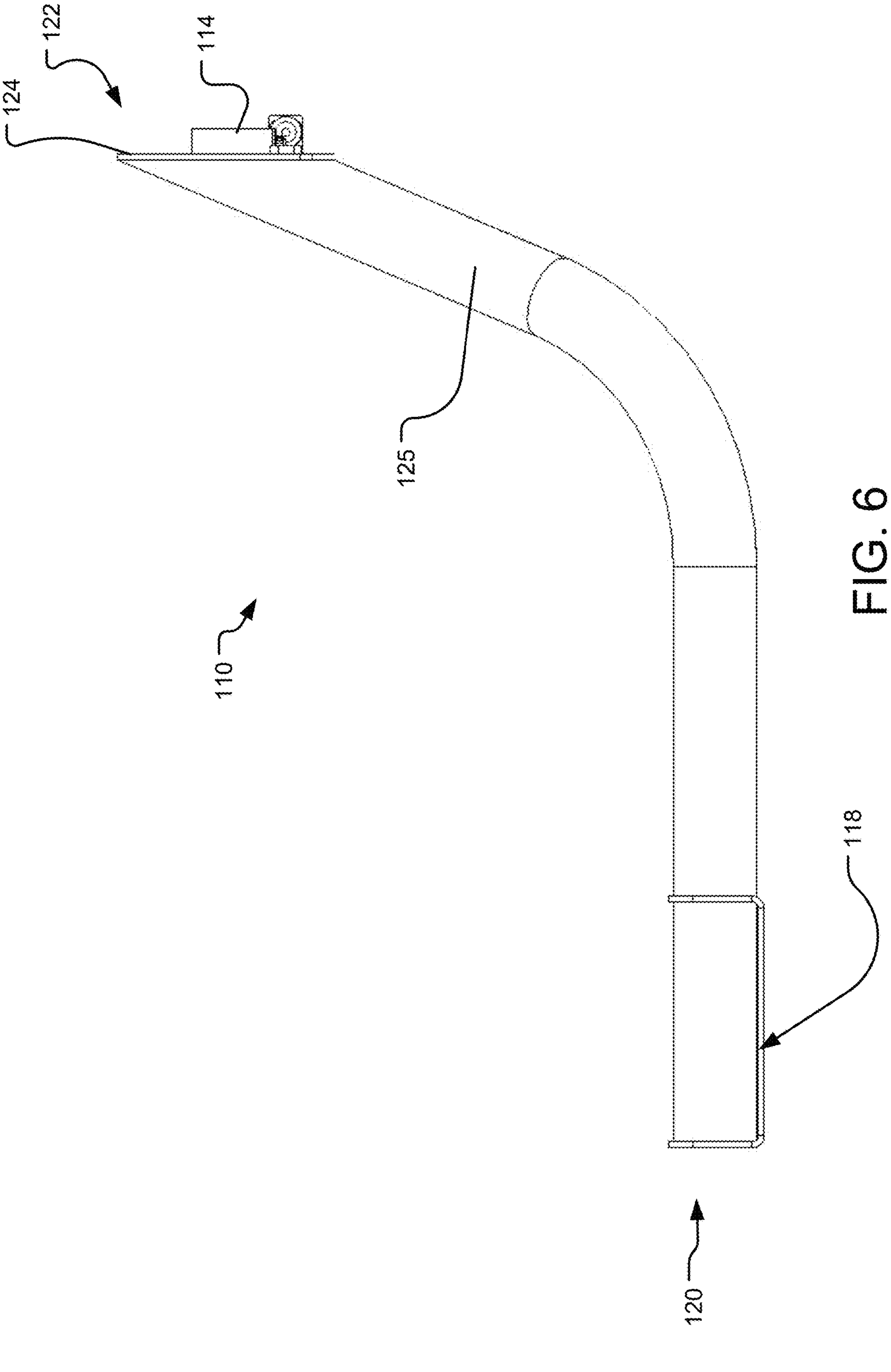
FIG. 6 is a front view of an outer frame assembly.

Reference is made to FIGS. 4-6, which depict, respectively, an isometric view of an outer frame assembly 110, a side view of the outer frame assembly 110, and a front view of the outer frame assembly 110. As seen in FIGS. 4 and 5, the outer frame assembly 110 includes a pair of frame members 125 coupled to a mounting bracket 118 at an inner end 120 of the outer frame assembly 110. Opposite the mounting bracket 118, at an outer end 122 of the outer frame assembly 110, the pair of frame members 125 are coupled together via a plate 124. Below the plate 124 is a support member 126 extending transversely between the pair of frame members 125. The pair of frame members 125 may be tubular members that include about a ninety degree bend between the inner end 120 and the outer end 122.

As seen in FIGS. 4-6, the microphone assembly 114 is coupled to the plate 124 at the outer end 122 of the outer frame assembly. As will be described subsequently, the microphone assembly 114 is oriented to receive sound waves from the railroad tracks, which is generally from the inner end 120 of the outer frame assembly 110. The microphone assembly 114 is positioned about 58.5 cm above the bracket so that it is about 38.5 cm above the head of rail and about 125 cm lateral of the gage face of the rail.

Figure 7:
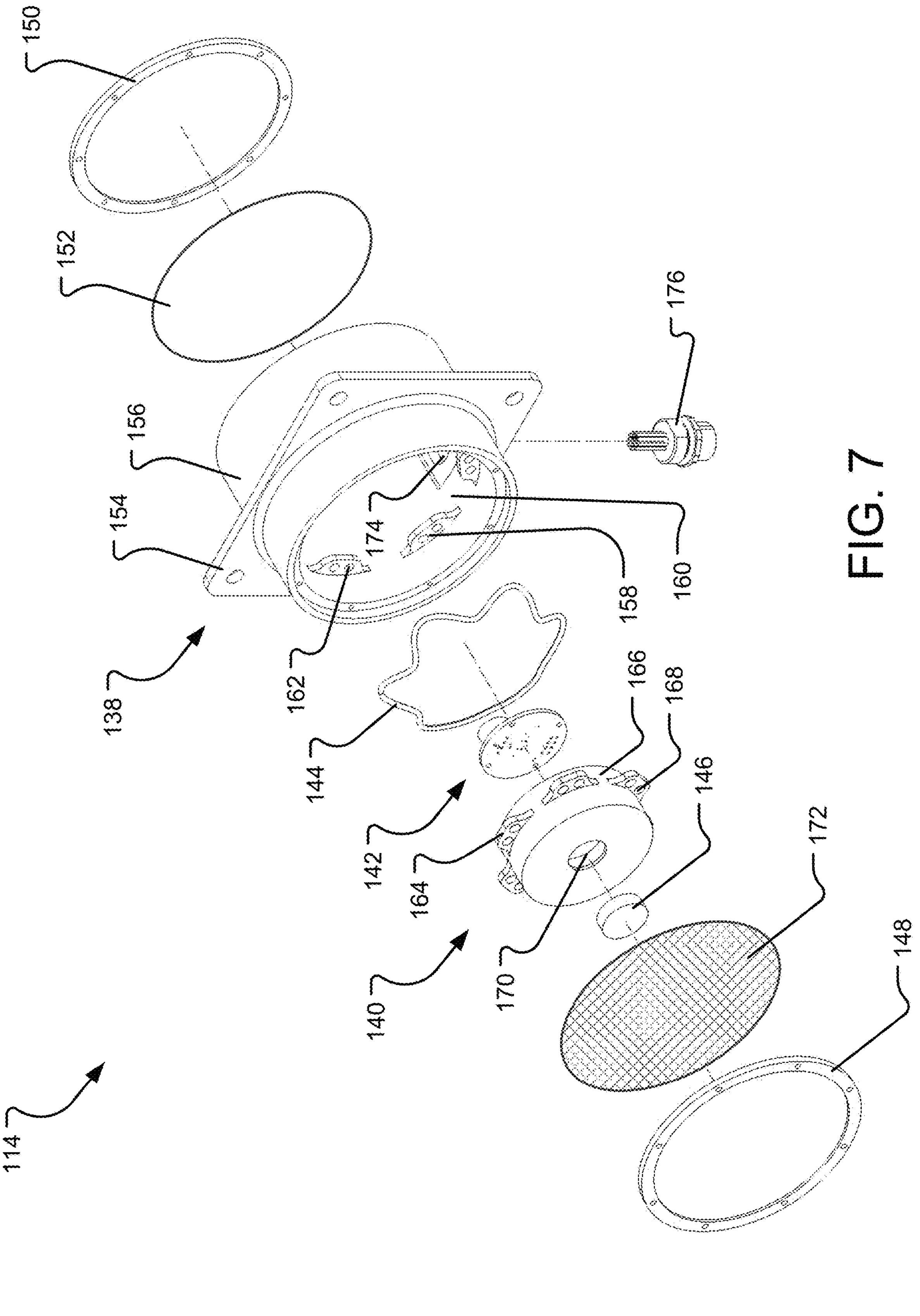
FIG. 7 is an isometric view of a microphone assembly.
Figure 8:
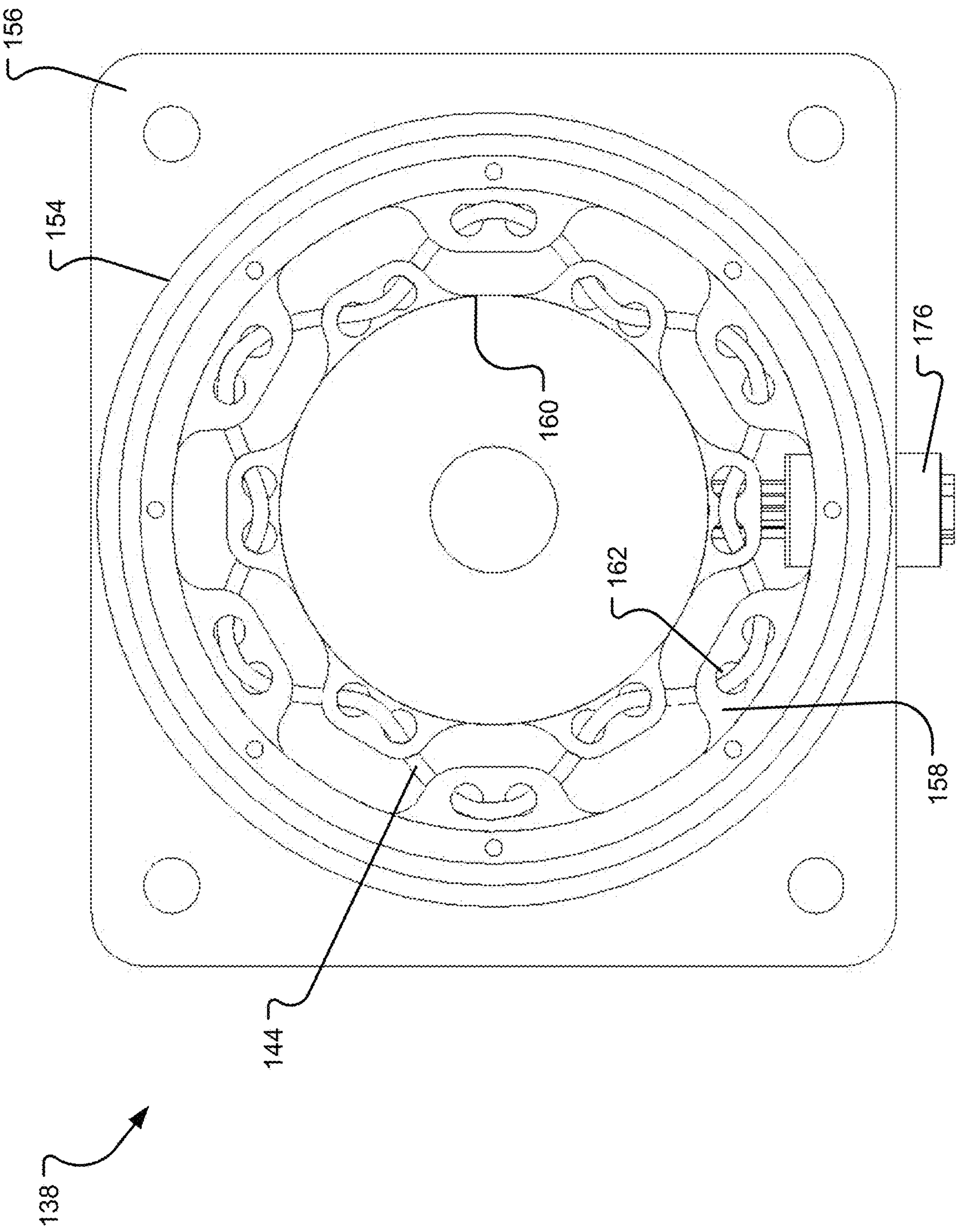
FIG. 8 is a front view of the microphone assembly.
Figure 9:
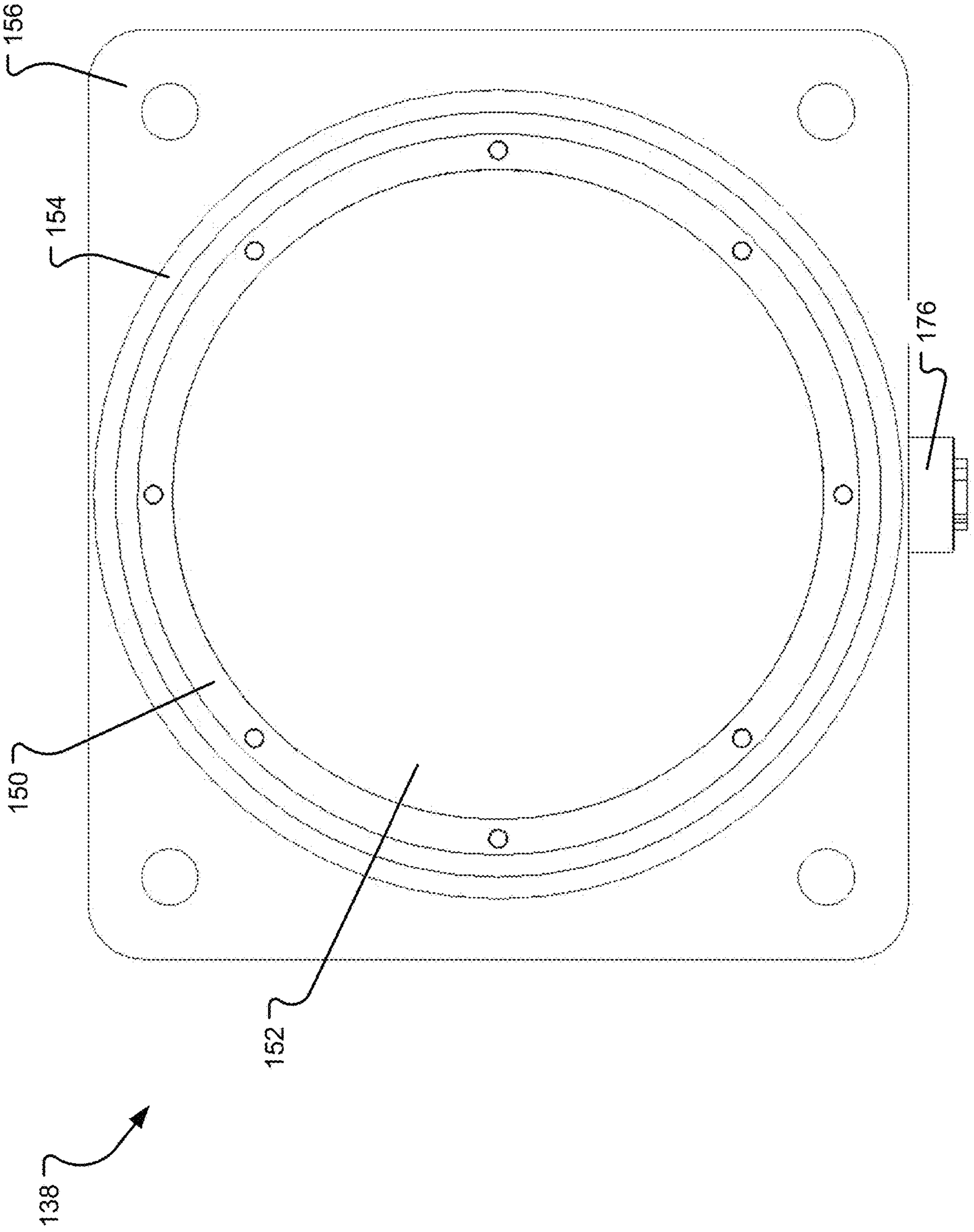
FIG. 9 is a back view of the microphone assembly.
Figure 10B:
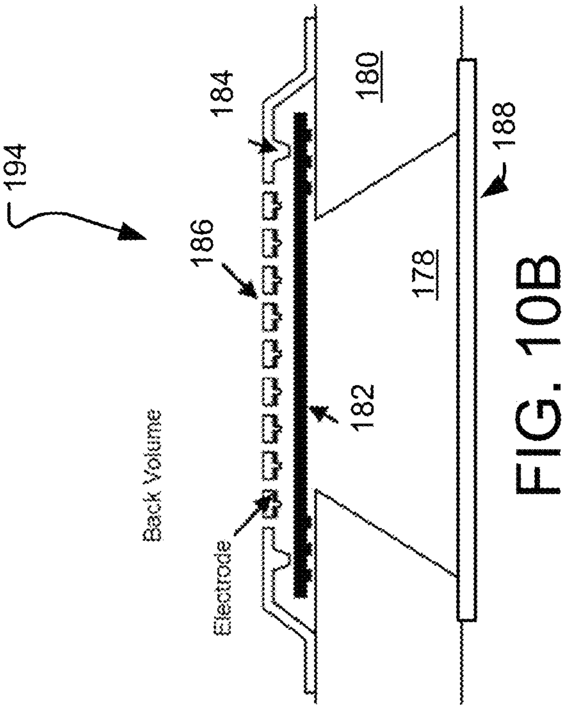
FIG. 10B is a cross-sectional side view of a MEMS microphone.
Figure 10C:
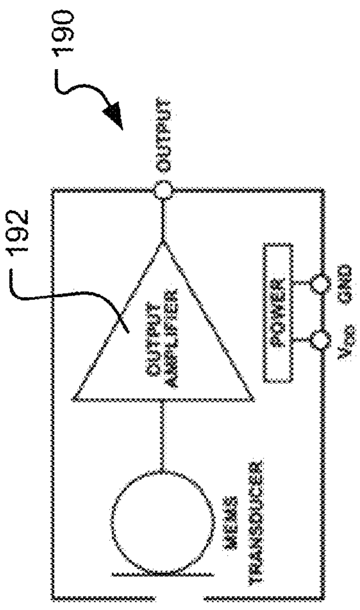
FIG. 10C is a block diagram of an example analog MEMS microphone.

FIGS. 7-10C depict various views of the microphone assembly 114. More particularly, FIG. 7 depicts an isometric exploded view of the microphone assembly 114, FIG. 8 depicts a front view of the microphone assembly 114, FIG. 9 depicts a back view of the microphone assembly 114, FIG. 10A depicts another back view of the microphone assembly 114, FIG. 10B depicts a cross-sectional side view of a MEMS microphone 164, and FIG. 10C depicts a block diagram of an analog MEMS microphone 164.

As seen in FIG. 7, the microphone assembly 114 may include an outer housing 138, an inner housing 140, a printed circuit board ("PCB") 142, a shock cord 144, a foam disk 146, a front retention ring 148, a screen 172, a rear retention ring 150, and a rear enclosure lid 152. The outer housing 138 is a cylindrical tube having a four-sided flange 154 extending from an outer surface 156 thereof. The flange 154 may include through-holes for coupling the microphone assembly 114 to components of the trackside frame assemblies 106. The outer housing 138 may also include tabs 158 extending inward from an inner surface 160 thereof. The tabs 158 may include a pair of through-holes 162 for receiving the shock cord 144 there through.

The inner housing 140 may be a cylindrical tube and may include tabs 164 extending from an outer surface 166 thereof. The tabs 164 may include a pair of through-holes 168 there through for receiving the shock cord 144 there through. In this way, the inner housing 140 may be flexibly coupled within the outer housing 138 via the shock cord 144. The shock cord 144 may act as a shock absorber (vibration and shock isolation) for the inner housing 140 when, for example, a train passes the trackside frame assemblies 106 and causes the outer housing 138 to vibrate. Since the outer housing 138 is affixed to the trackside frame assemblies 106 via the flange 154, the outer housing 138 may vibrate when the track side frame assemblies 106 vibrate. The inner housing 140 is, thus, isolated from the direct vibrations of the outer housing 140 via the shock cord 144. In a sense, the inner housing 140 is in a floating relationship to the outer housing 138. The shock cord 144 may be an elastic cord capable of recovering in length and shape after being stretched.

As seen in FIG. 8, the inner housing 140 may include six tabs 164, and the outer housing 138 may include six tabs 158. And the shock cord 144 may weave between the tabs 164 of the inner housing 140 and the tabs 158 of the outer housing 138. The inner and outer housings 140, 138 may include an alternative number of tabs 164, 158 without departing from the teachings of the present disclosure.

Figure 11:
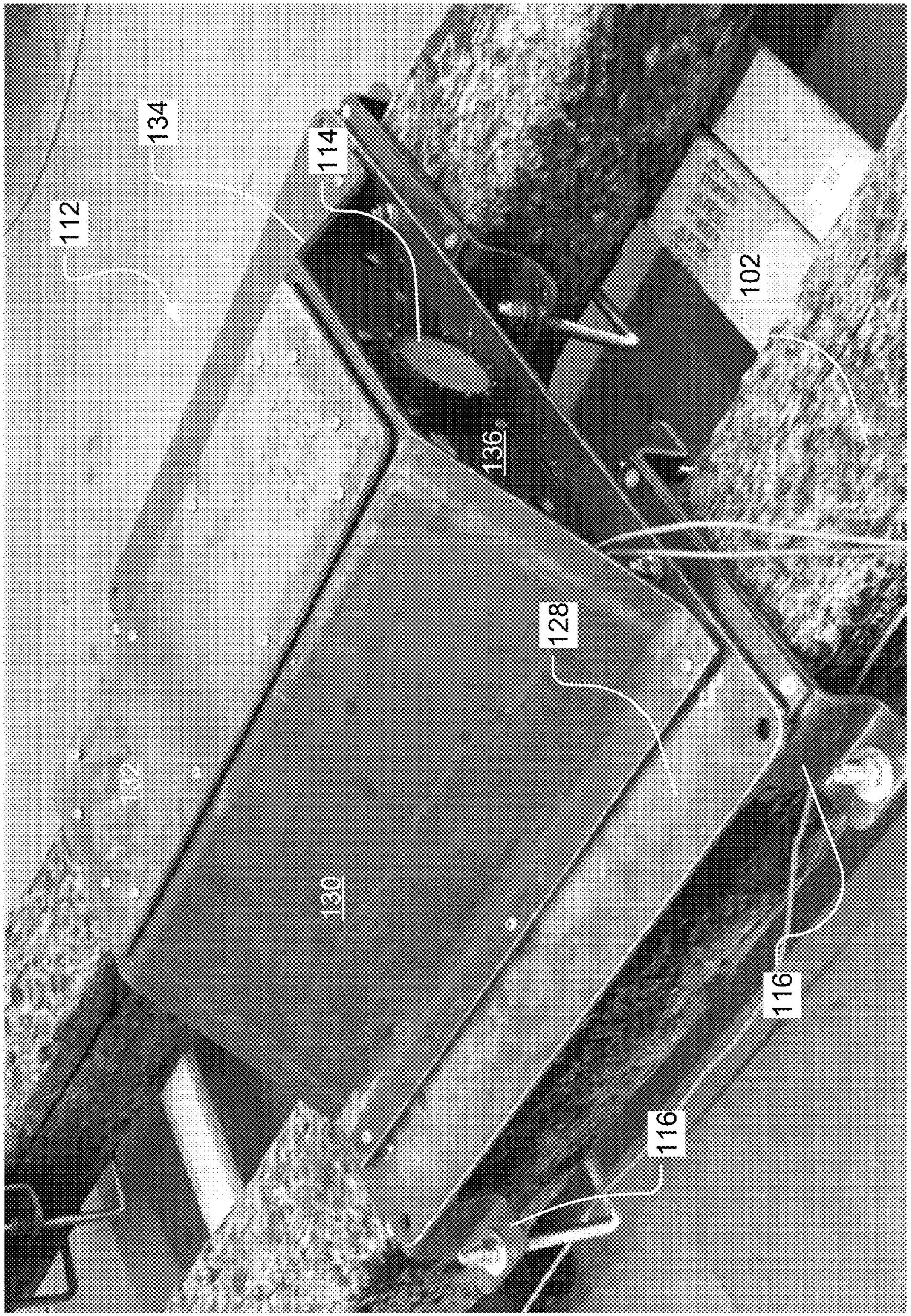
FIG. 11 is an isometric view of an inner frame assembly.
Figure 12:
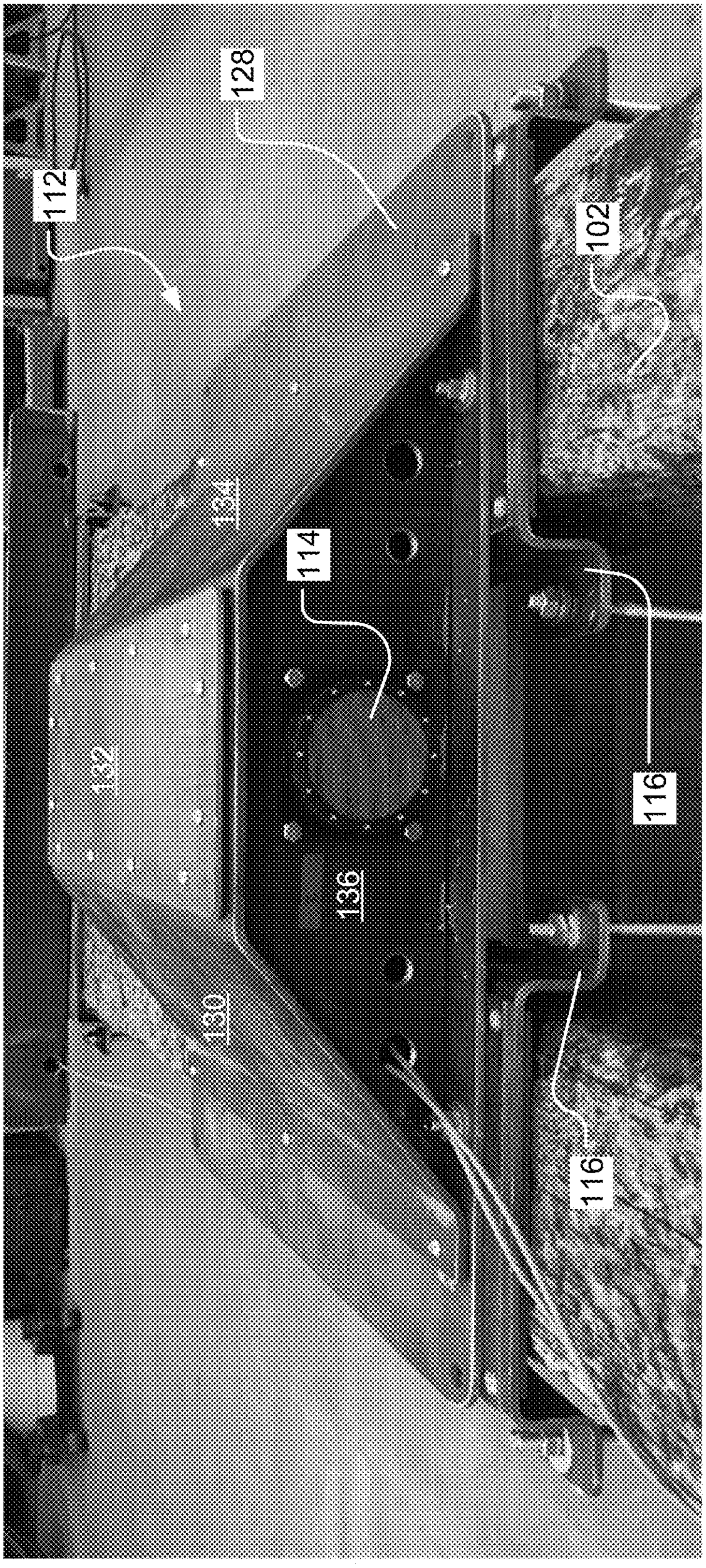
FIG. 12 is a side view of the inner frame assembly.

The inner housing 140 may include a central opening 170 where the PCB 142 is attached thereto via fasteners (e.g., screws). The foam disk 146 may be positioned within the central opening 170, and in front of the signal receiving side of the PCB 142. The foam disk 146 acts as a windscreen or windshield for the microphone embedded in the PCB 142. As seen in FIGS. 7, and 11-12, the screen 172 having a circular perimeter may be fitted over the central opening 170, and the foam disk 146, and held in place by the front retention ring 148. That is, the front retention ring 148 may be fastened (e.g., via screws) to the front side of the outer housing 138 so as to support the screen 172 in position as a shield against debris from entering the confines of the microphone assembly 114. The screen 172 may help prevent insects and rodents out of the assembly 114. The rear enclosure lid 152 may be positioned between the back side of the outer housing 138 and the rear retention ring 150 via fasteners (e.g., screws). The rear enclosure lid 152 may be solid, or in certain instances it may be a screen. As seen in FIG. 9, which is a rear view of the microphone assembly 114, the rear enclosure lid 152 is solid, and held in place by the rear retention ring 150. A heating ring (not shown) may be attached to the front retention ring 148. A small amount of current may be applied to the heating ring to prevent snow and ice from building up in the front of the microphone.

As seen in FIG. 7, the outer housing 138 of the microphone assembly 114 may include an opening 174 for receiving a connector 176 including electrical componentry to communicably couple the PCB 142 with the AMS Field Nodes, as will be described subsequently. In certain instances, the outer housing 138, the inner housing 140, front retention ring 148, rear retention ring 150, and rear enclosure lid 152 may be additively manufactured (e.g., 3D printed).

Figure 10A:
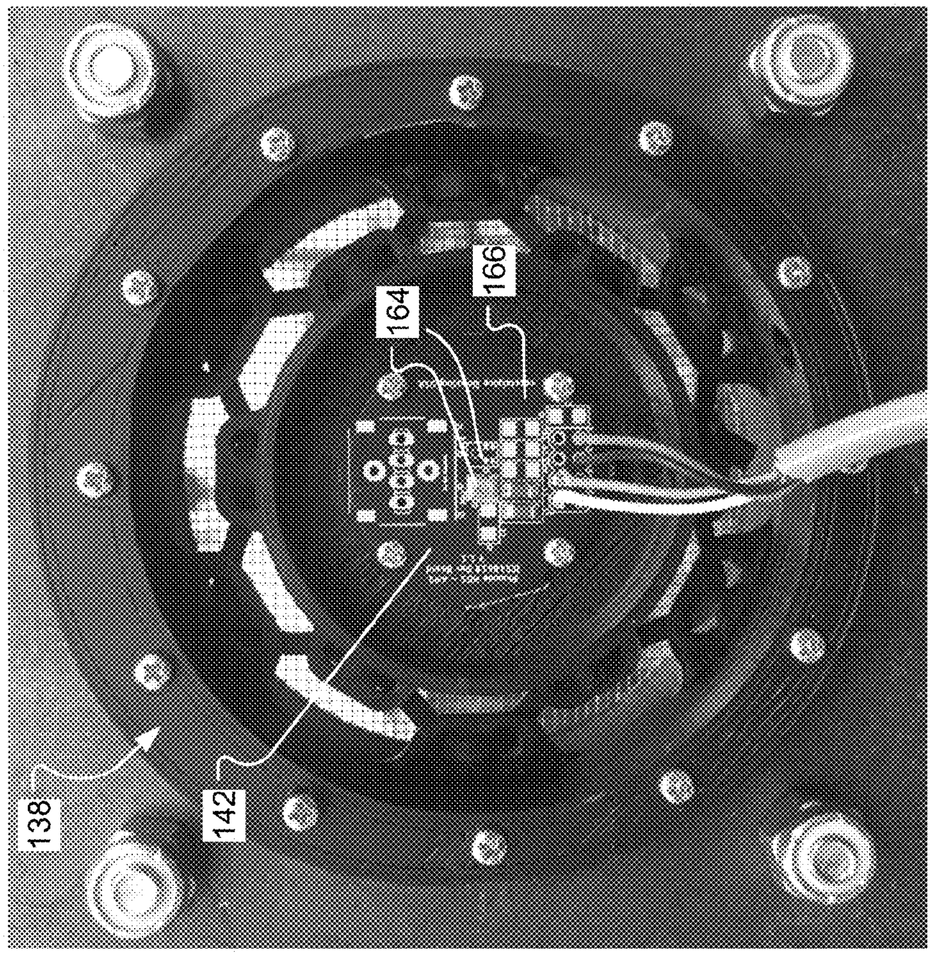
FIG. 10A is another back view of the microphone assembly, with a detailed view of the circuit board containing the MEMS microphone.
Figure 18:
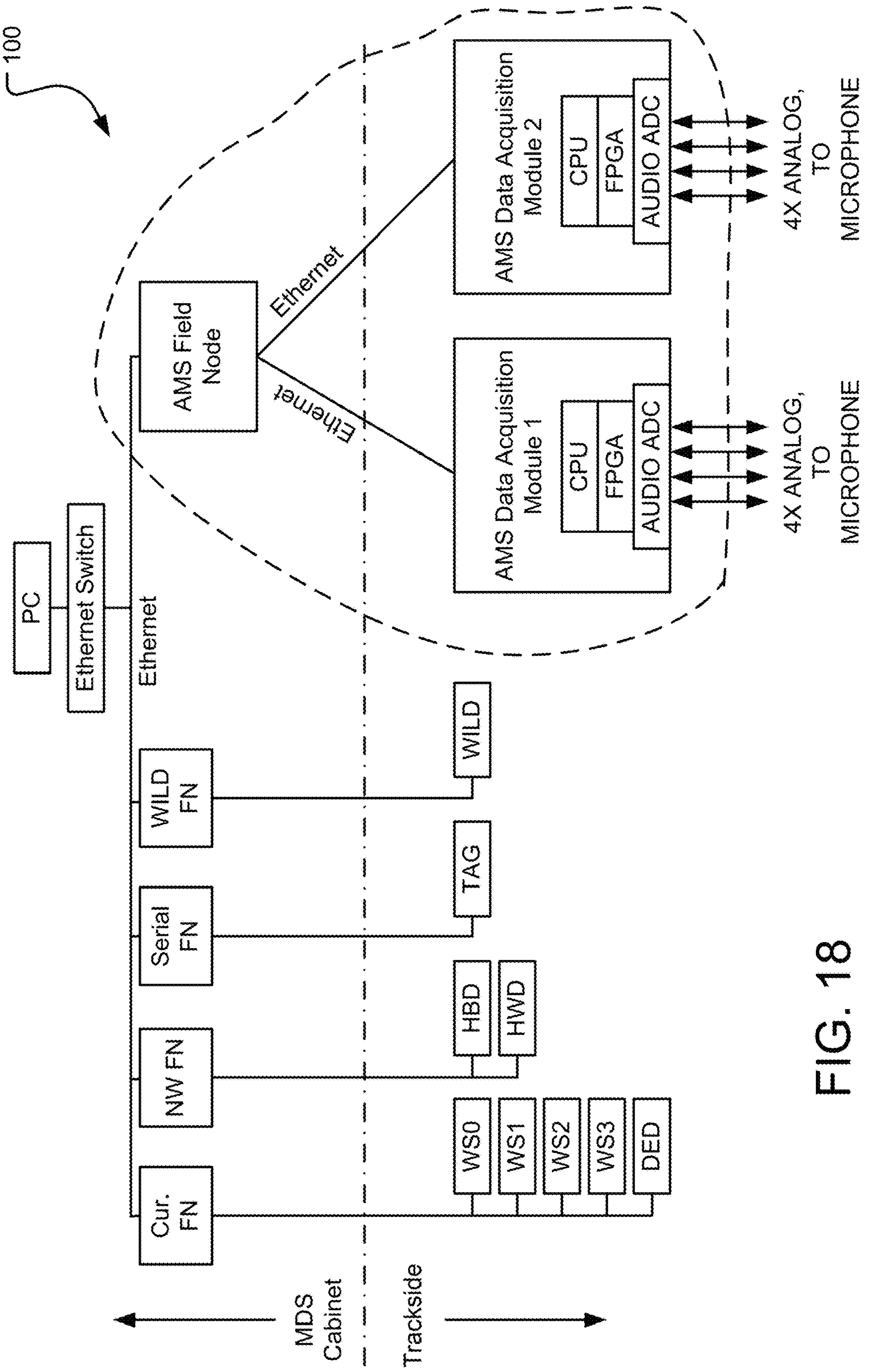
FIG. 18 is a block diagram showing the arrangement of communication components of the acoustic monitoring system.

Referring to FIGS. 10A-10C, the PCB 142 may include a microelectrical-mechanical systems ("MEMS") microphone 164, and a speaker 166, among other board components. The PCB 142 may be fastened to a rear surface of the inner housing 140 such that the board component connectors face the rear of the assembly, and the signal receiving side of the MEMS microphone 164 faces towards the front of the inner housing 140. As seen in FIG. 10A, the PCB 142 includes a connection for a second MEMS microphone 164. Thus, in certain instances, the microphone assembly 114 may include two MEMS microphones 164 to ensure against a failure of one of the MEMS microphones, among other reasons. In certain instances, both microphones 164 may be wired to receive acoustic signals. In certain instances, only one microphone 164 may be wired to receive acoustic signals, whereas the other microphone remains on the board in case of failure of the first microphone 164. In certain instances, a repair worker may simply disassemble the microphone assembly 114, disconnect the first microphone 164 that failed, and electrically connect the second microphone 164. Alternatively, in certain instances, if one of the MEMS microphones 164 failed, a mechanical latching relay located on the AMS Data Acquisition Module (as seen in FIG. 18) may be used to switch to a second MEMS microphone 164.

Given the relatively small size and low cost of the MEMS microphones 164, multiple MEMS microphones 164 may be included on the PCB 142. And since, each microphone 164 can be wired to the PCB 142 and remotely switched ON, multiple MEMS microphones 164 may be on the PCB 142 as a precaution against failure of a single MEMS microphone 164. In certain instances, there may be one MEMS microphone 164 on the PCB 142. In certain instances, there may be two MEMS microphone 164 on the PCB 142. In certain instances, there may be three MEMS microphone 164 on the PCB 142. In certain instances, there may be four MEMS microphone 164 on the PCB 142. The PCB 142 may be attached to the inner housing 140 and "potted" with standard electronic potting material to waterproof the components of the PCB 142*n*

The speaker 166 may be configured as a tester for the MEMS microphone(s) 164. As a known signal or waveform (e.g., beep, chirp) may be output from the speaker 166, and the signal received by the MEMS microphone(s) 164 may be analyzed to ensure the microphones 164 are functioning properly. Additionally or alternatively, a signal from the speaker 166 can be received by any number or all eight of the MEMS microphones 164 of the inner and outer frame assemblies 112, 110 in order to test and/or calibrate the components of the system 100. Since the distance from all microphones is known by the system 100, the acoustic signature from the known waveform should be constant each time the waveform is played from the microphone 164. This can be considered a baseline. If the captured signal from any one microphone 164 differs from the baseline in any subsequent test, the system 100 can identify that a particular microphone 164 has failed. Upon a failure, the system 100 may automatically exclude it or switch to a different microphone 164 on the PCB 142.

A conventional MEMS microphone 164 may include a transducer element and an application-specific integrated circuit ("ASIC") bonded together and mounted on a laminate, and encased in an enclosure. FIG. 10B depicts a cross-sectional side view of an example transducer element 194 of an analog MEMS microphone 164. The transducer element 194 of the microphone 164 may include an acoustic port or opening 178 in a wafer 180 for receiving acoustic sound signals from, for example, a passing train. Opposite the opening 178 is a diaphragm 182 that is secured (e.g., bonded) to the wafer 180 via supporting posts 184 of a back plate 186. The back plate 186 may include a perforated portion to permit air to move between the backside of the diaphragm and the back plate 186. An acoustic membrane 188 that blocks moisture, but permits the passing of sound waves may be positioned over the acoustic port 178. An example acoustic membrane is the GORE® Acoustic Vent GAW334. Such a membrane can handle depths of up to two meters under water for one hour. The insertion loss of the membrane is less than two decibels at 1,000 Hz with a vent ID size of 1.6 mm.

As seen in FIG. 10C, which is a block diagram of an example analog MEMS microphone 164, the circuit 190 includes an amplifier 192 having a specific output impedance. When sound is detected, the transducer's signal is sent to the preamplifier 192, which functions as an impedance converter to bring the output impedance down to a usable level when the microphone is connected to an audio signal communication line. While an analog MEMS microphone 164 is described herein, the MEMS microphone 164 may be a digital MEMS microphone. In such a case, there would be no need for an analog-to-digital converter as the digital MEMS microphones transmit digital signals from the microphone assembly 114.

FIGS. 11 and 12 depict, respectively, an isometric view of the inner frame assembly 112, and a side view of the inner frame assembly 112, whereas an opposite side view of the inner frame assembly may be the same or substantially the same. As seen in the figures, the inner frame assembly 112 may include a base plate 128 that is coupled to adjacent ties 102 by four mounting assemblies 116 at respective corners of the base plate 128. A front surface 130 of the inner frame assembly 112 is angled relative to the base plate 128. The front surface 130 is coupled to a top surface 132, which may be removable from the front surface 130. A back surface 134, opposite the front surface 130, is also angled to relative to the base plate 128. As seen in FIG. 12, a side surface 136, which is generally perpendicular to the base plate 128 may include an opening for a microphone assembly 114. Another side surface 136 may be on an opposite side of the inner frame assembly 112. In this way, there are two microphone assemblies 114 in each of the inner frame assemblies 112. The top surface 132 may be a plate that is removable so as to access an internal compartment of the inner frame assembly 112 such as, for example, assembly, maintenance, and/or repair of the microphone assemblies 114.

Figure 13:
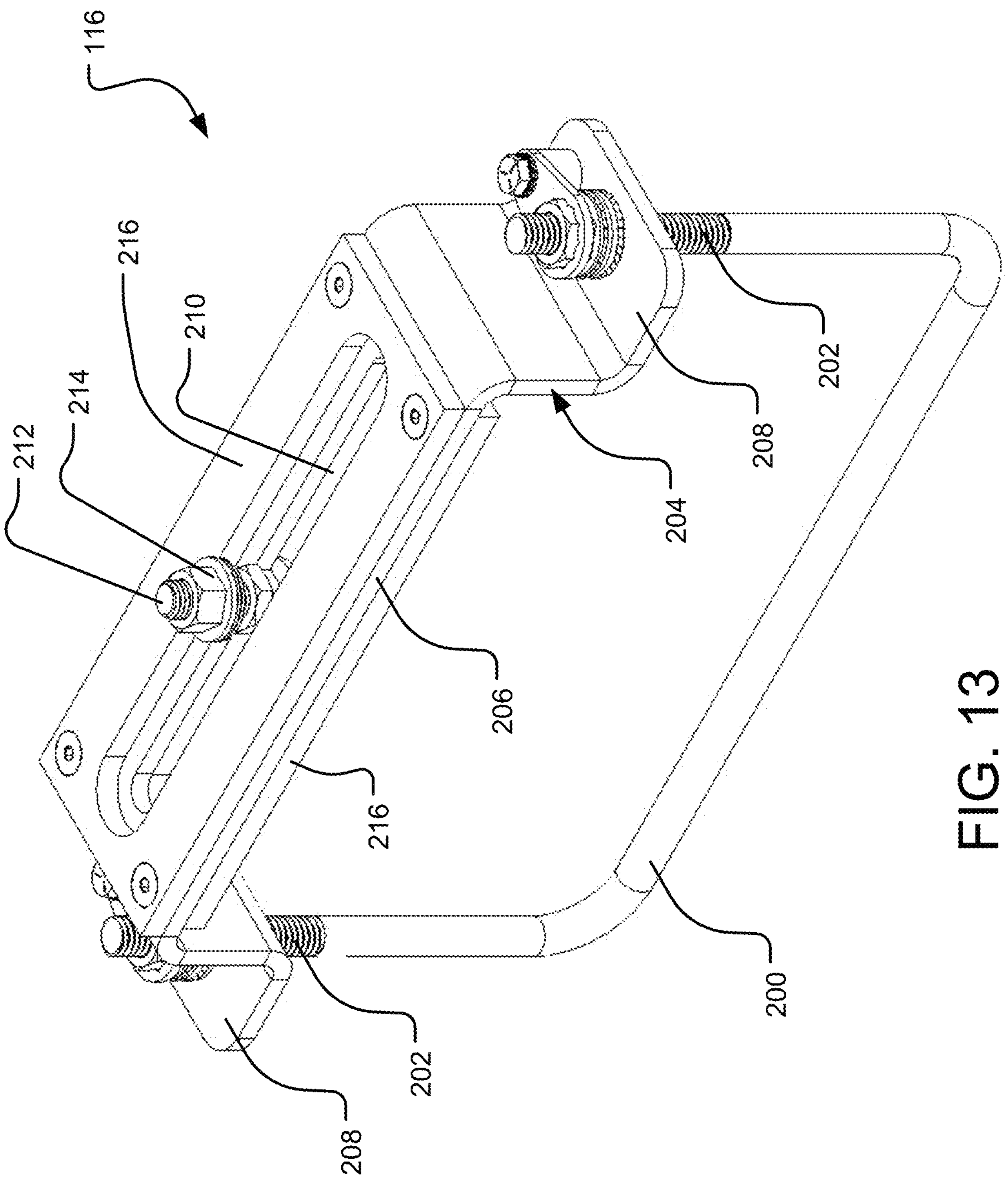
FIG. 13 is an isometric view of a mounting assembly.
Figure 14:
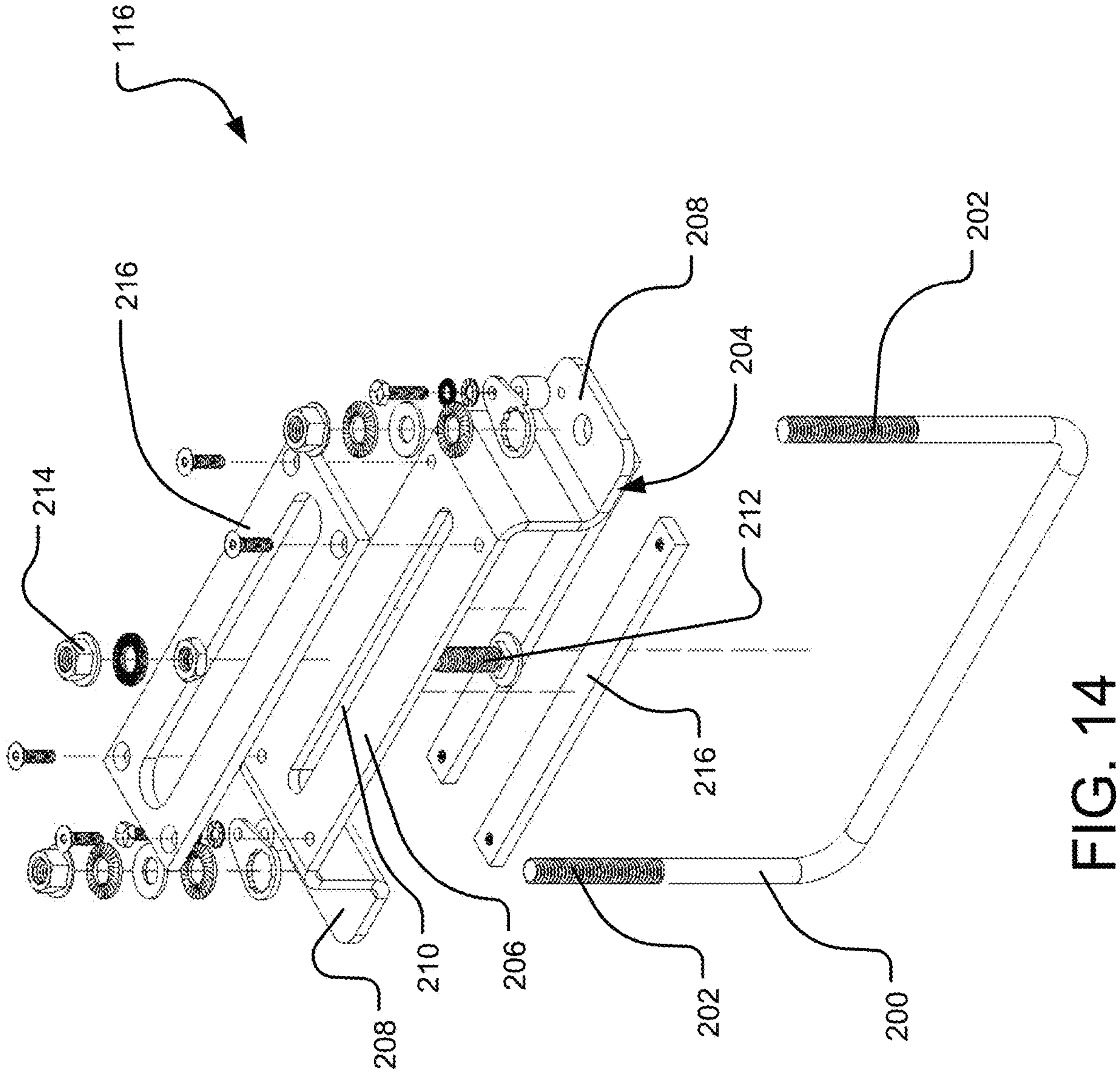
FIG. 14 is an isometric exploded view of the mounting assembly.
Figure 16:
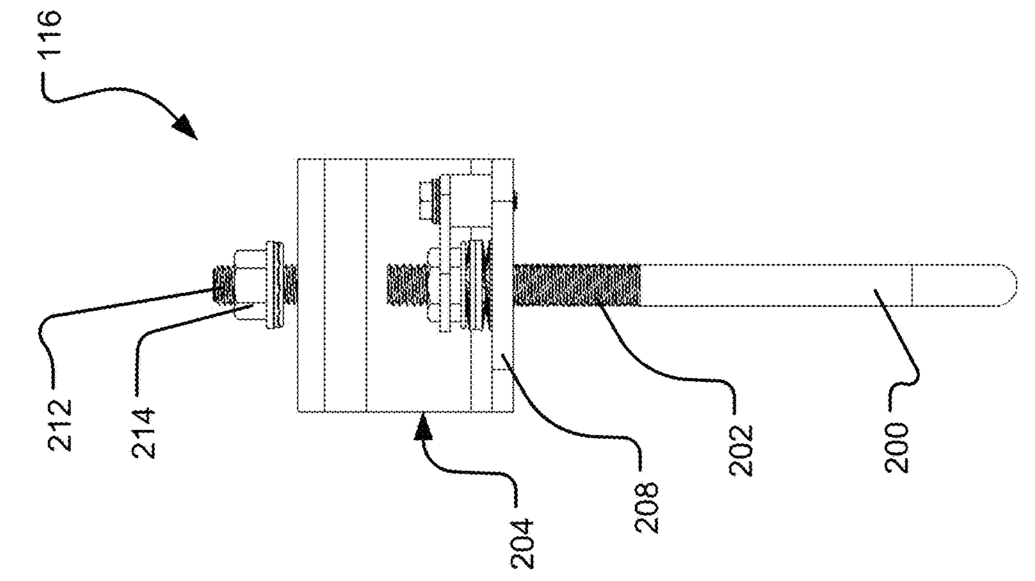
FIG. 16 is a side view of the mounting assembly.
Figure 15:
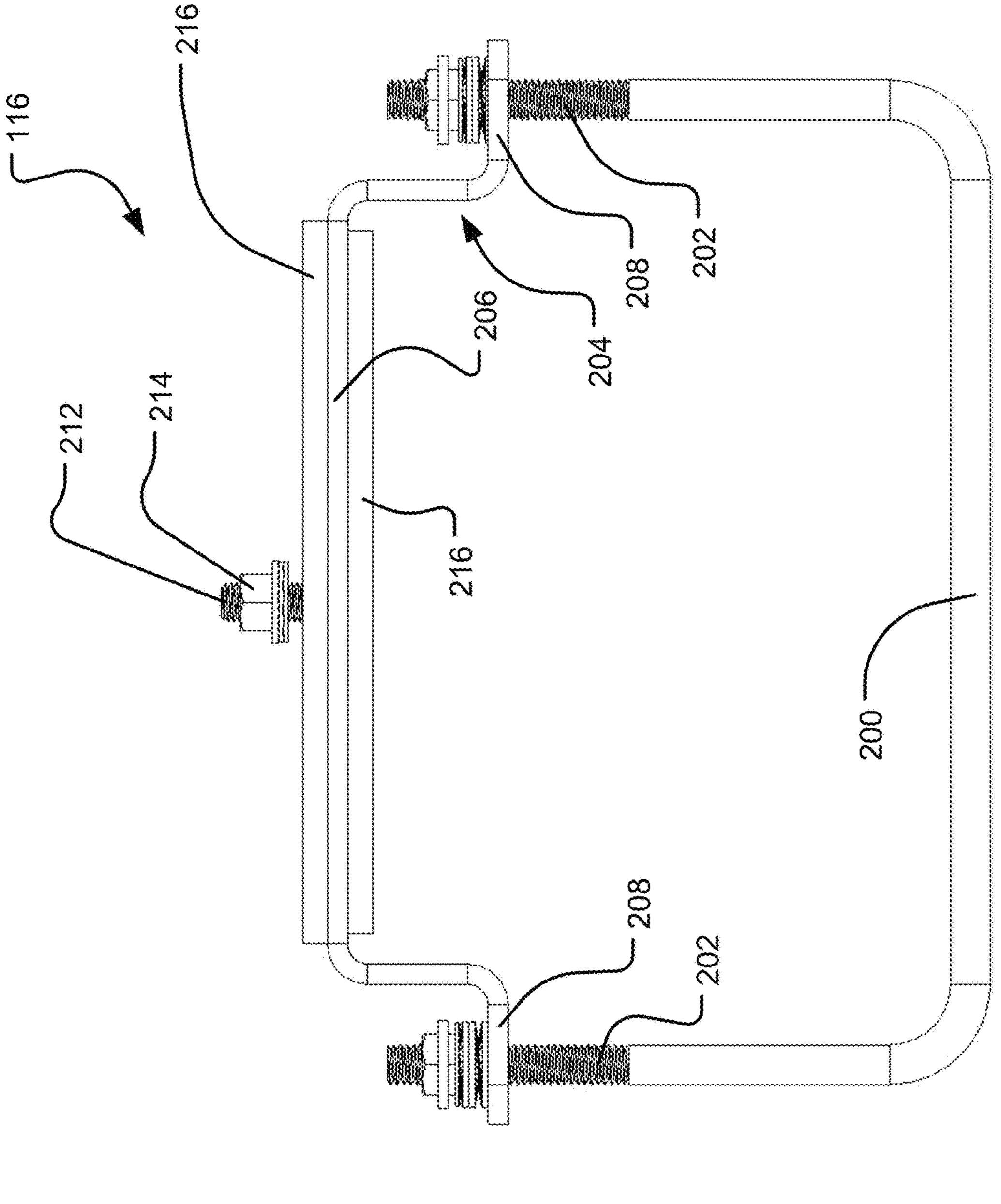
FIG. 15 is a front view of the mounting assembly.
Figure 17:
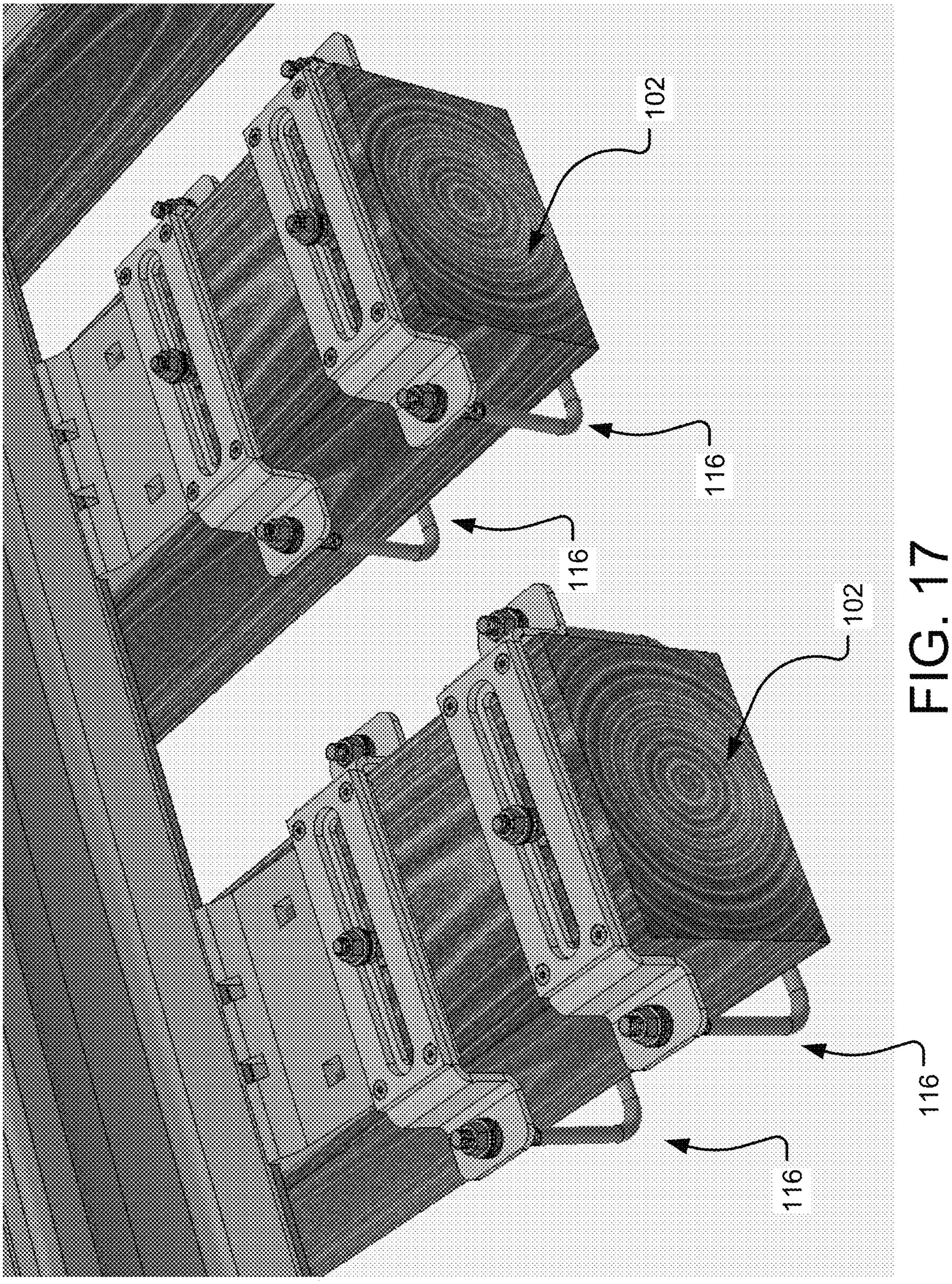
FIG. 17 is an isometric view of mounting assemblies coupled to the ends of railroad ties.

FIGS. 13-17 depict various views of the mounting assemblies or bracket assemblies 116. More particularly, FIG. 13 depicts an isometric view of the mounting assemblies 116, FIG. 14 depicts an isometric exploded view of the mounting assemblies 116, FIG. 15 depicts a front view of the mounting assemblies 116, FIG. 16 depicts a side view of the mounting assemblies 116, and FIG. 17 depicts four mounting assemblies 116 mounted to adjacent railroad ties 102. As seen in the figures, each of the mounting assemblies 116 may include a U-bolt 200 that is slightly wider than the width of a railroad tie 102 (as particularly seen in FIG. 17). The U-bolt 200 may include a pair of threaded ends 202. The mounting assembly 116 may also include a mounting bracket 204 having a raised central portion 206, bored end portions 208, and an elongated slot 210. The mounting bracket 204 may be fastened to the U-bolt 200 (with a railroad tie 102 there between) via fasteners that engage the threaded ends 202, which extend through the bored end portions 208 of the mounting bracket 204.

A bolt 212 may be positioned such that its threaded end extends upwards through the slot 210. The bolt 212 may slide along the slot 210 to an appropriate position to fasten to the outer and inner frame assemblies 110, 112. The bolt 212 may be fasted to the outer and inner frame assemblies 110, 112 via a fastener 214 (e.g., nut). A pair of plates 216 are positioned in between the bottom of the mounting bracket 204 and the railroad ties 102 so the head of the bolt 212 is permitted to slide along the slot 210. The plates 216 are held in place by fastening to a plate 218 (on the top side of the mounting bracket 204) that has an elongated slot 220 generally matching the dimensions of the slot 210 of the mounting bracket 204.

As seen in FIG. 17, two mounting assemblies 116 may be positioned at the end of each railroad tie 102. That is, two mounting assemblies 116 coupled to an end of a tie 102 may couple to a single outer frame assembly 110. And as seen in FIGS. 11-12, the inner frame assemblies 112 utilize four mounting assemblies 116. Thus, in total, the acoustic monitoring system 100 may utilize six mounting assemblies 116 on each of four railroad ties 102 for a total of twenty-four mounting assemblies 116.

The inner and outer frame assemblies 112, 110 are removable from the mounting assemblies 116 while the mounting assemblies 116 are still attached to the railroad ties 102. In this way, the inner and outer frame assemblies 112, 110 may be removed for track maintenance such as, for example, tamping. After the track maintenance is performed, the inner and outer frame assemblies 112, 110 may be reattached to the mounting assemblies 116 at the same position and orientation as they were previously mounted.

FIG. 18 depicts a block diagram showing the arrangement of communication components of the acoustic monitoring system 100. The communication components may be referred to as a data acquisition module of a field sensor system, and may be split between trackside components, and cabinet components (where the split is shown by the dashed-dotted line in FIG. 18). The portion of the communication components associated with the acoustic monitoring system 100 may be shown by the dashed line in FIG. 18.

The trackside components may be adjacent the railroad tracks and the trackside frame assemblies 106. The trackside components may include an acoustic monitoring system node 1 and an acoustic monitoring system node 2, which may be housed individually or together in a trackside box. Each of the acoustic monitoring systems nodes 1, 2 may include an audio analog-to-digital converter ("Audio ADC"), a field-programmable gate array ("FPGA"), and an ARM central processing unit ("ARM CPU"). The Audio ADC may receive the signals from the four MEMS microphones of each trackside frame assemblies 106 via an analog signal. The Audio ADC may convert the analog signal to a digital signal. The FPGA may be used to receive data from the ADC and transfer the data to the ARM CPU in an ARM CPU readable format. The ARM CPU will read in the data from the FPGA and package this data into packets suitable for transfer over the Ethernet Network. The data processed at the trackside components is collected and converted to TCP/IP packets and are then sent to the network field node with PC extension.

The cabinet components may be spaced apart from the trackside frame assemblies 106, and may be housed in an MDS cabinet. The cabinet components may be in communication (e.g., Ethernet, fiber optic communication) with the trackside components and may include a AMS Field Node of the acoustic monitoring system 100. The AMS Field Node may be where the digital signal processing algorithms are executed on the data received from the AMS Data Acquisition Module. In certain instances, the AMS Data Acquisition Modules 1, 2 may be located close to the railroad tracks for the conversion of the analog signals to digital signals, via the audio ADC's. This may be done to reduce noise associated with the signal, which increases when the signal must travel several meters away from the microphones.

The MDS cabinet may additionally include various other cabinet componentry for other monitoring units, such as, for example, a "hot box" device (e.g., hot bearing device ("HBD"), hot wheel device ("HWD") that measures temperature of the wheels and bearings of a passing train. The communication components of a wheel impact load detector ("WILD"), and automatic equipment identification systems, among other systems may also be housed within the MDS cabinet. The MDS cabinet may be centrally located between the various monitoring units so as to provide a central hub for communications between the various monitoring units and wireless networks (e.g., internet). Within the MDS cabinet, and communicably coupled to the various monitoring units may be an Ethernet Switch and a Track Side Personal Computer ("TSPC").

II. Determining a Location of a Sound Source—First Instance

The following description and figures is an explanation of the use of the acoustic monitoring system 100 in locating noise sources in a trackside railroad environment. And, in particular, locating noise sources in a trackside railroad environment using an eight-microphone array.

The Following Methodology is Employed:

1. Define the current microphone configuration.
2. Assign a reference coordinate system over the microphone array that can also be used to reference the noise source locations.
3. Develop a model in matlab to simulate microphone readings from a specified noise source.
   - A. Create a simulated noise source located within the coordinate field.
   - B. Model the microphone array configuration.
   - C. Model the outputs recorded from the simulated noise source for each of the microphones in the array.
4. Develop algorithms to determine the original location of the noise source and the original signal intensity based on the readings from the microphones in the array as inputs.
5. Test various microphone configurations, train speeds and noise source scenarios.
6. Create report.

Figure 19:
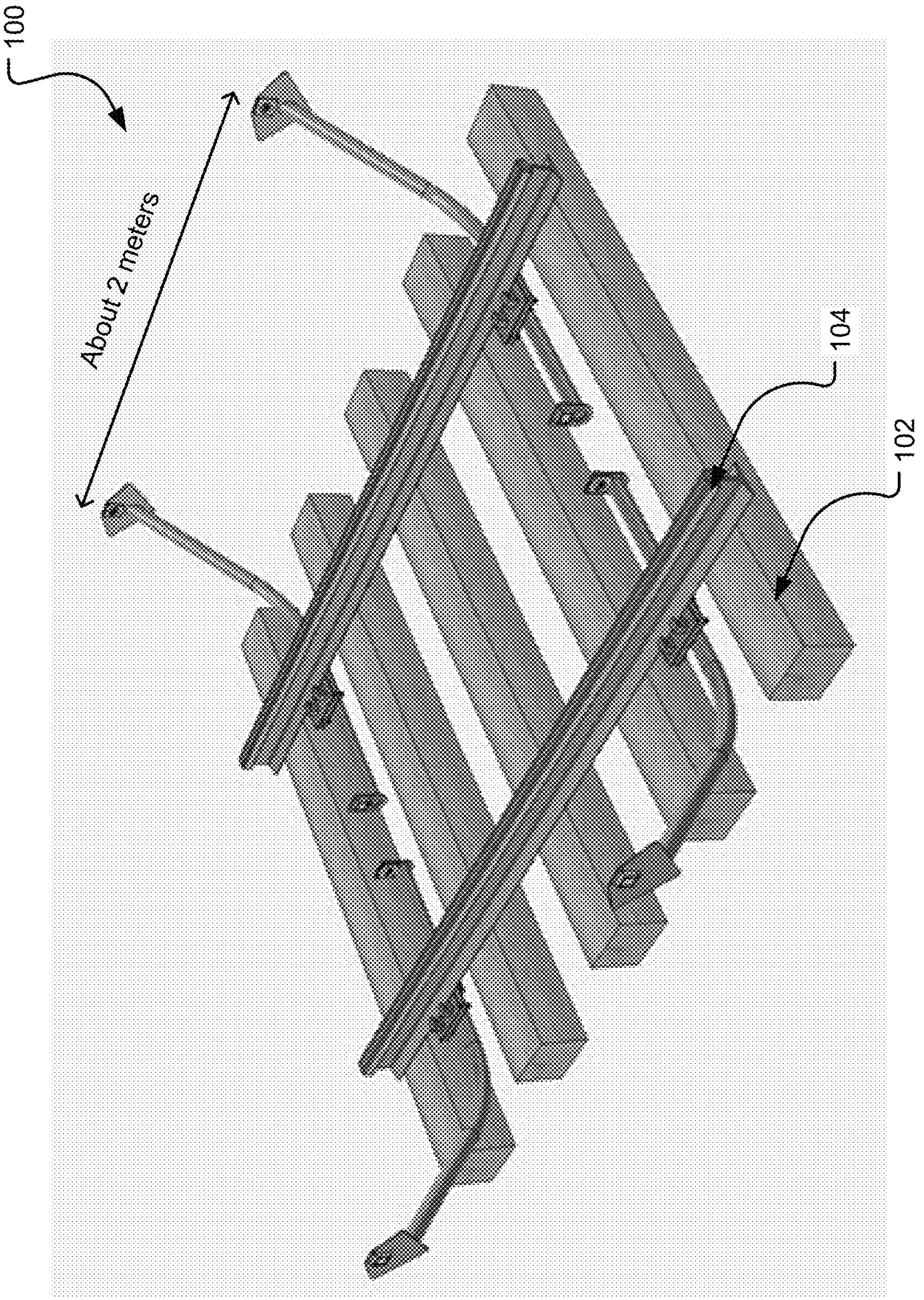
FIG. 19 is an isometric view of two trackside frame assemblies including four outer frame assemblies.

The configuration of the microphone assemblies 114 can be seen in FIG. 19, which depicts four trackside frame assemblies 300 in which each includes an inner or gage-side microphone assembly 114*i*, an outer or field-side microphone assembly 1140, and a frame member 302 coupled to the inner and outer microphone assemblies 114*i*, 1140. In this instance, the frame member 302 is coupled to the base of the rail; however, this discussion is applicable to the inner and outer frame assemblies 112, 110 described previously. The four trackside frame assemblies 300 shown in FIG. 19 are merely exemplary of the use of an eight-array microphone setup to locate a sound.

Figure 20:
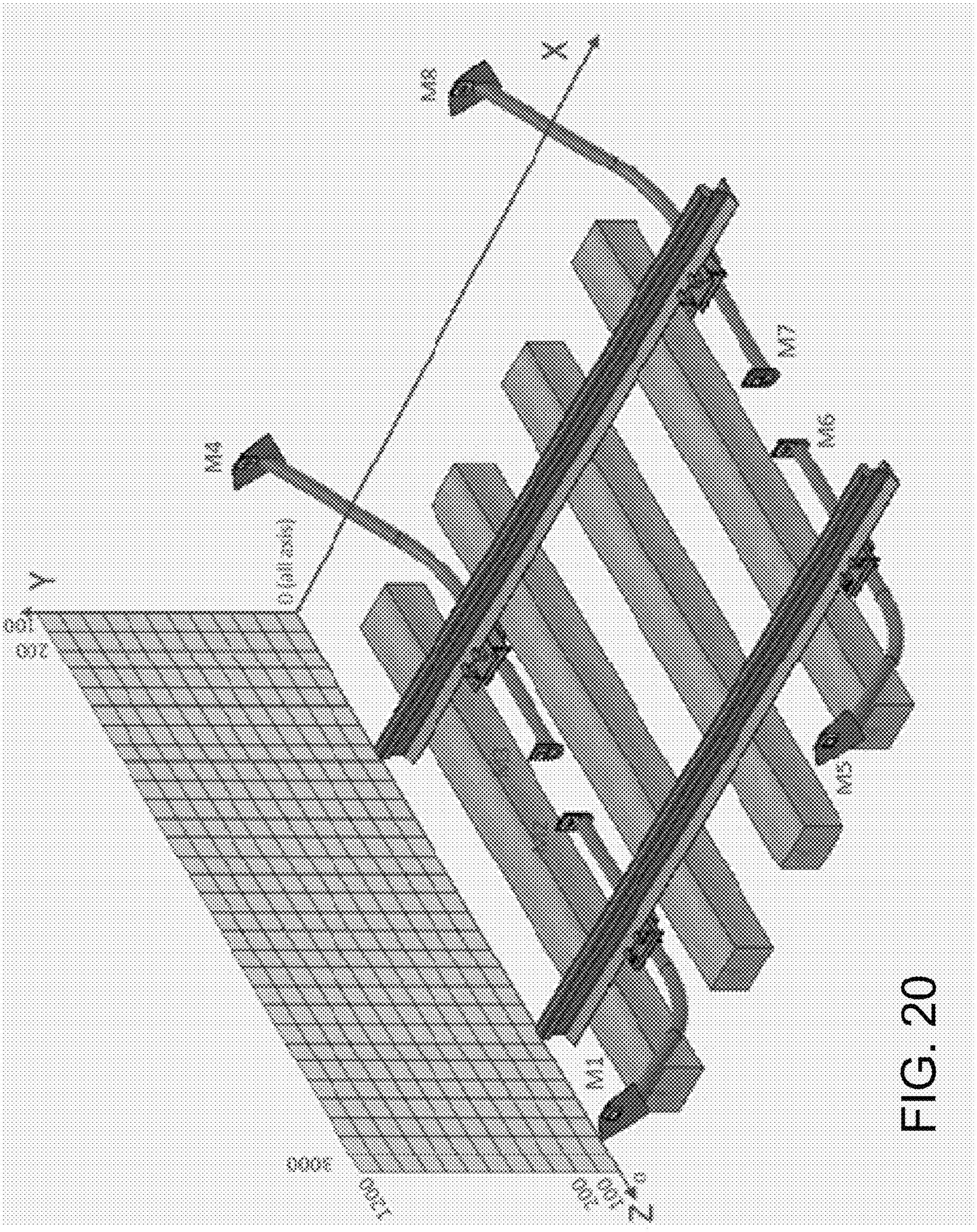
FIG. 20 is an isometric view of two trackside frame assemblies including four outer frame assemblies positioned in an X, Y, Z coordinate system with an identified Y-Z plane.

FIG. 20 depicts a reference coordinate system defined with respect to the acoustic monitoring system 100 in FIG. 19. As seen in the figure, the inner microphone assemblies 114*i* are labeled M2, M3, M6, and M7. The outer microphone assemblies 1140 are labeled M1, M4, M5, and M8. The location of the microphone assemblies M1-M8 are at known locations in the coordinate system. The x-axis is defined as the axis parallel to the rails, the z-axis is defined as perpendicular to (extending transverse to) the rails, and the y-axis is defined as the vertical axis. Each increment in the coordinate system corresponds to 1 millimeter ("mm"). The zone of observance ("ZOO") is defined as 1 meter ("m") before the first microphones M1-M4 along the x-axis, and 1 m after the last microphones M5-M8. The ZOO represents a total of about four meters. Accordingly, the acoustic monitoring system 100 may include sensors positioned about 1 meter down and up the rail from the trackside frame assemblies 300, and that queues up and shuts down the microphones to begin and to stop collecting the acoustic signals associated with the train.

The next step is to simulate a noise source at a predetermined location, and simulate corresponding readings from the microphones M1-M8. Matlab was used to simulate the noise source and the microphone readings. The mathematical model may take into account the time delay and the reduction in intensity between the noise source location and each microphone. The time delay is computed as follows:

$$TimeDelayMicN = \frac{DistanceToMicN}{\text{Speed\_of\_Sound}}$$

Where N represents the microphone number from 1 to 8. The Speed of Sound in air at 20° C. is defined as 343 m/s.

The sound intensity experienced at each microphone M1-M8 is defined by the inverse distance equation:

$$IntensityMicN = \frac{OriginalIntensity}{DistnanceToMicN}$$

Where N represents the microphone number from 1 to 8.

To produce the simulated readings for a noise source traveling through the microphone traveling through the array, the following procedure was followed:

1) A simulated "noise source" is created.
2) The distances between the noise source and each of the microphones are calculated as the noise source travels through the array at a pre-defined speed.
3) The Time Delay between the noise source and each microphone is calculated for each sample position along the direction of travel (x-axis).
4) The noise intensity at each microphone is calculated for each sample position along the direction of travel (x-axis).
5) Using the above calculations, the simulated readings for each microphone are calculated.

Figure 21:
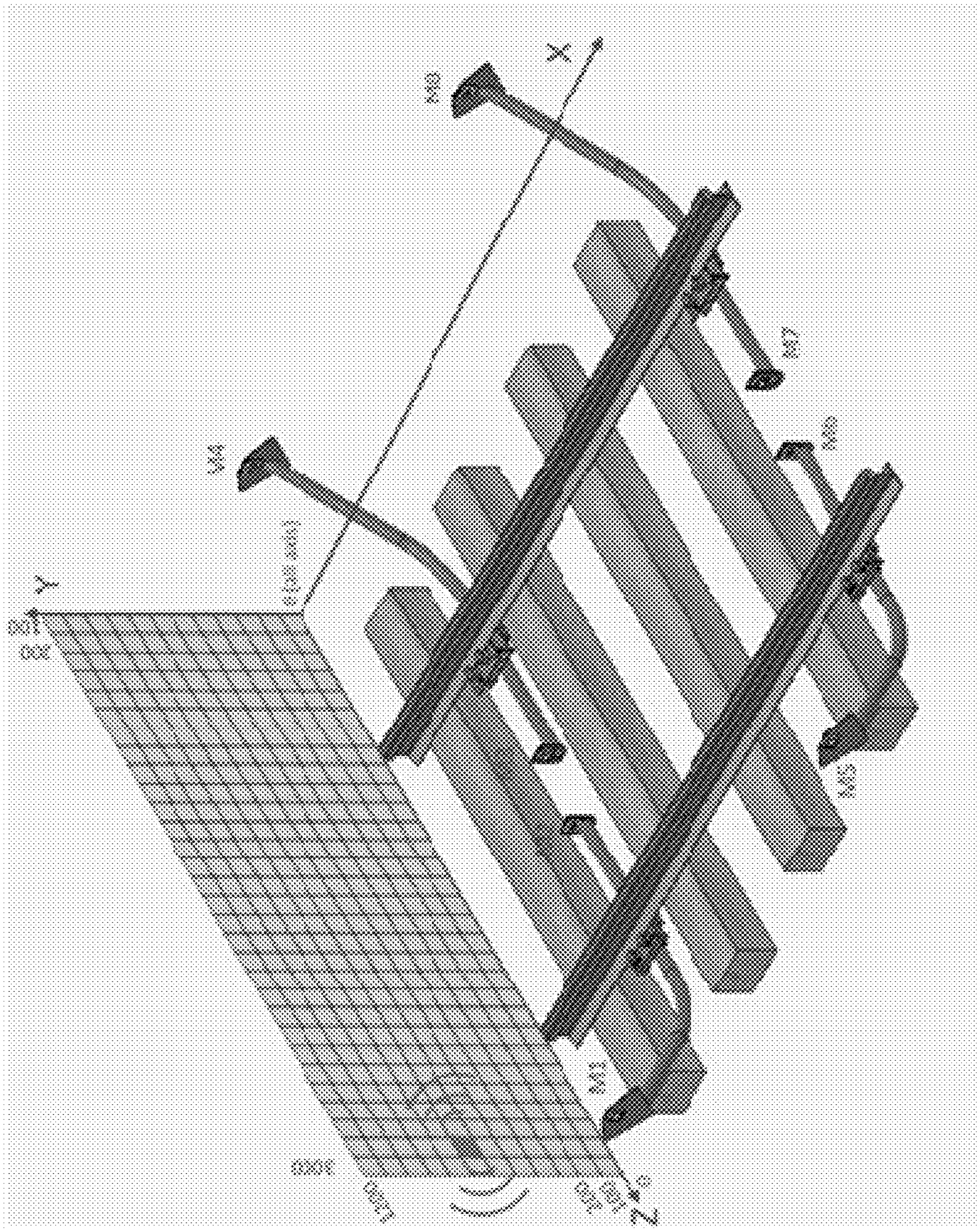
FIG. 21 is an isometric view of two trackside frame assemblies including four outer frame assemblies positioned in an X, Y, Z coordinate system with an identified Y-Z plane, and with a noise source emanating from a point on the Y-Z plane.
Figure 22:
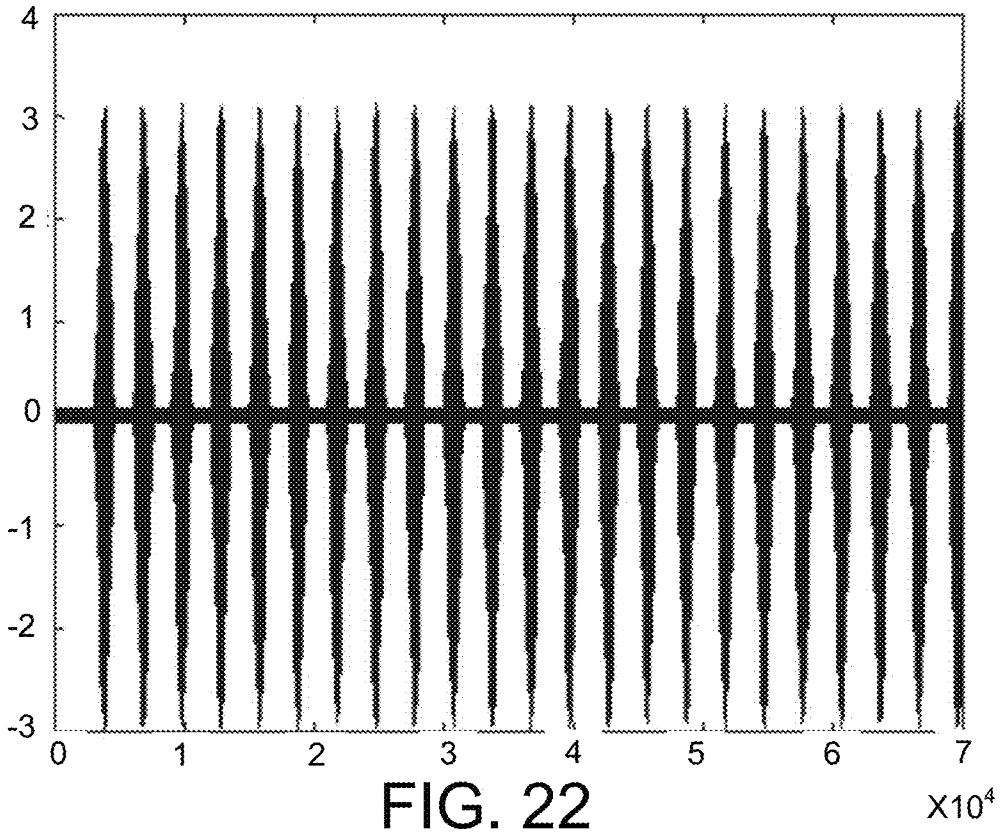
FIG. 22 is a plot of the original noise source emanating from the point on the Y-Z plane.

The original noise source is modeled after a bearing outer race cup defect on a bearing traveling at ~64 km/hr and sampled at 192 k-samples/second. The original noise source location is located at Y=600 mm and Z=2800 mm, shown in green on FIG. 21. FIG. 22 depicts a plot of the original noise source. The impacts shown in FIG. 22 are a result of the rollers passing over an outer race spall.

Figure 23:
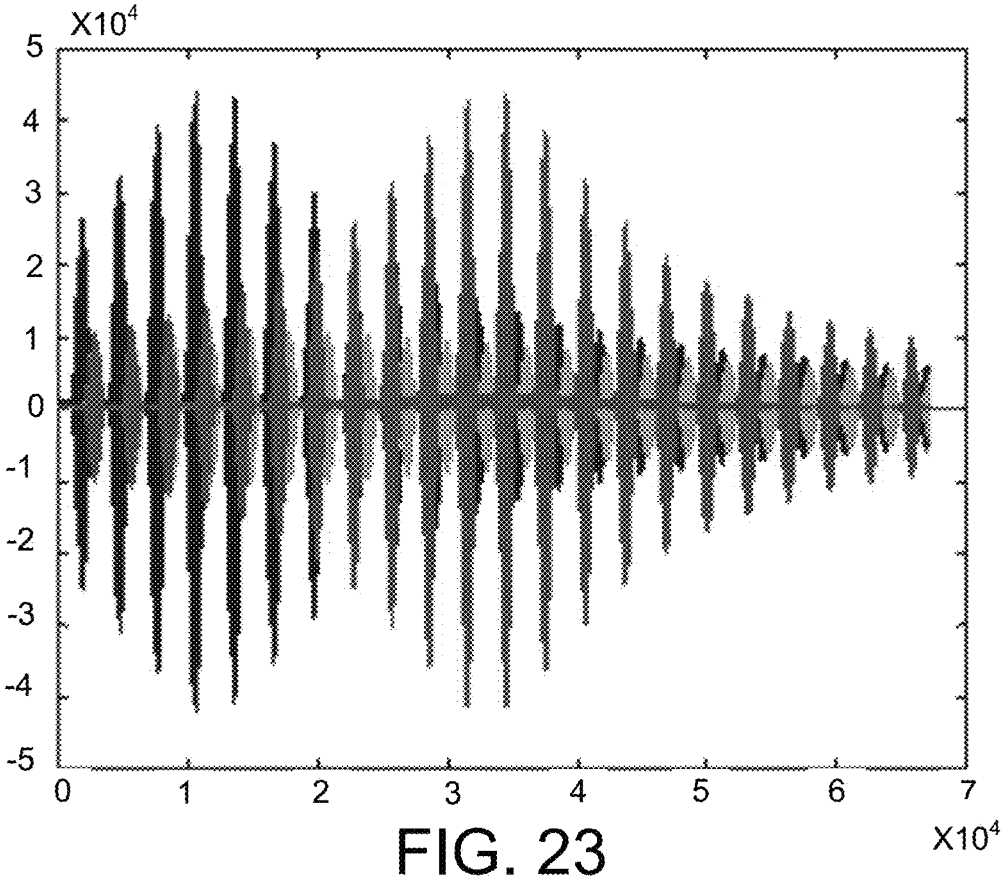
FIG. 23 is a plot of the original noise source emanating from the point on the Y-Z plane as the signal is received by microphones M1, M4, and M5.

After the microphone model is run using the original noise source of FIG. 22, eight vectors representing the readings collected from each microphone M1-M8 are determined as the simulated noise source travels through the eight-microphone array. FIG. 23 depicts three microphone signals plotted on top of each other: M1 is in Blue; M4 is in Green; and M5 is in Red. The use of M1, M4, and M5 are for the purposes of illustration. Microphone signal plots for microphones M2, M3, M6, M7, and M8 may also be calculated and displayed. The change in amplitude and time delay for the various microphones are evident depending on their position in the array.

Determining the location and original intensity of a noise source given a signal plot is based on the time delay and intensity equations: TD=D/c & R=I/D. Where TD is the time delay, D is the distance to the microphone, c is the speed of sound, R is the intensity at the microphone, and I is the original intensity.

A resolution of one millimeter is possible, but such precision may not be necessary in the Y and Z axes. In order to minimize the amount of necessary computation, the resolution may be reduced to 100 mm blocks in the Y and Z axes. Locating noise sources to a higher accuracy may not be valuable. The 1 mm accuracy may be used along the X-axis in order to capture all of the acoustic signals emanating from the axles, and bearings, among other components.

Since the location (x, y, z) of the noise source is an unknown (e.g., as a train passes with a bearing defect or flat wheel), for each millimeter of axle travel, the time delay is computed for all of the 100 mm blocks in the Y and Z axes (i.e., the number of blocks computed is 12×30 equaling 360 blocks total). For each block, the portion of the data is used. Using the Pythagorean theorem the distance from the axle in its current location to each of the microphones may be computed as follows:

$$D = \sqrt{(X - MnX)^2 + (Y - MnY)^2 + (Z - MnZ)^2}$$

Where, X, Y and Z are the current location on the coordinate plane and MnX, MnY, MnZ are the coordinates for each microphone (n=microphone number 1-8).

So, using the readings from 4 microphones, and using the intensity equation R=I/D, the following four equations may be computed, using D*R=1, for four microphones:

$$\sqrt{(X - M1X)^2 + (Y - M1Y)^2 + (Z - M1Z)^2} * RM1_x = I$$
$$\sqrt{(X - M2X)^2 + (Y - M2Y)^2 + (Z - M2Z)^2} * RM2_x = I$$
$$\sqrt{(X - M3X)^2 + (Y - M3Y)^2 + (Z - M3Z)^2} * RM3_x = I$$
$$\sqrt{(X - M4X)^2 + (Y - M4Y)^2 + (Z - M4Z)^2} * RM4_x = I$$

Where X, Y and Z are the coordinates of the original noise source and I is the intensity. MnX, MnY, and MnZ are all known coordinate locations of the microphones, and RM1, RM2, RM3 and RM4 are all known intensity values picked up by the microphones M1, M2, M3, and M4. It can be now seen there are four equations and four unknowns, and the solution can be computed.

Instead of solving in variable form, the solution can be computed numerically. For each location of the axle (along X axis), the above equations (using all eight microphones instead of four) can be computed for each block in the Y-Z grid. Thus, the coordinates of X, Y, and Z, and the intensities at the eight microphones are all known in this calculation; the original intensity is the unknown. The calculation is run for each block in the Y-Z grid, with the value for X (being known) and being the same for all values in the Y-Z plane. The results of the calculations provide values for intensity at each block of the Y-Z plane. Since all the microphones are measuring the same noise source, the coordinate location (X, Y and Z) where the value of original intensity is identical (across all eight equations) is the original location of the noise source.

To determine the correct set of coordinates, the eight computed intensities (one for each microphone for each point in the Y-Z grid (12×30=360 points) is used, and the standard deviation across the eight solutions is computed. The coordinate set (Y-Z) where the standard deviation is the smallest is the solution.

Figure 24:
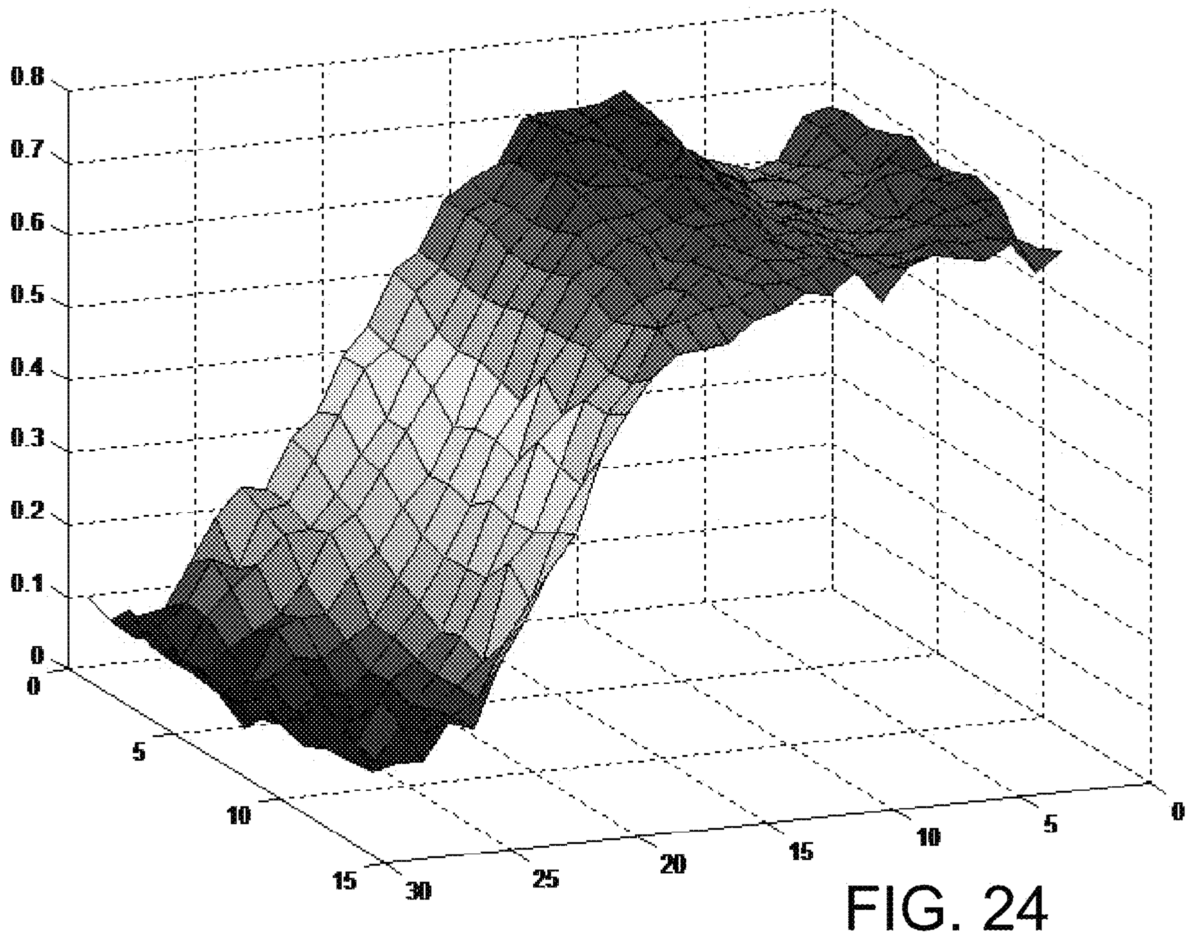
FIG. 24 is a surface plot of standard deviation on the Y-Z plane, where the minimal value of standard deviation is the location of the noise source.
Figure 25:
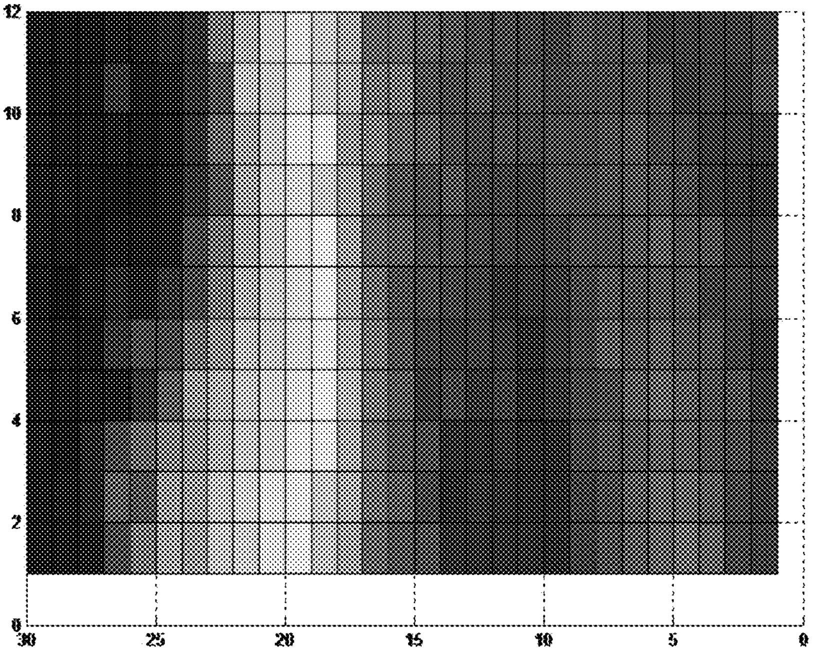
FIG. 25 is a plan view of the surface plot standard deviation, where the darkest blue unit indicates the lowest value of standard deviation, and thus the location of the noise source.

To visually represent the solution, reference is made to FIGS. 24-25, where FIG. 24 is the standard deviations plotted on a surface plot. Returning to the earlier example of the simulated cup defect located a Y=600 mm and Z=2800 mm, the microphone outputs are run through the new algorithm defined above (using Matlab). FIGS. 24-25 are plots of the standard deviations, noting that the minimum value is the likely solution. As seen in the figures, the minimum value occurs at Y=6, Z=28, wherein each coordinate represents 100 mm corresponding to the original location.

Figure 26:
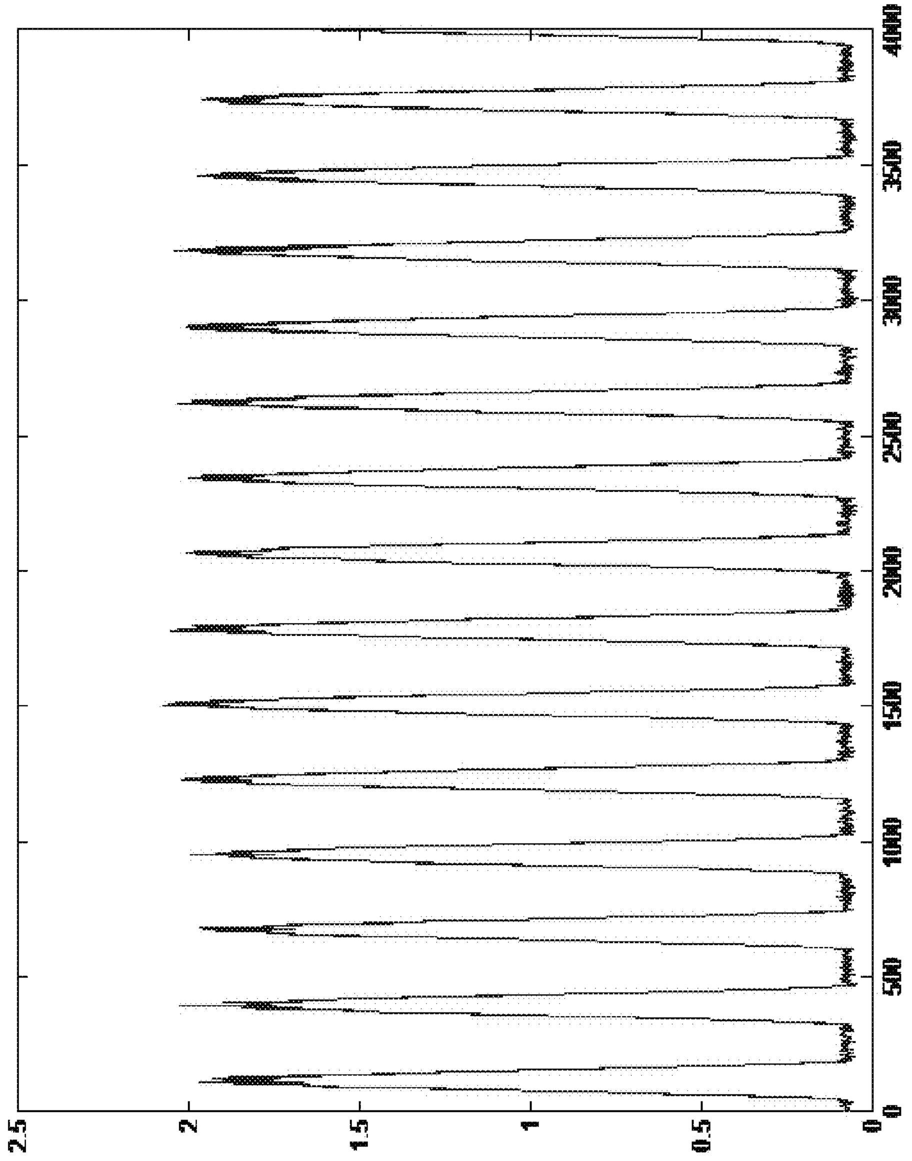
FIG. 26 is the signal calculated from the microphone readings after taking into account time delay and intensity.

The outrace defect signal measured, taking into account the time delay and intensity of the original signal, now that it is known, can be plotted, as seen in FIG. 26. The impacts from the original signal are clear and can be identified by pattern recognition algorithms.

It is noted that the algorithms which pin point the location of the noise source may divide up the field of view into section of about 10 cm by 10 cm. This may reduce the amount of computation necessary significantly and still provide valuable sound location information. In other words, it may not be necessary to pin-point the noise source down to a millimeter in order to be useful in diagnosing a defect. A 10 cm by 10 cm zone may be useful in locating the source of the defect while keeping the amount of hardware required to make the computations (CPU) to a minimum.

Figure 27:
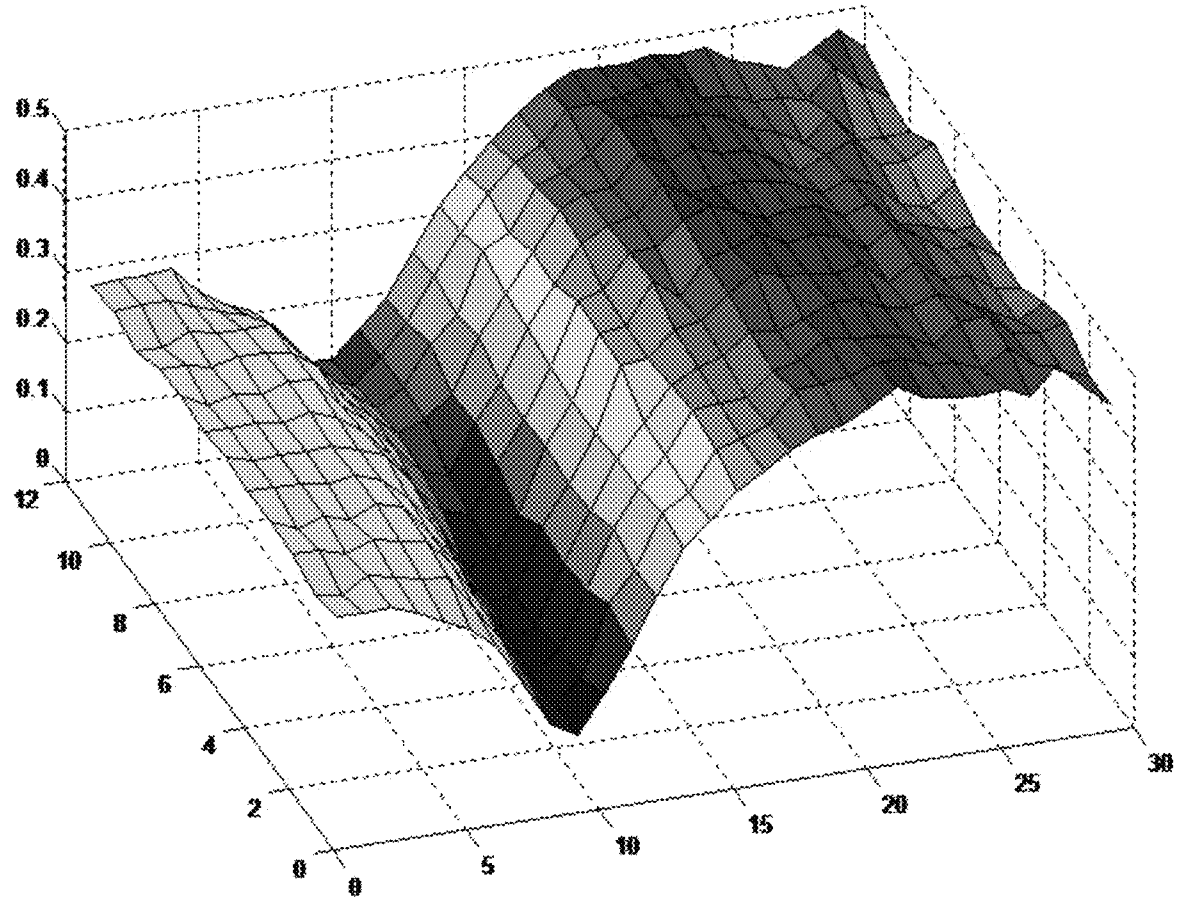
FIG. 27 is a surface plot of standard deviation on the Y-Z plane, where the minimal value of standard deviation is the location of the noise source.
Figure 28:
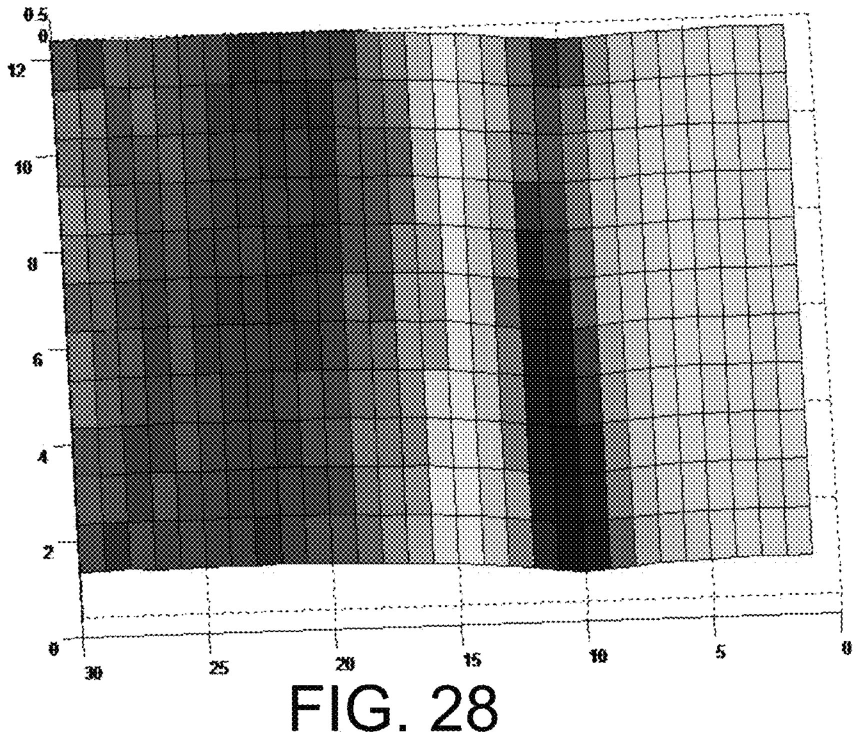
FIG. 28 is a plan view of the surface plot standard deviation, where the darkest blue unit indicates the lowest value of standard deviation, and thus the location of the noise source.

In another example, the noise source is at Y=200, Z=1000 to simulate a flat wheel. FIGS. 26-27 represent the plots of standard deviation along a Y-Z axis, noting the minimum value is the likely solution. Notice the minimum value representing the location of the original noise source is now at Y=2, Z=10 corresponding to Y=200, Z=1000, which is the location of the original input.

Figure 29:
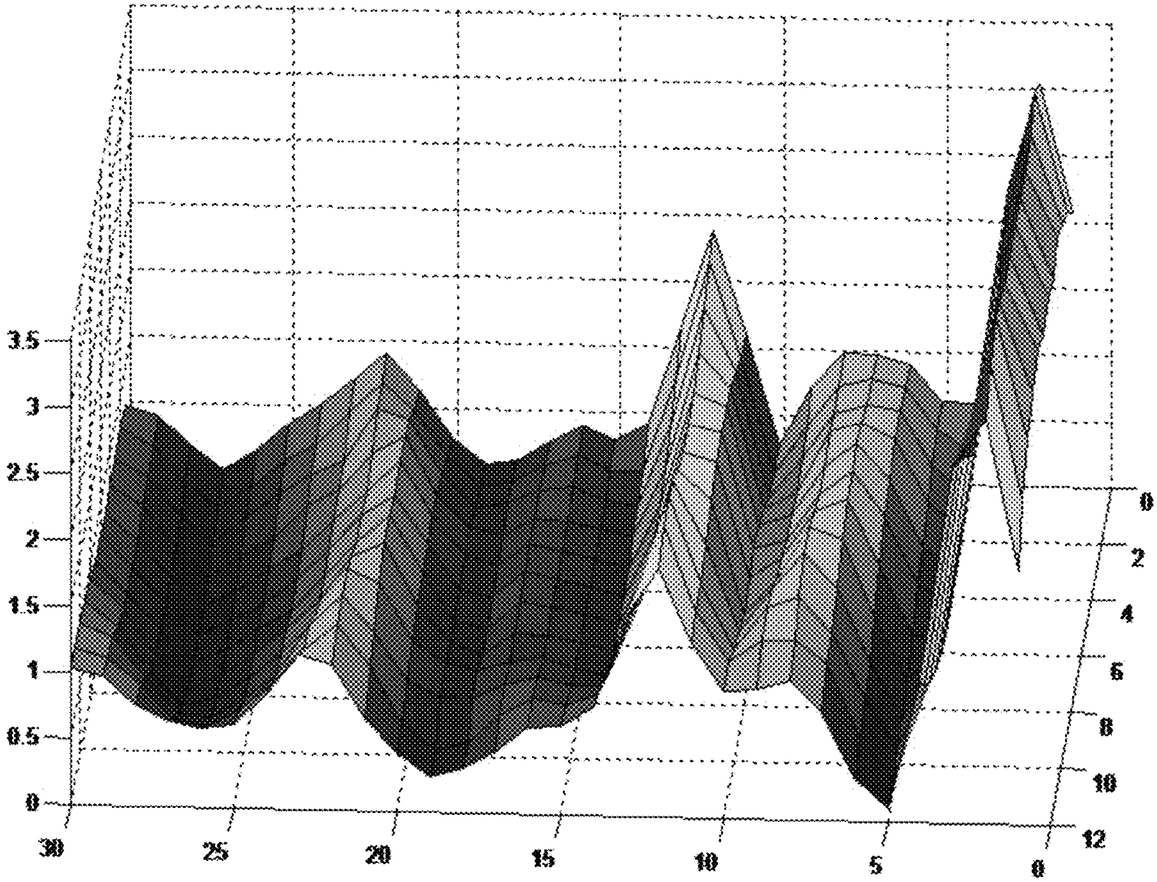
FIG. 29 is a surface plot of standard deviation on the Y-Z plane, where the minimal value of standard deviation is the location of the noise source.
Figure 30:
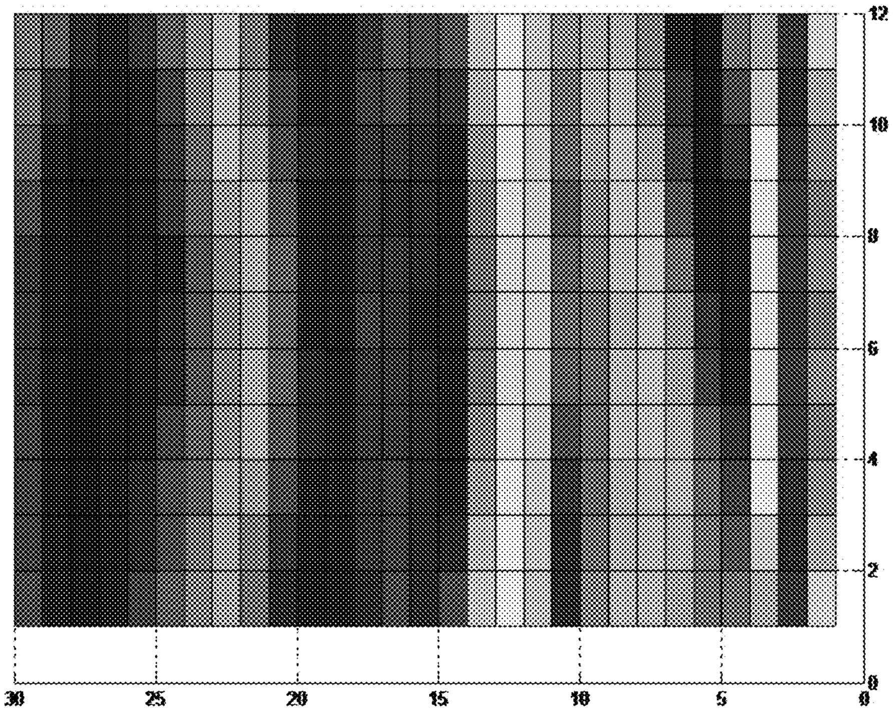
FIG. 30 is a plan view of the surface plot standard deviation, where the darkest blue unit indicates the lowest value of standard deviation, and thus the location of the noise source.

The previous examples calculations were developed with a model assuming a speed of 64 km/hr, but the model can be updated to assume a speed of 321 km/hr. Example plots of standard deviation along a Y-Z axis can be seen in FIGS. 29 and 30.

Figure 31:
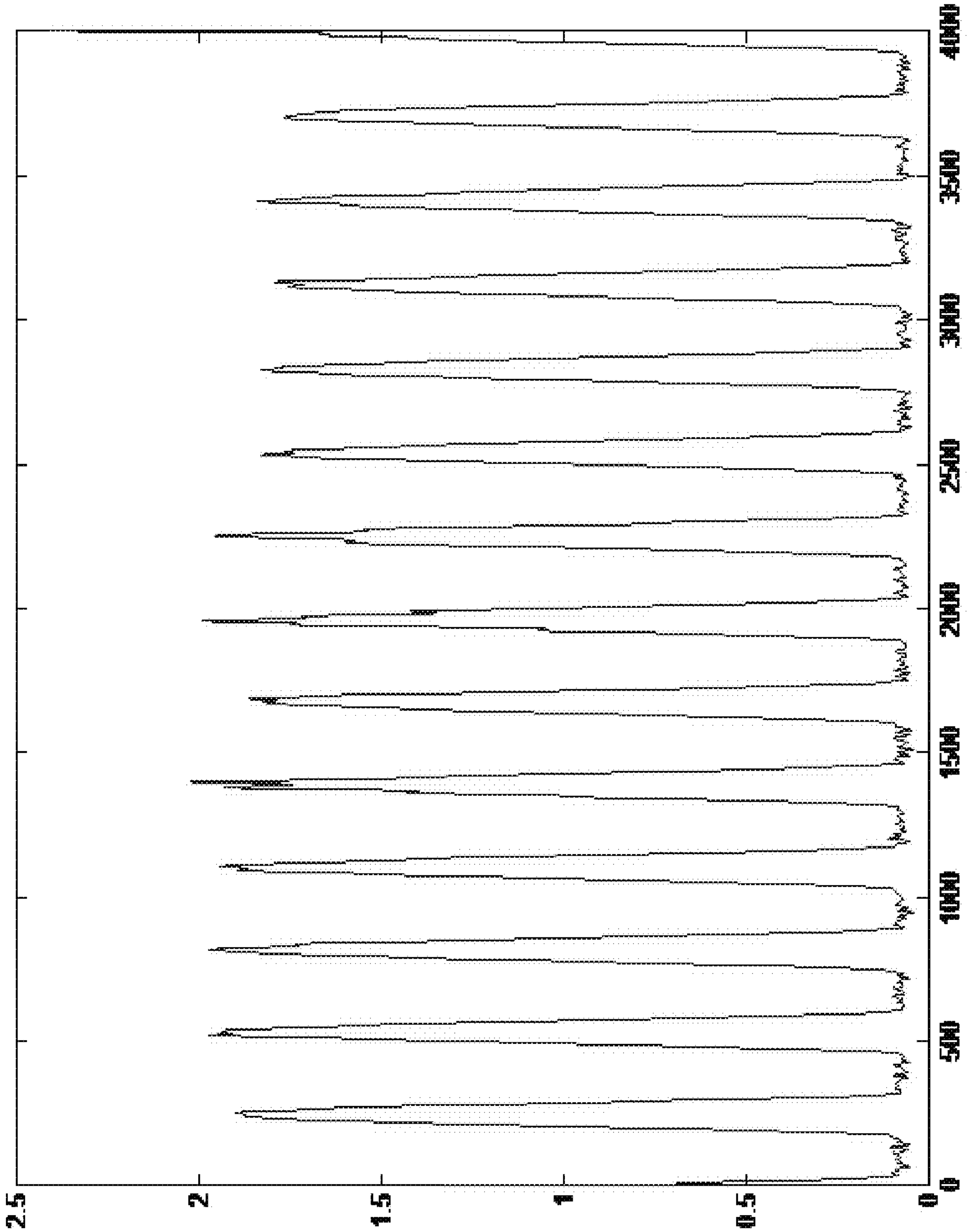
FIG. 31 is the signal calculated from the microphone readings after taking into account time delay and intensity.

Determining the location noise is where the minimum value occurs, which is at Y=6, Z=27 which is very close to the original input of Y=600, Z=2800 mm. The sound level of the defect at this speed is shown in FIG. 31. As seen in the figure, the signal is clear despite the high speed. Thus, the signal may be identified and determined based on pattern recognition algorithms to identify the type of defect present by this signal, and differentiate it from others.

The noise location and type of defect may be computed in the AMS Field Node Computer.

Figure 33:
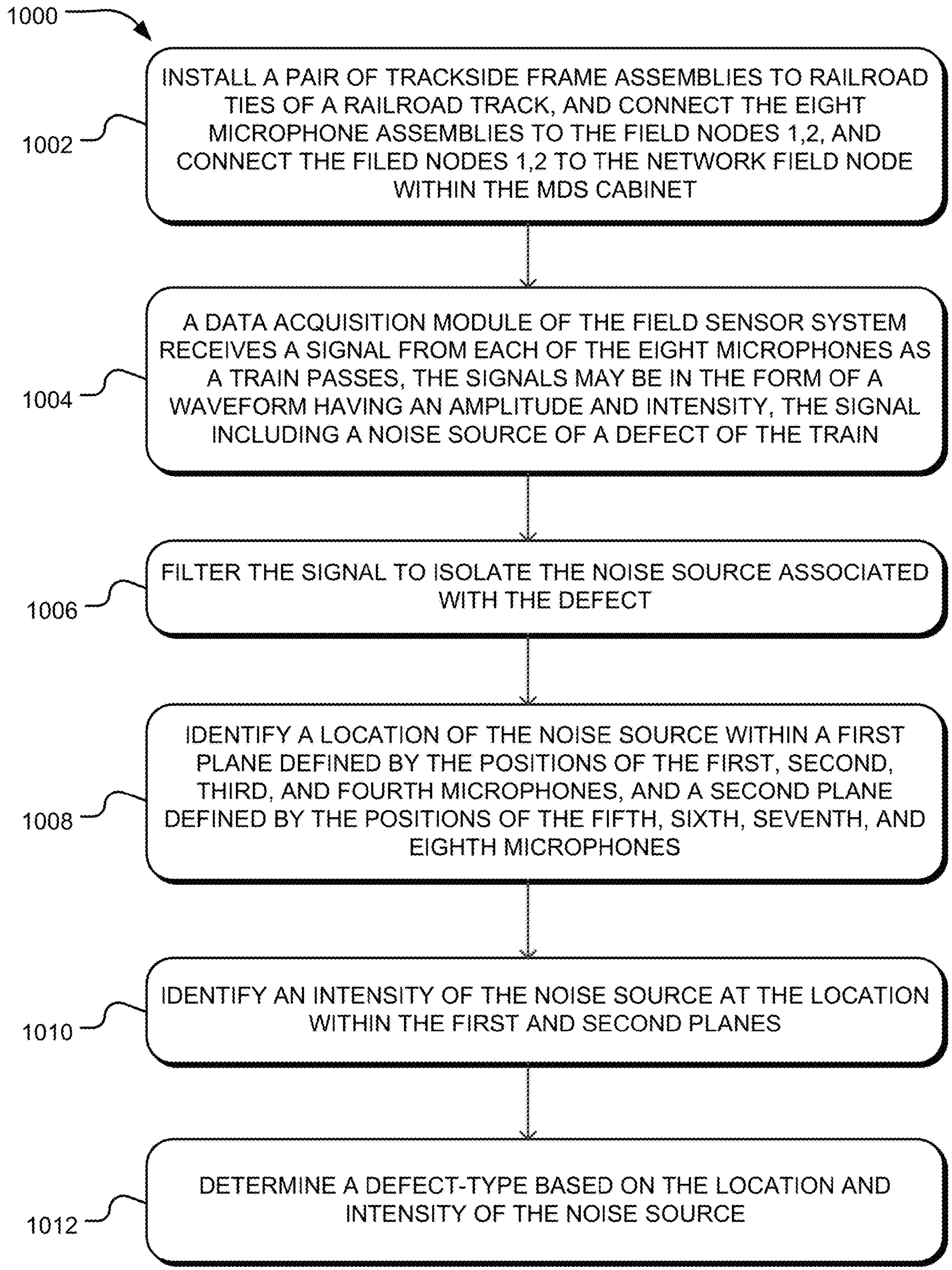
FIG. 33 depicts a first flowchart of exemplary steps of a method of identifying defects in the wheels, and bearings of a passing train with the acoustic monitoring system.

Exemplary steps of a method 1000 of using the acoustic monitoring system 100 are shown in FIG. 33. In certain instances, the method 1000 may be a computer-implemented method. In certain instances, the method 1000 may be provided as a computer program product, software, or computerized method that may include a non-transitory machine-readable medium having stored thereon instructions, which may be used to program a computer system (or other electronic devices) to perform a process according to the present disclosure. As seen in FIG. 33, step 1002 of the method 100 may include installing a pair of trackside frame assemblies 106 to railroad ties 102 of a railroad track 104, as seen in FIG. 1. This step 1002 may include connecting the eight microphone assemblies 114 to the field nodes 1, 2, sitting trackside and connecting the field nodes 1, 2 to the network field node within the MDS cabinet, as seen in FIG. 18. This step 1002 may include aligning the eight microphone assemblies 114 in two planes of four microphones assemblies 114 each. The planes may extend transversely across the railroad tracks 104 and vertically. By having the microphone assemblies 114 arranged at various heights so as to define a plane, the location and intensity of a noise source associated with a defect of the train can be identified within the plane.

Step 1004 may include a AMS Data Acquisition Module which may receive a signal from each of the eight microphone assemblies as a train passes. The signal may be an analog signal in the form of a waveform having an amplitude which relates to sound intensity. However, the signal may be in another form such as a digital signal stream. The signal may include a noise source of a defect of the train (e.g., roller or race defect, bearing cup, flat wheel, axle defect), among other noises associated with a passing train.

Step 1006 may include filtering the signals to isolate the noise source associated with the defect from the general noise associated with the passing train.

Step 1008 may include identifying a location of the noise source within the first plane defined by the positions of the first through fourth microphone assemblies. The step 1008 may also include identifying a location of the noise source within the second plane defined by the positions of the fifth through eighth microphone assemblies. Step 1010 may include identifying an intensity of the noise source at the location within the first and second plane. These steps 1008 and 1010 may also include identifying the location of the noise source and intensity thereof at a plurality of planes between the first and second planes so as to define a waveform of the noise source. In this way, the general nature of the waveform (e.g., cyclical impulse, single impulse, synthesized impulse), and its amplitude, wavelength, may be determined.

Step 1012 may include determining a defect-type based on the location and intensity of the noise source. This step may include comparing the waveform to a database of waveforms having known defects. Additionally or alternatively, this step may include using pattern recognition algorithms to identify the defect-type based on the amplitude, wavelength, and intensity, among other factors, of the waveform.

The defect-type may be communicated through a network to a train operator, or engineer for possible immediate maintenance or otherwise. This type of defect identification may be combined with other monitoring systems, as shown in FIG. 18. For example, the acoustic monitoring system 100 described herein may combined with a "hot box" device (e.g., hot bearing device ("HBD"), hot wheel device ("HWD")) that measures temperature of the wheels and bearings of a passing train, a wheel impact load detector ("WILD"), and/or an automatic equipment identification system, among other systems. In this way, the acoustic monitoring system 100 may be combined with a hot box device, for example, to identify locations of potential defects before they are triggered by an HBD or HWD. In certain instances, information regarding a potential defect as identified by the acoustic monitoring system 100 may be sent to the HBD and/or HWD systems so the areas of the potential defect can be more intently scrutinized. Information from both the acoustic monitoring system 100 and the HBD and/or HWD and/or WILD (i.e., to detect flat wheels and wheel profile measurements) may be combined to provide a comprehensive check to the "health" of a particular bearing, axle, or wheel.

As an example, if particular system detected a flat wheel, the acoustic monitoring system 100 may ignore this particular flat wheel so as to not falsely detect a defect, and the system 100 may increase the sensitivity of the algorithms to detect other potential defects. As another example, if a system 100 detects a defect, and a different system having a thermal sensor detects the bearing has a higher temperature than normal, the system 100 may elevate the severity and confidence of the defect pick.

It is noted that the system 100 is capable of detecting defects that come from the center of locomotives (and distinguish the defects from those of bearings and wheels). Locomotive drivetrains and engines are two areas of a locomotive with potential defects. Noise patterns associated with defects of locomotive engines and drivetrains may be developed, and algorithms may be used to detect the defects, in a similar way to how bearing and wheel defects are detected.

The system 100 described herein is capable of real-time data processing. The system 100 may include wheel sensors located at either end of the trackside frame assemblies (at the ends of the zone of observance). In certain instances, the wheel sensors may be located about one meter away from the trackside frame assemblies. When a wheel of the train goes over the wheel sensor, the signal is received and the system 100 may start capturing the acoustic data for that particular axle. The system 100 may continue to observe and record the signal until the same wheel contacts the other wheel sensor at the end of the system 100. The data may then be processed and the results may be stored. This may happen continuously as the train moves past the microphone assemblies 114 until all of the axles have been processed.

The system 100 may utilize precision time protocol (PTP) to timestamp the wheels when they cross the wheel sensor. The timestamps may be used to synchronize the wheel event with the data being collected from the microphones. The timestamps can be used to determine the position of the axles of the train relative to the microphones such that the distance between the microphones and axles are known. To determine the position of each axle relative to the microphones, the system 100 takes the signal measurements from the microphones and "time stamps" them in real time. Additionally, the times when an axles passes a wheel sensor are measured by a position measurement system (e.g., wheel sensor) are "time stamped" in real time. The position of the wheel sensors relative to the microphones are known and fixed.

Using the two wheel sensors, the speed and position of each passing axle can be determined. Both systems (wheel sensors, and acoustic monitoring system 100) are synchronized precisely in real time (i.e., jitter smaller than 10 μsec) with PTP based Ethernet (IEEE 1588 Precise Time Protocol). After the axle passes through the last wheel sensor, the PC which calculates the position of noise sources is able to assign the noise to a particular position of the train by aligning the information with the same time stamp or defined distances of time stamps.

III. Determining a Location of a Sound Source-Second Instance

The following description and figures is an explanation of the use of the acoustic monitoring system 100 in locating noise sources in a trackside railroad environment, and identifying the failure mode or potential failure mode associated with the wheels, bearings, or axles, among other components of a train wheelset. And, in particular, the following describes locating noise sources in a trackside railroad environment using an eight-microphone array.

Figure 34A:
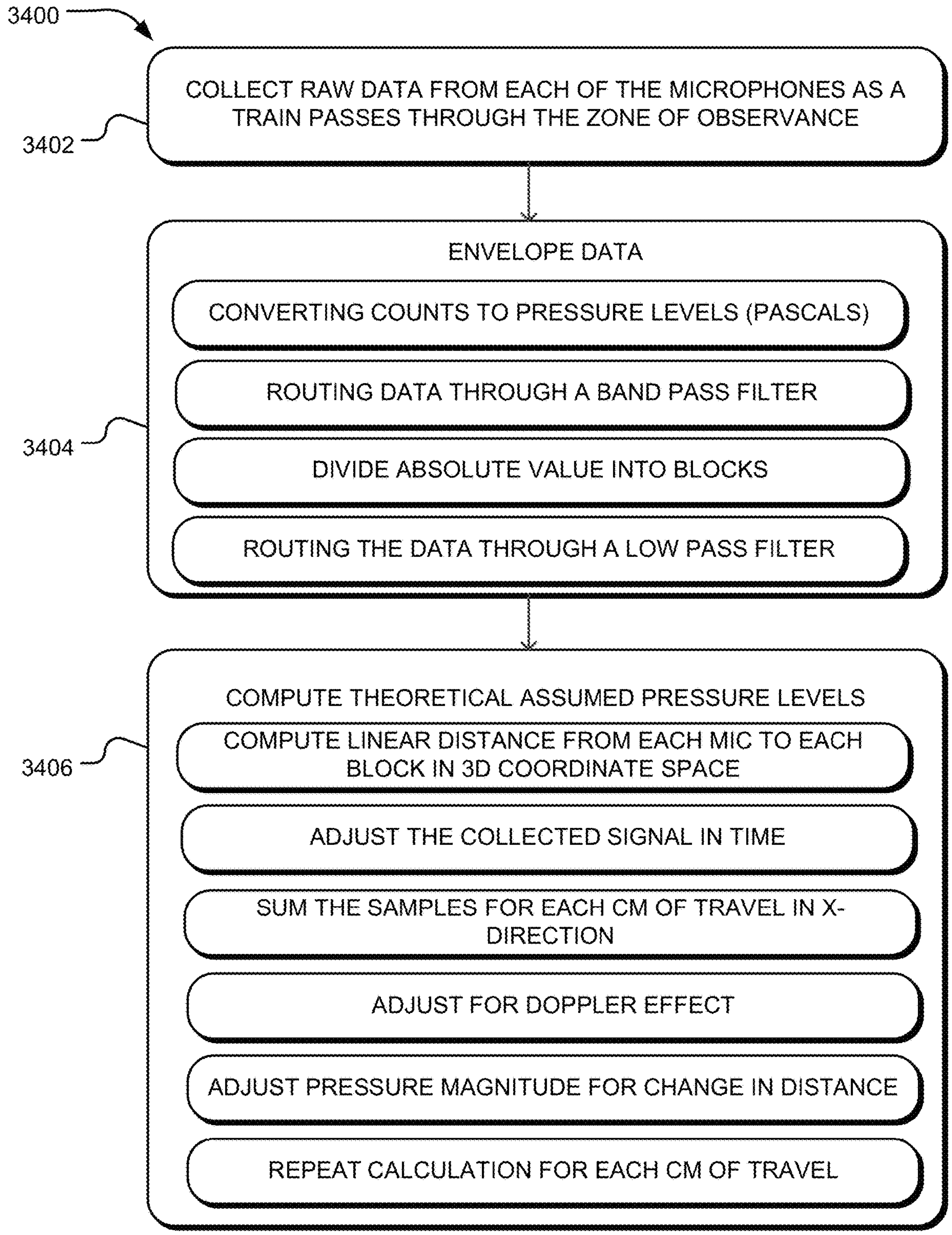
FIGS. 34A and 34B depicts a second flowchart of exemplary steps of a method of identifying defects in the wheels, and bearings of a passing train with the acoustic monitoring system.
Figure 34B:
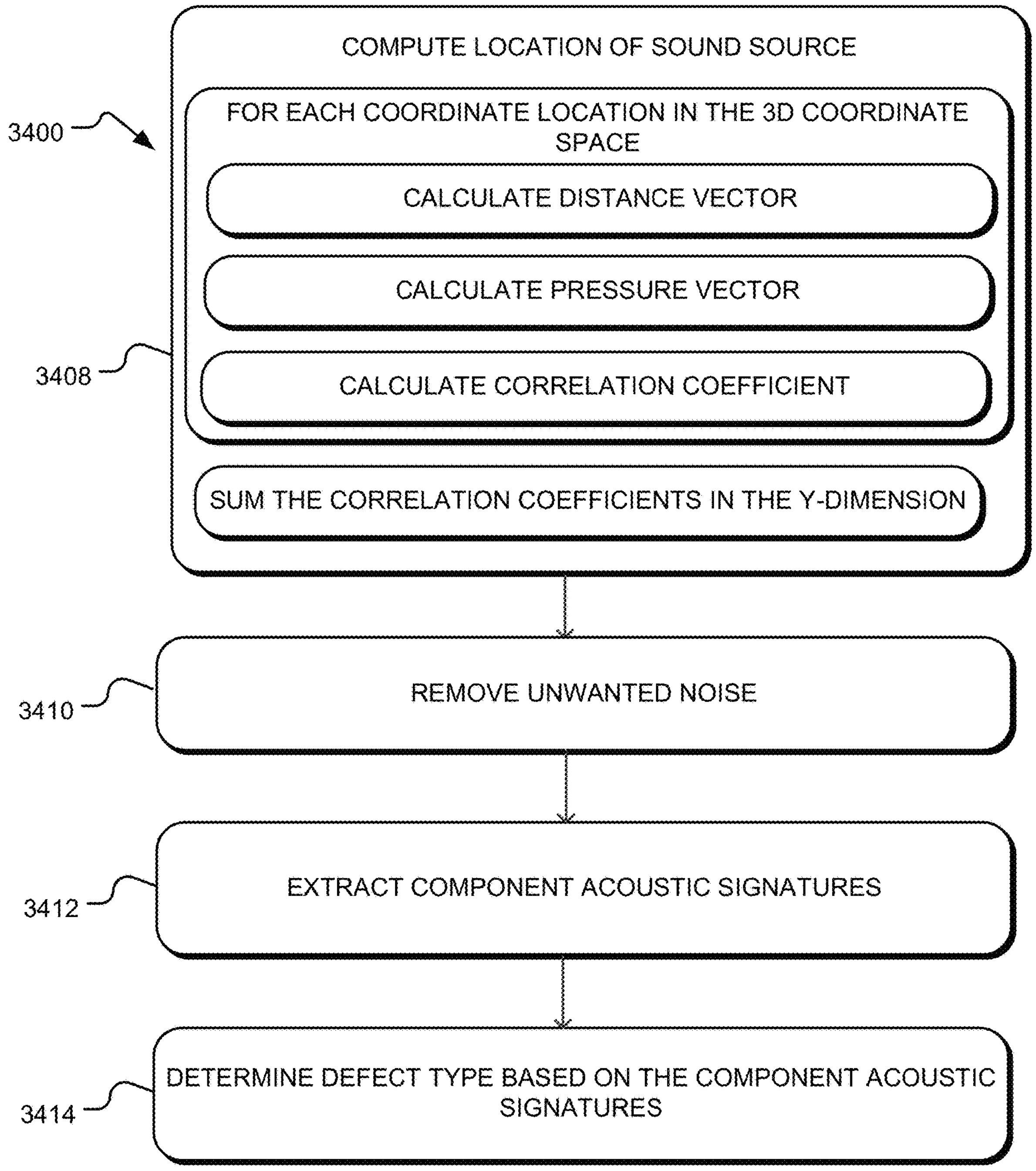

FIGS. 34A-34B depict a method 3400 of locating a sound source and diagnosing a defect based on the sound source from a passing train using the acoustic monitoring system 100 described herein. The method 3400 may include the steps previously described without limitation; and the previous method may include the steps discussed in this section.

Figure 35A:
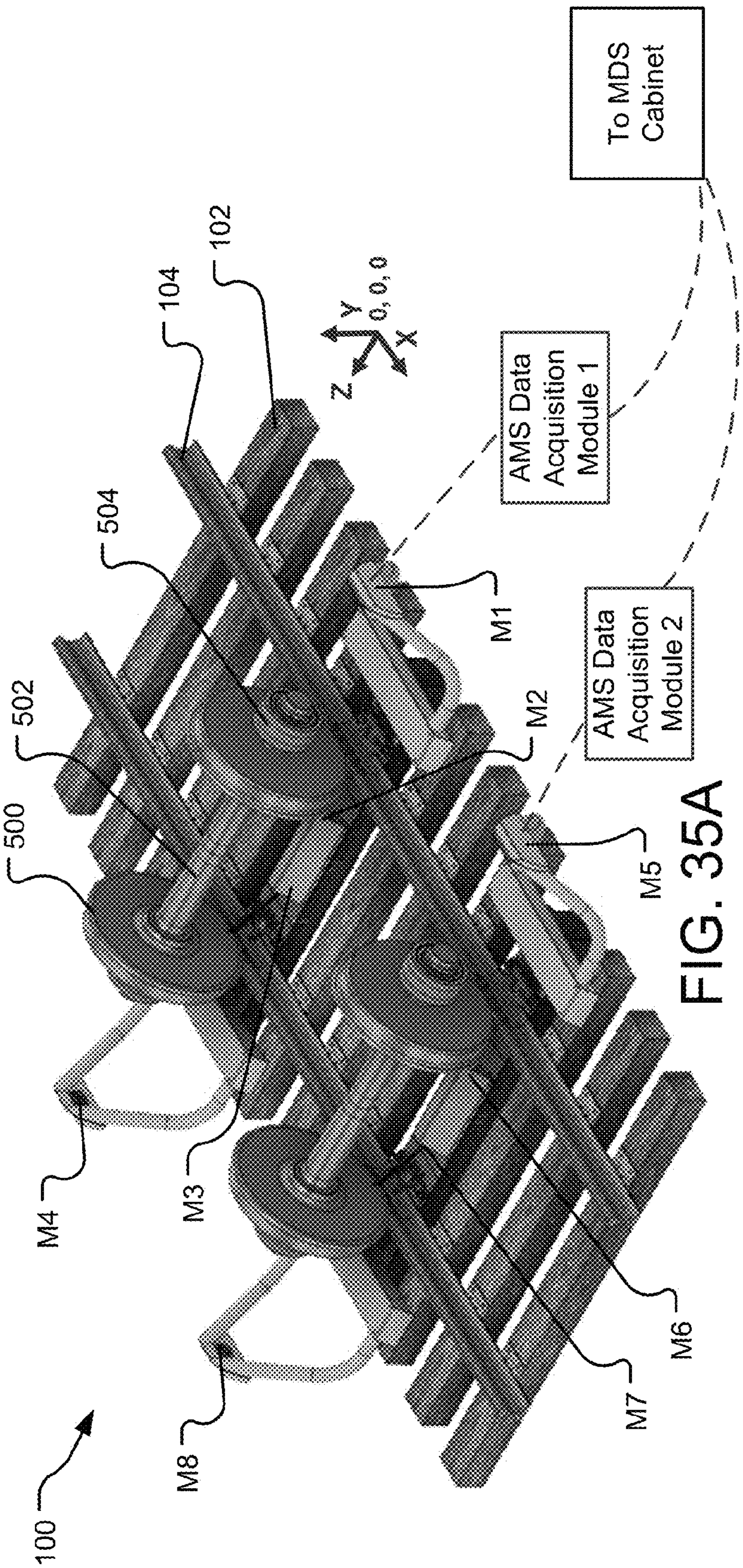
FIGS. 35A-35C depict, respectively, isometric, longitudinal, and side views the acoustic monitoring system positioned around railroad tracks.
Figure 35B:
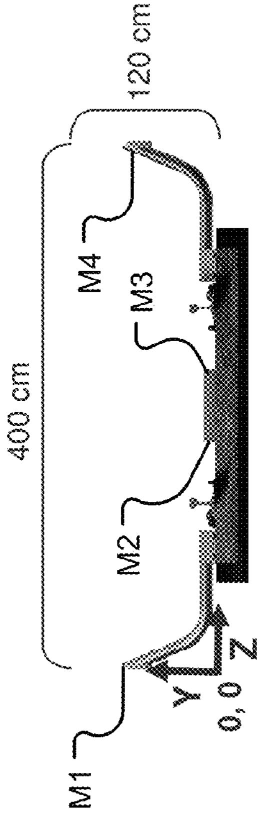
Figure 35C:
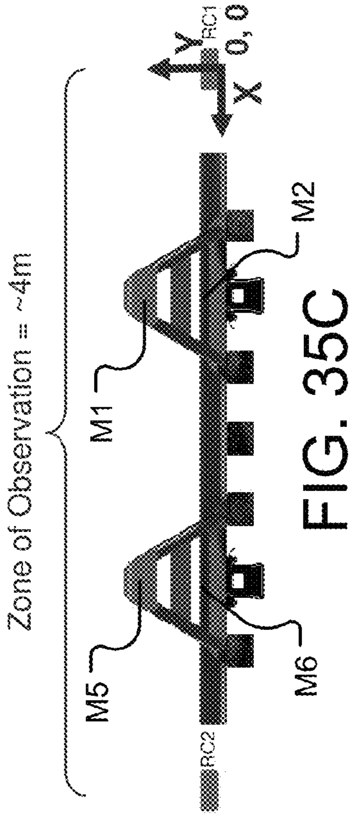

The method 3400 described in FIGS. 34A-34B is performed with the acoustic monitoring system 100 employed at along tracks of a railroad, as shown in FIG. 35A-35C. FIGS. 35A-35C are, respectively an isometric view, a side view, and a longitudinal view of the acoustic monitoring system 100 coupled to the ties 102 of a railroad track 104, and employed to acoustically monitor the wheels 500, axles 502, and/or bearings 504 of a passing train for defects. A coordinate system or space (x, y, z) is shown in the figures relative to the railroad track 104 and passing wheels 500, axles 502, and bearings 504. The microphone assemblies 114 (also referred to as microphones) are labeled M1, M2, M3, M4, M5, M6, M7, and M8, and will be referred to herein as such.

Figure 36:
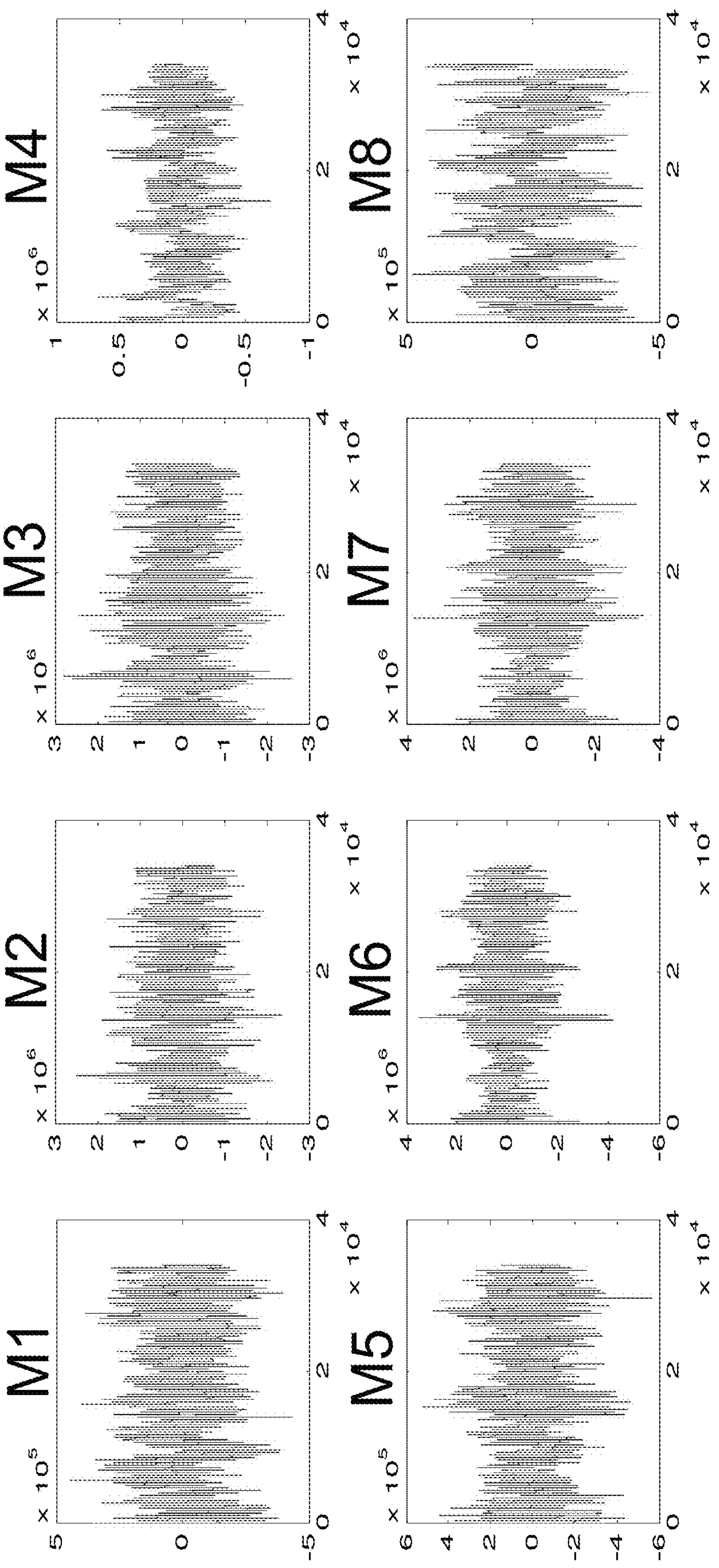
FIG. 36 depicts graphs of raw or unfiltered, acoustic wave data recorded by eight microphone assemblies of the acoustic monitoring system.

To begin, the method 3400 of FIG. 34A may include collecting raw data from the eight microphones as a train passes at step 3402. The raw data or signals may be in the form of an acoustic waveform having an amplitude and intensity. Within the raw data is the noise source associated with a defect in a train, among other noises that may complicate the determination of a defect within the noise source. Collecting the raw data at step 3402 may include storing the raw data at the data acquisition module of the field sensor system or at another location within the system or outside the system (e.g., remote server). Graphs of the raw data for the microphone assemblies M1, M2, M3, M4, M5, M6, M7, and M8 are shown in FIG. 36. Each of the graphs includes amplitude on the vertical-axis and time on the horizontal-axis. The particular graphs in FIG. 36 show the results of raw voltage data routed through an analog-to-digital ("AD") converter with a 24 bit AD card. The counts on the vertical axis are representative of a voltage signal. The graphs of raw data from microphones M4 and M8 depict a defect which will be discussed subsequently.

The graphs in FIG. 36 shows the raw data signal as a train passes within the zone of observation, which is shown in FIG. 35 as being about four meters long, and encompasses all of the microphone assemblies. The acoustic monitoring system 100 may include sensors (rail contacts or wheel sensors) at the terminal ends of the zone of observance that signal the beginning and end of a wheelset moving into the zone of observance. The zone of observance may be used subsequently to define a three-dimensional coordinate system as the acoustic wave data received from a passing train occurs within the zone of observance. And each of the microphone assemblies M1-M8 have a known position within the zone of observance.

Figure 37A:
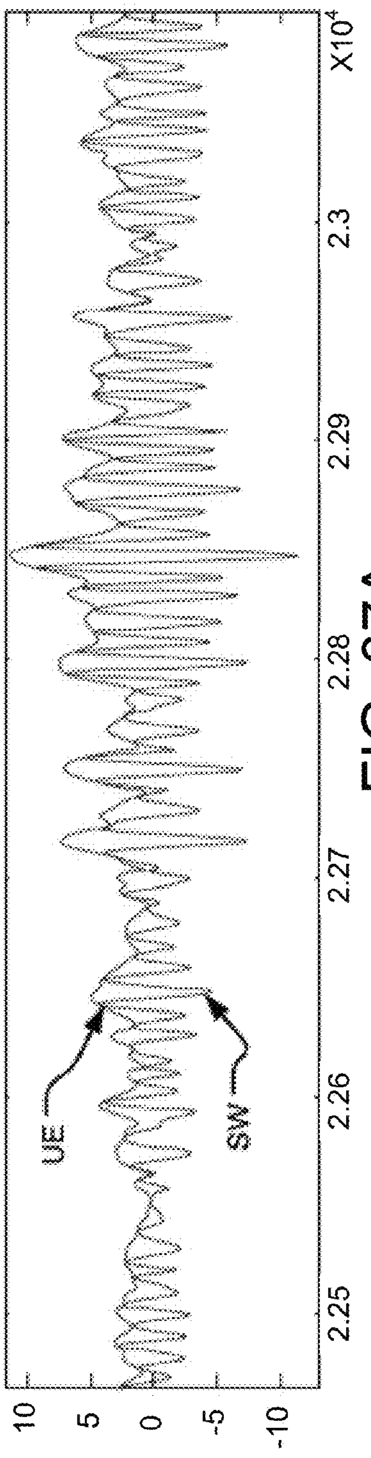
FIG. 37A depicts an exemplary graph of enveloped wave data
Figure 37B:
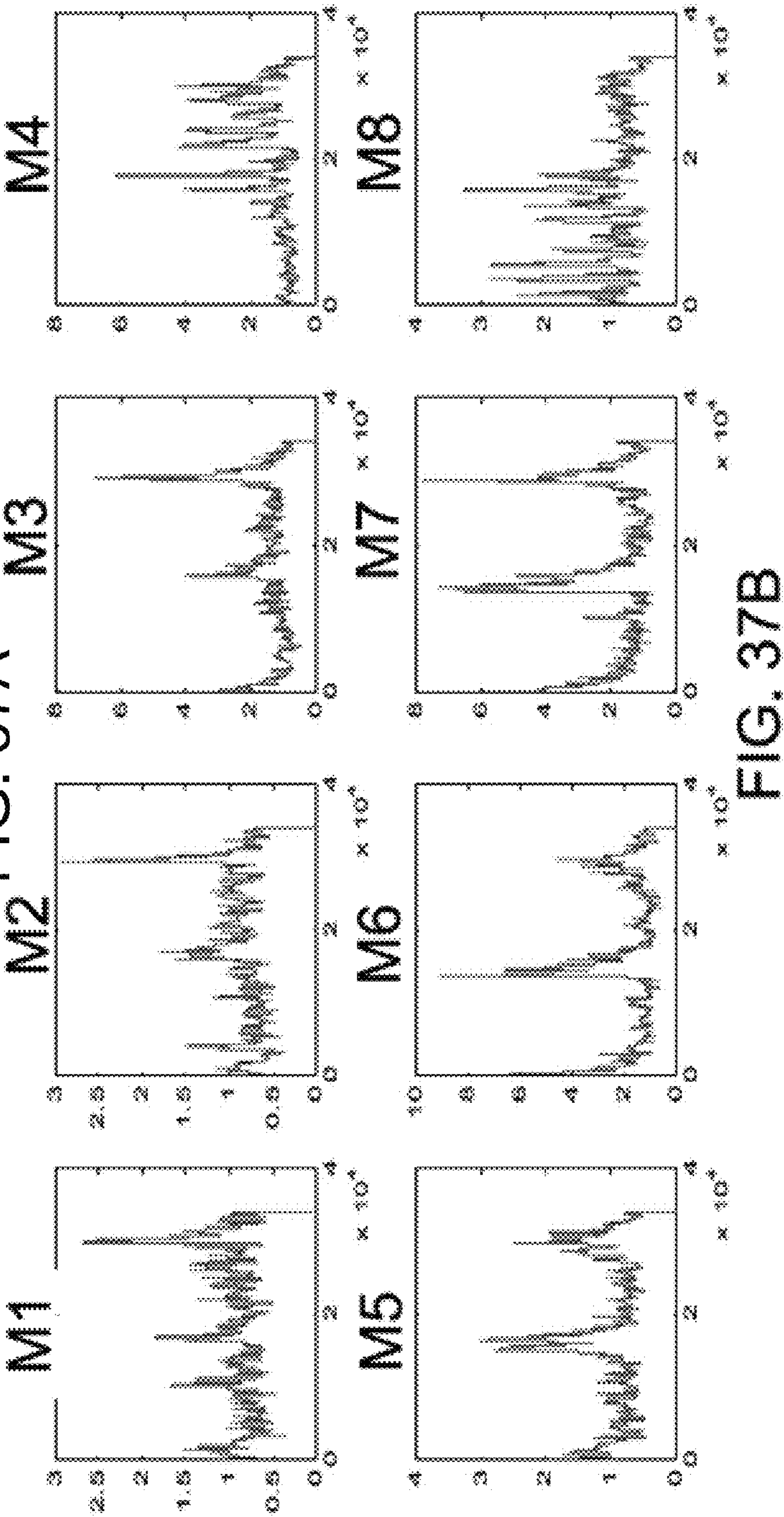
FIG. 37B depicts graphs of enveloped wave data for the eight microphone assemblies of the acoustic monitoring system.

Referring back to FIG. 34A, at step 3404, the raw data may be processed for easier use. Processing the raw data may include enveloping the data. FIG. 37A shows a sample waveform SW with an upper envelope UE overlaid thereon. FIG. 37B shows the enveloped data for each microphone assembly M1-M8. This can be contrasted with the raw data for each microphone assembly shown in FIG. 36. Step 3404 may include converting the "counts" to a unit of pressure or stress (e.g., Pascals). The step may include routing the raw data through a band pass filter (BPF) to isolate a certain frequency range while attenuating frequencies outside the isolated range. The step may include dividing absolute values into blocks. The step may also include routing the raw data through a low pass filter (LPF) which passes signals with a frequency lower than a cutoff frequency and attenuates signals with frequencies higher than the cutoff frequency.

The method 3400 of FIG. 34A may next include computing theoretical assumed pressure levels (also referred to as theoretical pressure levels) for all points within a three-dimensional space representing potential origin points of a noise source from a passing train, at step 3406. The theoretical pressure levels are calculated for all points within the three-dimensional space for each microphone assembly M1-M8, making this calculation a four-dimensional ("4D") array of pressure levels or values: PL(x, y, z, M). In the 4D array, PL is pressure level, x,y, z are coordinate locations within the three-dimensional space, and M refers to microphone assembly. Therefore, the 4D array provides pressure levels for each microphone assembly M1-M8 at each of the x, y, z coordinate locations.

Given the signals or pressure levels collected by each microphone assembly, and the known location of each microphone assembly, theoretical pressure values can be determined within a three-dimensional space, assuming (for the purposes of calculation because the true location of the noise source is yet undetermined) that each point within the three-dimensional space is the origin point of the acoustic pressure measured at the respective microphone assembly M1-M8. At step 3408 of the method 3400 of FIG. 34A, to be described subsequently, the system 100 will determine an actual location of the sound/noise source based in part on the theoretical pressure levels. At this point in the method, each point within the three-dimensional space is assumed to be the origin of the noise source.

The following equations may be utilized in the determination of the theoretical pressure levels.

$$D=\sqrt{(X-MnX)^2+(Y-MnY)^2+(Z-MnZ)^2}$$

$$TimeDelayMicN=\frac{DistanceToMicN}{\text{Speed\_of\_Sound}}$$

$$PressureMicN=\frac{OriginalIntensity}{DistnanceToMicN}$$

$$\sqrt{(X-M1X)^2+(Y-M1Y)^2+(Z-M1Z)^2}*RM1_x=I$$

$$\sqrt{(X-M2X)^2+(Y-M2Y)^2+(Z-M2Z)^2}*RM2_x=I$$

$$\sqrt{(X-M3X)^2+(Y-M3Y)^2+(Z-M3Z)^2}*RM3_X=I$$

$$\sqrt{(X-M4X)^2+(Y-M4Y)^2+(Z-M4Z)^2}*RM4_x=I$$

$$\sqrt{(X-M5X)^2+(Y-M5Y)^2+(Z-M5Z)^2}*RM5_X=I$$

$$\sqrt{(X-M6X)^2+(Y-M6Y)^2+(Z-M6Z)^2}*RM6_x=I$$

$$\sqrt{(X-M7X)^2+(Y-M7Y)^2+(Z-M7Z)^2}*RM7_x=I$$

$$\sqrt{(X-M8X)^2+(Y-M8Y)^2+(Z-M8Z)^2}*RM8_x=I$$

In the above equations, D is the linear distance from a particular microphone Mn to a point of an assumed sound source location within the three-dimensional ("3D") coordinate system. X, Y, and Z are the coordinate points for assumed sound source location. I is the original intensity of the sound. MnX, MnY, and MnZ are all known coordinate locations of the microphones within the 3D coordinate system, and RM1 through RM8 are all known pressure values picked up by the microphones M1 through M8. The values for pressure can be found within the enveloped data for each microphone, shown in FIG. 37B.

Figure 38A:
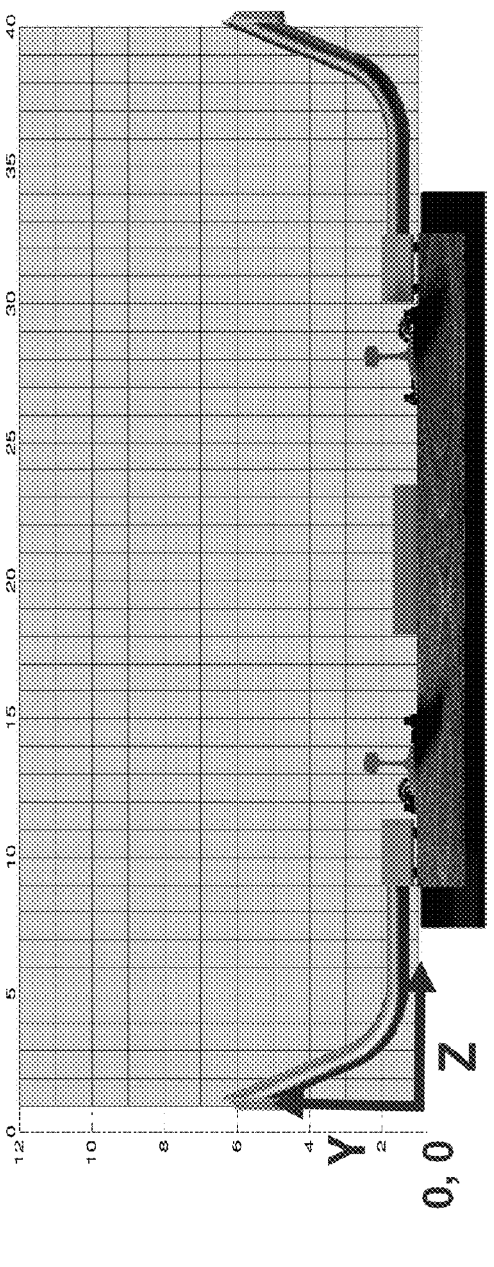
FIG. 38A depicts the Y-Z plane of a three-dimensional coordinate system defined within a zone of observation of a passing train.

A 3D coordinate system may be defined, as shown in FIG. 38A. FIG. 38A shows the Y-Z plane or grid with values of 12 centimeters ("cm") on the vertical Y-axis, and 40 cm on the horizontal Z-axis. As seen in the figure, the microphone assemblies are positioned within the 3D coordinate system. For each sampled pressure level of each microphone assembly M1-M8, the linear distance to each block within the 3D coordinate system is computed according to the equation for D. The collected signal can be adjusted in time based on the equation for TimeDelayMicN. The samples may be summed for each cm of travel in the X-direction. This may be done for many reasons. First, it provides a consistent vector length (e.g., about 450 cm in this case), which makes downstream processing easier. Second, it makes data speed independent which also makes downstream processing easier. The results may be adjusted for Doppler effect. This may be done with standard Doppler equations that adjust the time-of-flight computation for each of the signals computed in the 4D array. Noise sources traveling towards a particular point (e.g., a microphone) are compressed in time, and noise sources traveling away from a point expand; thus, the use of the Doppler equations. The pressure magnitude (Pascals) may be adjusted for the change in distance according to the equation for PressureMicN, stated above. And the calculation may be run again for each centimeter of travel in the X-direction. This will provide a dynamic view of the pressure levels of the noise source within a Y-Z plane throughout all points on the X-axis.

Figure 38B:
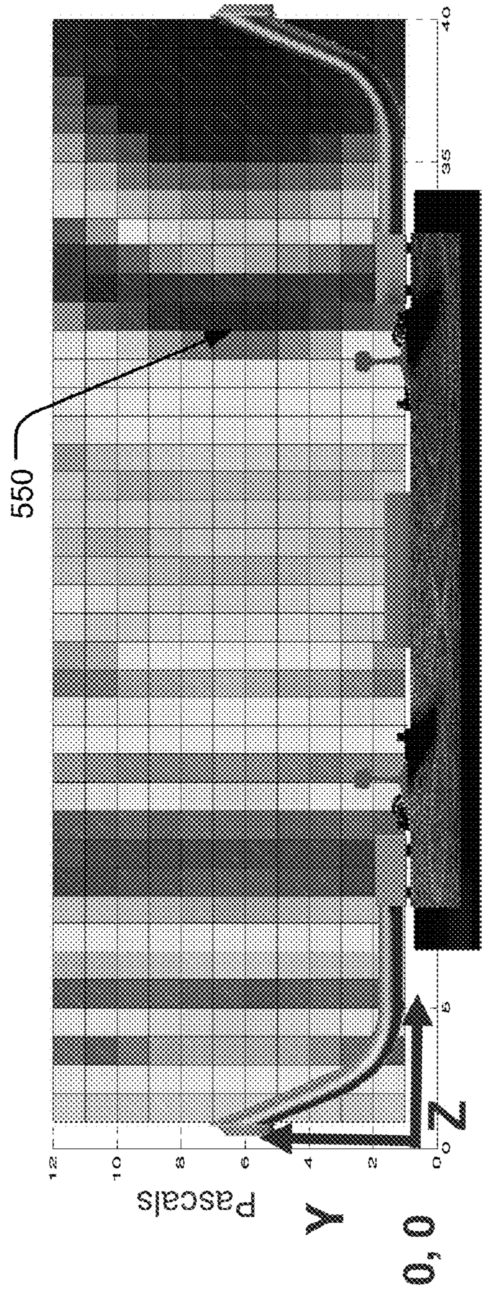
FIG. 38B depicts the Y-Z plane of the three-dimensional coordinate system at point 250 along the X-axis and with respect to the pressure levels recorded by microphone assembly M4.

FIG. 38B shows the same Y-Z grid as FIG. 38A, except the Y-Z grid is positioned 250 cm along the X-axis from the origin point, and the Y-Z grid of FIG. 38B includes a color graph showing the greatest pressure 550 at the darkest red points. It is noted that the X-axis is along the longitudinal axis of the rails, or in the direction of travel of the passing train. The graph label indicates it measures pressure PL at coordinate (250, : , : , 4); this means 250 cm along the X-axis, Y and Z are within the range provided on the grid, and the color-coded pressure levels are shown as recorded by microphone M4. The darkest red points 550 on the graph correspond to the location of the highest pressure.

Figures 38C, 38D:
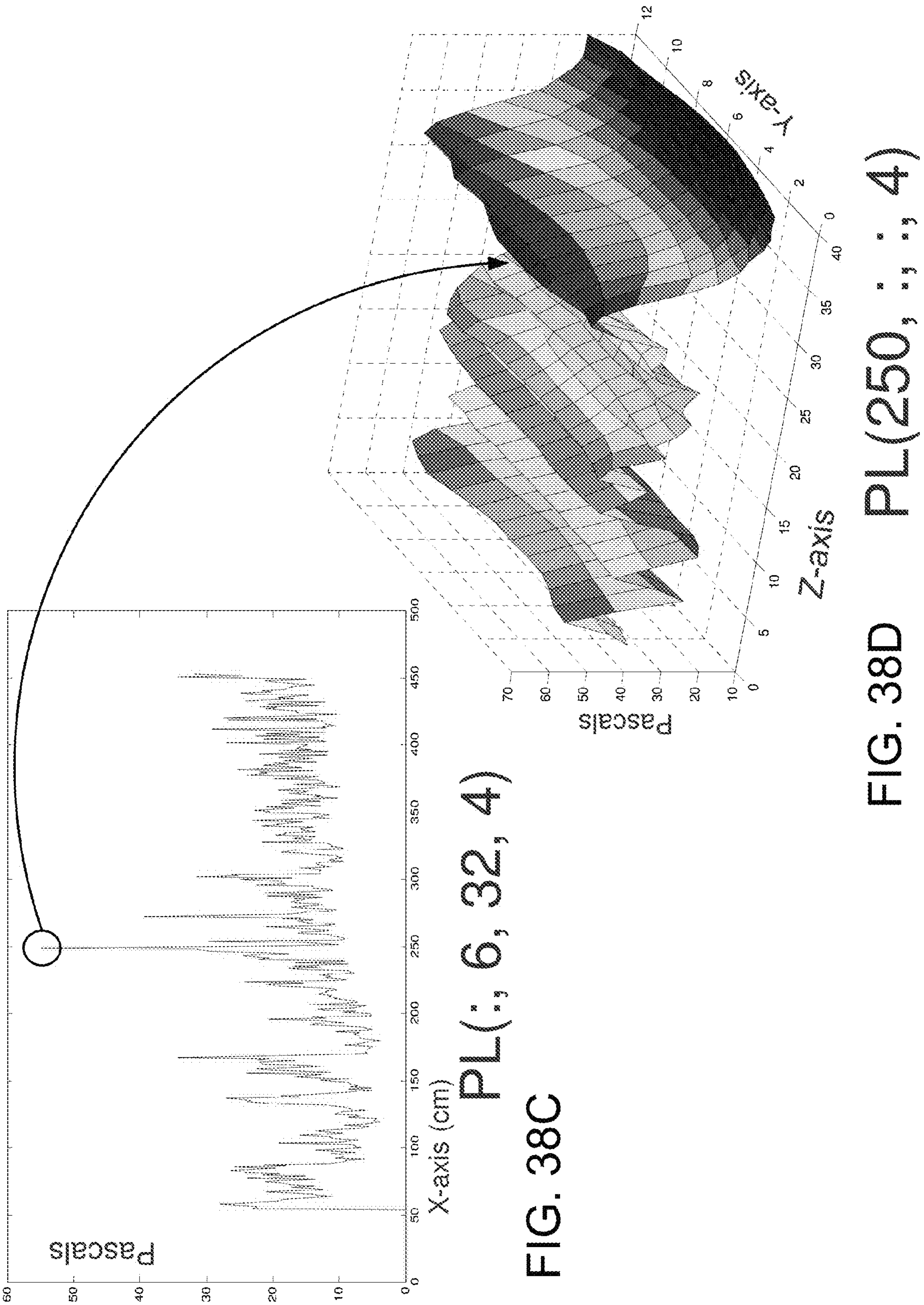
FIG. 38C depicts a graph of pressure versus distance along the X-axis at point (6, 32) in the Y-Z plane, and with respect to microphone assembly M4.
FIG. 38D depicts a three-dimensional graph of the Y-Z plane with values of pressure shown in color and shown on a vertical axis.

FIG. 38D illustrates the same data shown in FIG. 38B, except in a three-dimensional graph with values of pressure (Pascals) of microphone M4 shown. It can be seen in the graph the value of the highest pressure 550 is the darkest red. This highest pressure point 550 is also referenced in FIG. 38C on a pressure location graph at 250 cm along the X-axis. It can be seen from the graph label that the pressure location PL includes all points on the X-axis, point 6 on the Y-axis, point 32 on the Z-axis, and data taken from microphone M4. The data of pressure versus position on the X-axis, as shown in FIG. 38C, can be used to find areas of high pressure, such as at 250 cm along the X-axis.

It can be appreciated that the graph of FIG. 38C is for a single point within the Y-Z plane, point (6, 32), and for a single microphone assembly M4. The entire data set of the 4D array for eight microphone assemblies M1-M8, and for a 3D coordinate system of (400, 12, 40) represents over 1.5 million data points. That is, a 4D pressure array expressed as (400, 12, 40, 8) represents over 1.5 million values of pressure. The particular parameters of the array may be changed without departing from the principles of the subject matter described herein. For instance, the array may be divided into fewer parts, which could substantially reduce the number of calculations; but would also reduce the granularity of the results.

Once the theoretical pressure values are determined for each coordinate point in the three-dimensional space (assuming each coordinate point is an origin point of the sound source), the next step of the method includes determining from where the sound source actually originates. The reason the pressure values are referred to as being theoretical is that it the pressure value will only be at the calculated level if the sound source actually originates at the particular coordinate value. The theoretical pressure values are only equivalent to the actual pressure values at the actual location of the sound source. To that end, reference is made to FIG. 34B and step 3408 of the method 3400, which includes computing the location of the actual sound source within the three-dimensional space. Locating the sound source may described with reference to FIGS. 39A-41B.

Figure 39A:
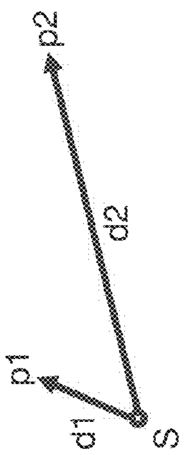
FIG. 39A depicts a schematic of the inverse proportional law of sound pressure.

FIG. 39A shows a sound source S that results in a pressure p1 a distance d1 from S, and a pressure p2 a distance d2 from S. The relationship between the variables is given by the inverse-proportional law which states if sound pressure p1 is measured a distance d1 from a source S, the sound pressure p2 at another position d3 can be calculated as p2=d1*p1/d2. Stated differently, p2*d2=p1*d1. Using the inverse-proportional law, for a noise occurring at a given block or position within a grid, the pressure measured by each microphone must be inversely proportional to the distance from each microphone to the same block or position within the grid.

An inverse measurement correlation theory may be utilized to determine the actual location of the sound source within the 3D coordinate space (x, y, z). To do this, two vectors (a distance vector and a pressure vector) may be computed for each point in the 3D coordinate space. And then a correlation coefficient may be computed between the two vectors. Since pressure and distance are inversely proportional to each other relative to a sound source, the actual or true location of the sound source may be determined by the places within the 3D coordinate space where the two vectors are inversely proportional to each other. A correlation coefficient may be utilized to determine how much the two vectors correlate; or, conversely how much the two vectors are not correlated (i.e., inversely proportional). Since distance and pressure are inversely proportional to each other, the locations within the 3D coordinate space where the vectors show the most negative correlation, indicate a true or actual origin of the sound source.

Figure 39B:
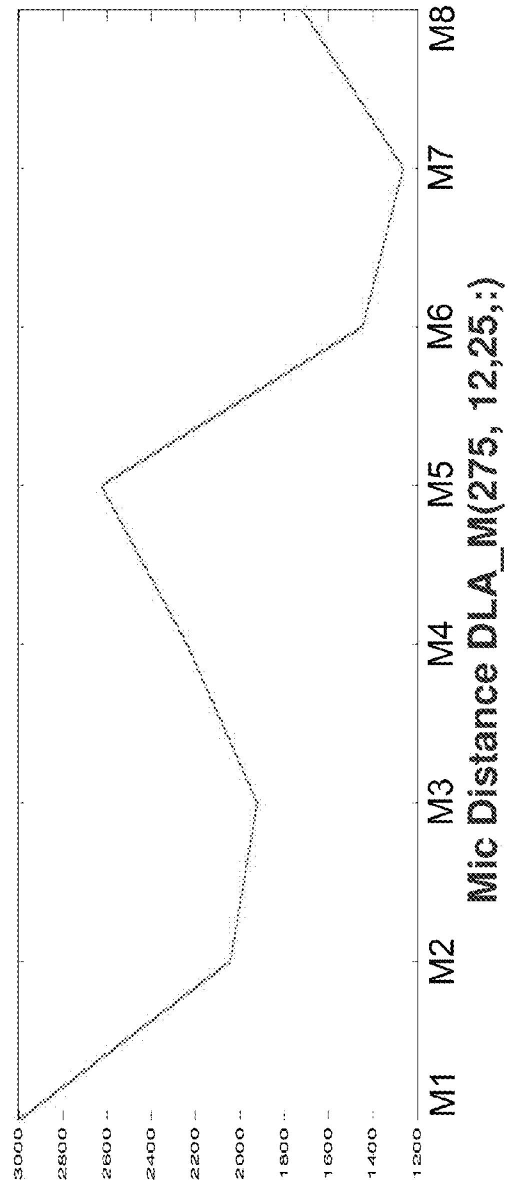
FIG. 39B depicts a graph of a distance vector for point (275, 12, 25) in the three-dimensional coordinate space.

As described, two vectors (distance vector and a pressure vector) may be computed for each coordinate location within the 3D coordinate space (400, 12, 40). The distance vector may be defined or expressed as a distance versus microphone assembly M1-M8. That is, distance is measured from each of the microphone assemblies M1-M8 to the particular point within the coordinate system. The results may be represented mathematically in an array, or in a graph, such as seen in FIG. 39B. FIG. 39B graphically illustrates a distance vector of microphone M1-M8 versus distance. For FIG. 39B, microphone assemblies M1-M8 are listed on the horizontal-axis, and distance in centimeters are listed on the vertical-axis. As an example from the figure, microphone assembly M1 is 3000 cm from point (275, 12, 25) within the 3D coordinate space defined by (400, 12, 40).

Figure 39C:
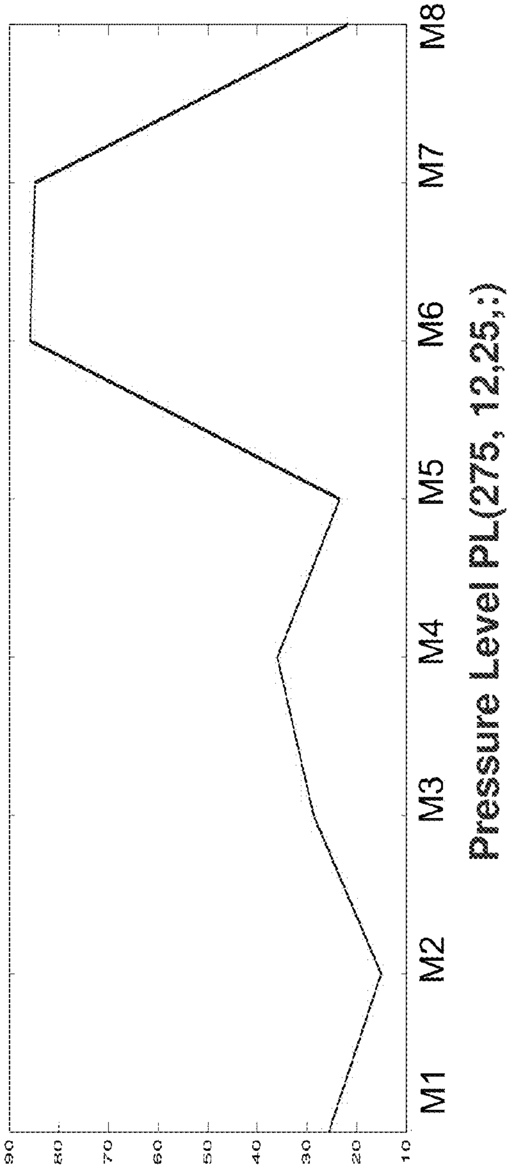
FIG. 39C depicts a graph of a pressure vector for point (275, 12, 25) in the three-dimensional coordinate space.

FIG. 39C graphically illustrates a pressure vector of microphone M1-M8 versus pressure level (Pascals) at each microphone. As seen in the figure, the microphone assemblies M1-M8 are listed on the horizontal-axis and the pressure levels at each microphone assembly are listed on the vertical-axis. As one example, the pressure value for microphone assembly M1 is 25 Pascals. The complete values of distance and pressure for microphone assemblies M2-M8 at the coordinate location of (275, 12, 25) can be seen in the graphs of FIGS. 39B-39C.

For the distance and pressure vectors at (275, 12, 25), shown in FIGS. 39B-39C, a correlation coefficient may be calculated to determine how proportional the vectors are to each other. The correlation coefficient of the vectors in FIGS. 39B and 39C is −0.6809. Since correlation coefficients are represented as a number between −1 and +1, and represents the linear dependence of the two vectors, it can be seen that the vectors in FIGS. 39B and 39C exhibit a negative correlation somewhat close to the least correlated value of −1, and are thus inversely proportional to each other.

Figure 40A:
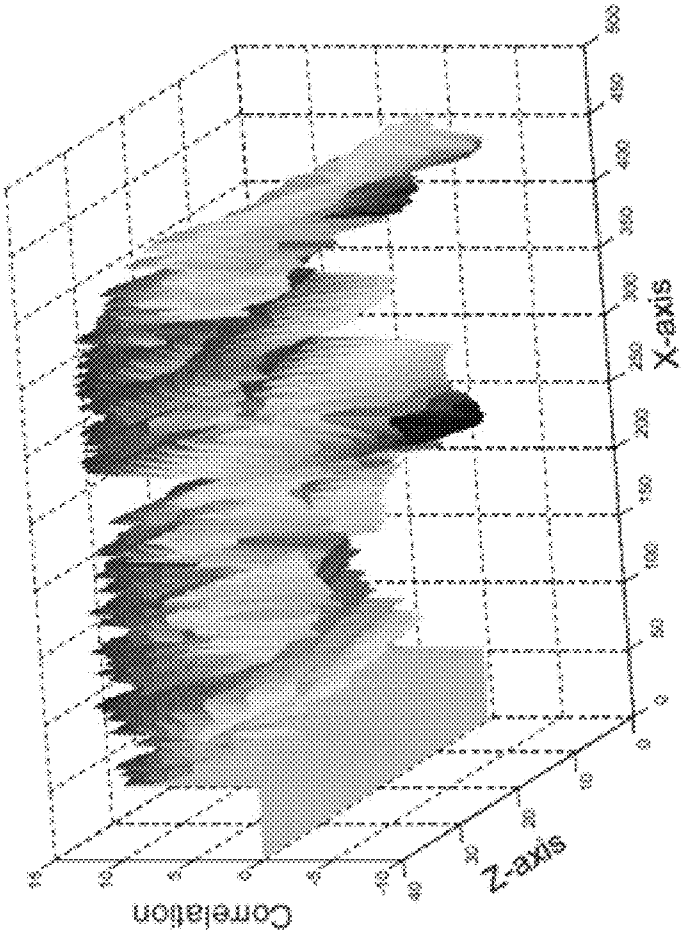
FIG. 40A depicts a three-dimensional graph of summed correlation coefficients in the Y-direction plotted against the X-Z plane of the three-dimensional coordinate system.

The calculation of distance and pressure vectors, and correlation coefficient are computed for each coordinate location in the 3D coordinate space (400, 12, 40). This computation yields a single value for each coordinate location. At this point, the correlation coefficients are summed along the Y-dimension. A three-dimensional graph of the summed correlation, X, and Z is shown in FIG. 40A. As seen in the figure, the correlation axis is listed from −10 to 15, with measured values of summed correlation from about −2 to about 15. The areas of the graph where correlation is the lowest (e.g., light green, blue colors) indicates a potential area of a noise source in the X-Z plane. Since individual correlation coefficients that are negative are more inversely proportional, areas on the X-Z plane where correlation is the least (most negative) indicate areas where the pressure and distance vectors are most inversely proportional. Stated differently, areas on the X-Z plane with the lowest values of correlation are more likely to be true or actual locations of the sound source since these areas exhibit an inverse proportional relationship between distance and pressure.

Figure 40B:
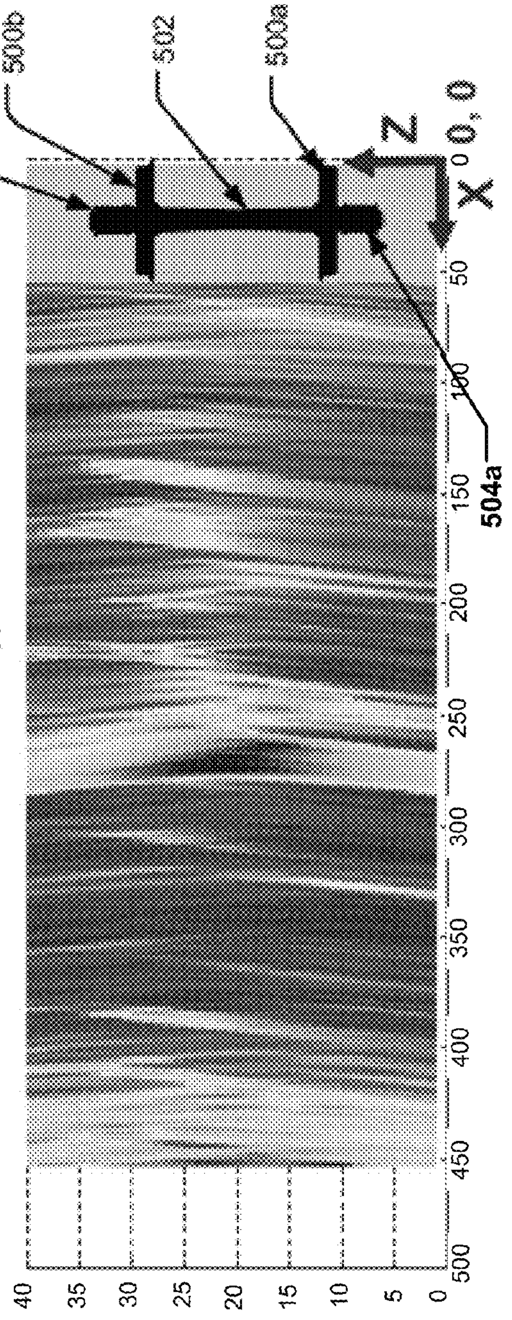
FIG. 40B depicts a two-dimensional graph of the summed correlation coefficients in the Y-direction plotted on the X-Z plane of the three-dimensional coordinate system with the colored values of correlation indicating locations of more or less correlation.

FIG. 40B illustrates the same information as in FIG. 40A, except FIG. 40B is a two-dimensional, X-Z graph showing correlation overlaid in color. FIG. 40B also shows a wheelset including wheels 500, an axle 502, and bearings 504. It is noted that the correlation coefficients are summed in the Y-dimension since it may be more relevant to determining defects associated with a wheelset if it can be determined wherein on the X-Z plane is the true origin of the sound source. Strong negative values (shown in blue) represent areas in which the acoustic signal originates. As seen in FIG. 40B, if a particular location along the Z-axis can be determined to be the origin of a noise, it may narrow down the parts effected by a defect. For example, a noise source originating between 30 cm and 35 cm along the Z-axis is likely to affect the B-side wheel 500*b* and/or bearing 504*b*, and not the A-side wheel 500*a* and bearing 504*a*. In this particular case, the large blue section at about x=240 depicts a loud suspension noise emanating from the middle of the railcar.

From the graphs in FIGS. 40A and 40B, the areas of the X-Z plane with the lowest values of correlation indicate the location(s) of the actual or true noise source. The next steps of the method involve filtering/processing the data and determining the acoustic signature of the noise sources at the locations of the actual or true noise source. And then the method may include determining a defect-type based on the acoustic signature.

Figure 41A:
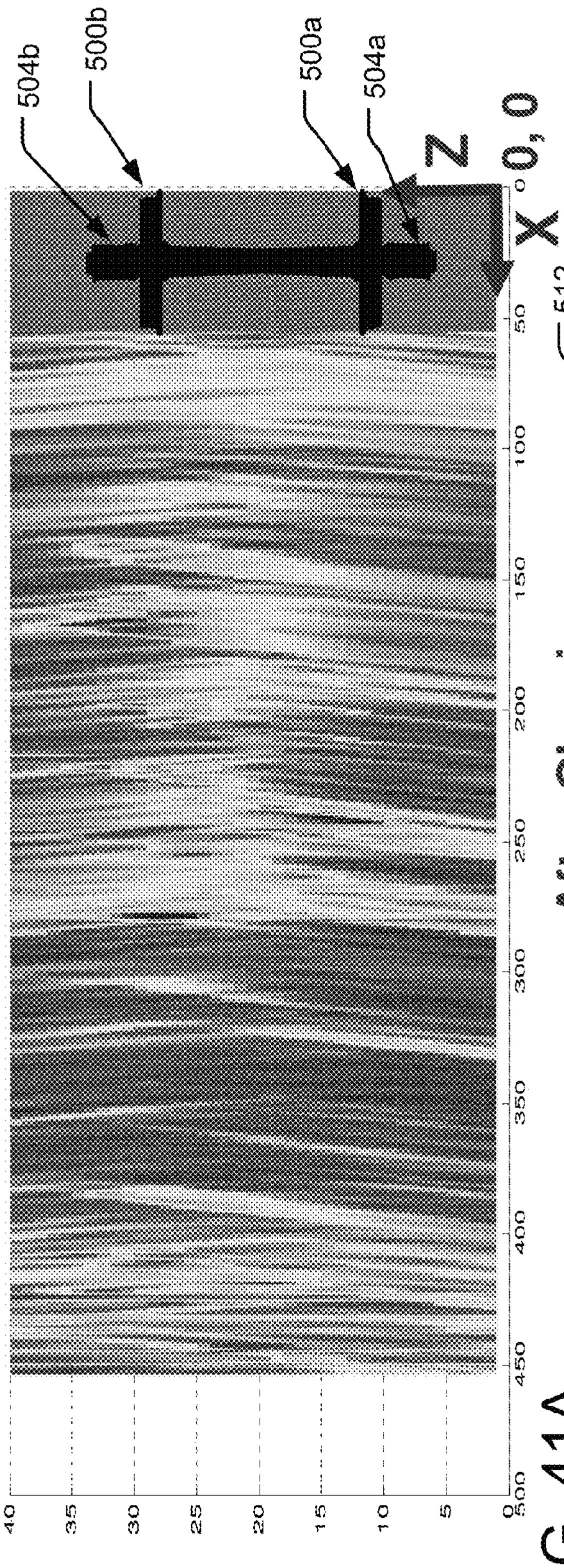
FIG. 41A depicts a two-dimensional graph of the summed correlation coefficients in the Y-direction plotted on the X-Z plane after the noise has been removed.

Referring back to FIG. 34B, the next step 3410 of the method 3400 may include removing the unwanted noise from the data. To remove the unwanted noise, the location of the unwanted signal may be identified and the magnitude may be computed. The magnitude of the noise at each microphone may be computed and removed from the signal. Then, the theoretical pressure levels and correlation matrices may be re-computed. FIG. 41A illustrates the X-Z graph of FIG. 40B, except FIG. 41A shows the data after removing or "cleaning" the noise, and re-computing the theoretical pressure levels and the correlation matrices. It is noted that the wide vertical band of blue and light green coloring between 250 cm and 300 cm on the X-axis of FIG. 40B has been removed by the cleaning process shown in FIG. 41A. This data corresponds to a settling railroad tie or sleeper, and does not pertain to a noise source originating from the wheelset of a train. This type of data that is constant throughout many or all wheelsets traveling through the zone of observation can be determined to be unique to the zone of observation, such as the rails and ties. Thus, this type of data can be removed from the dataset since it is not unique to the wheelset.

Figure 41B:
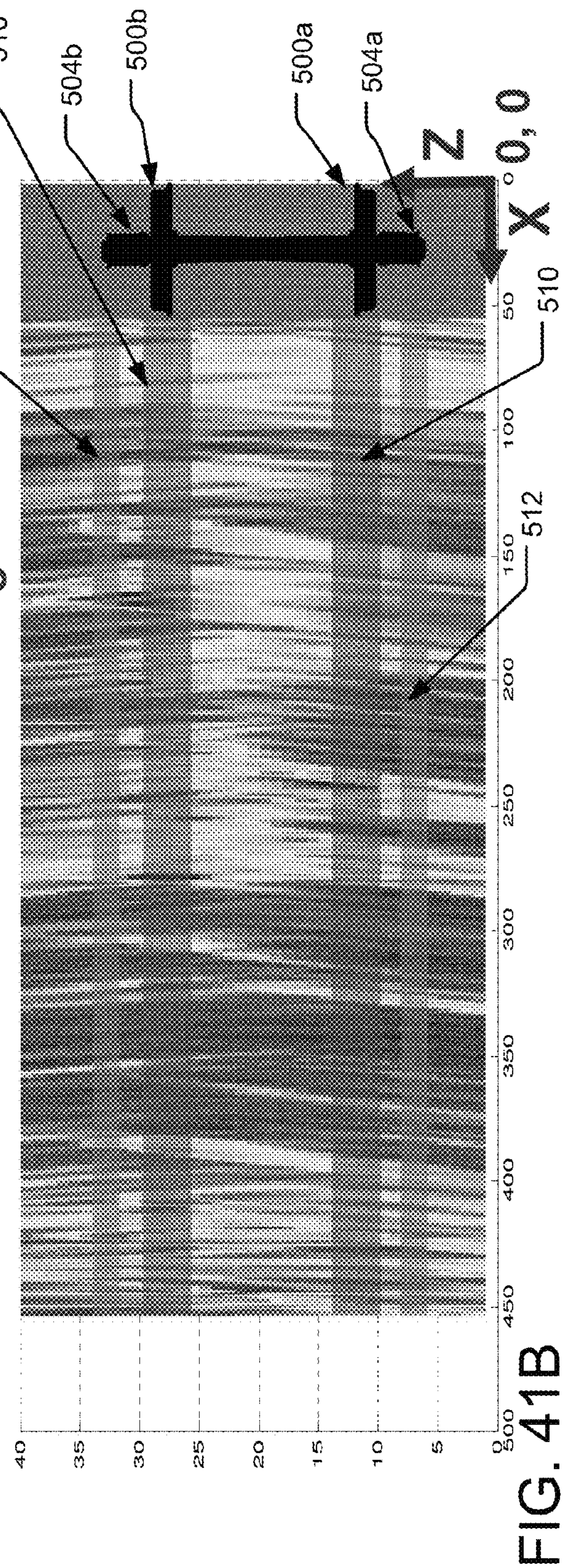
FIG. 41B depicts a two-dimensional graph of the summed correlation coefficients in the Y-direction plotted on the X-Z plane, and with wheel and bearing vectors identified for extraction.

Referring back to FIG. 34B, step 3412 of the method 3400 may include extracting the component acoustic signatures from the wheels and bearings. Using the "cleaned" data of FIG. 41A, vectors may be extracted from bearing and wheel locations as noise emanating from locations other than the wheels and bearings may not be of use to determining defects at the wheels and bearings. FIG. 41B shows the same X-Z graph of FIG. 41A, except wheel vectors 510 and bearing vectors 512 are identified. The data fitting within wheel and bearing vectors 510, 512 may be extracted from the data. As an example, for A-side bearings, microphone assemblies M1 and M5 may be utilized, and for B-side bearings, microphone assemblies M4 and M8 may be utilized. For A-side wheel defects, microphone assemblies M2 and M6 may be utilized, and for B-side wheel defects, microphone assemblies M3 and M7 may be utilized. The microphone signals may be summed, and a high pass filter for each vector of interest may be applied.

Referring to FIG. 41B, the wheel and bearing vectors 510, 512 may be extracted as follows. The location of the wheels 500*a*, 500*b* and bearings 504*a*, 504*b* along the Z-axis are known since they are in a fixed position relative to the rails. Therefore, the coordinate locations for the positions of the wheels 500*a*, 500*b* and bearings 504*a*, 504*b* may be identified as being in discreet locations along the Z-axis and along the full length of the X-axis. Thus, all correlation coefficients and all theoretical pressure levels outside the wheel and bearing vectors 510, 512 may be removed since only the data within the vectors 510, 512 is of interest.

Figure 42A:
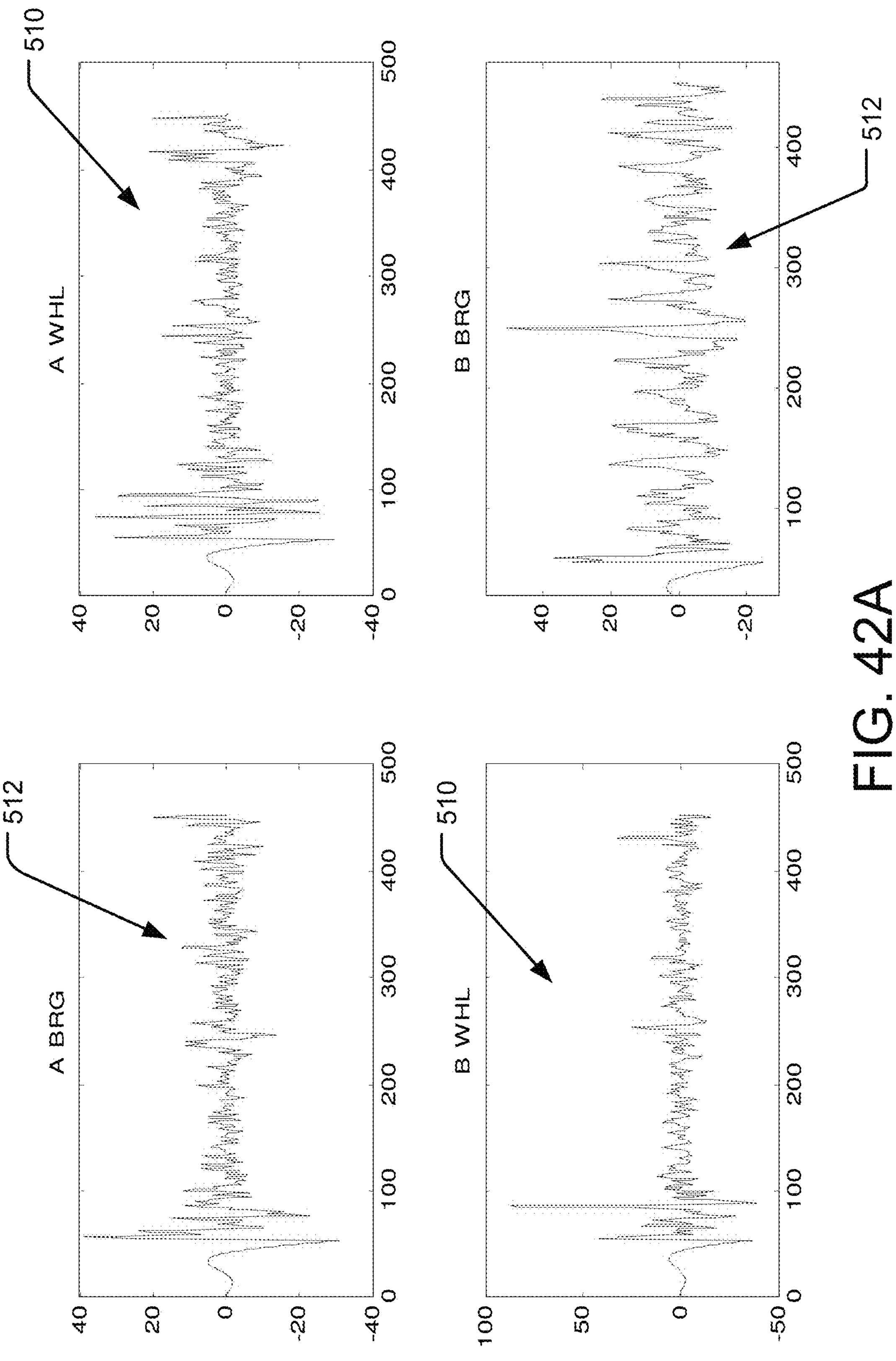
FIG. 42A depicts acoustic signatures of the A-side wheel and bearings, and the B-side wheel and bearings for a particular defect.
Figure 42B:
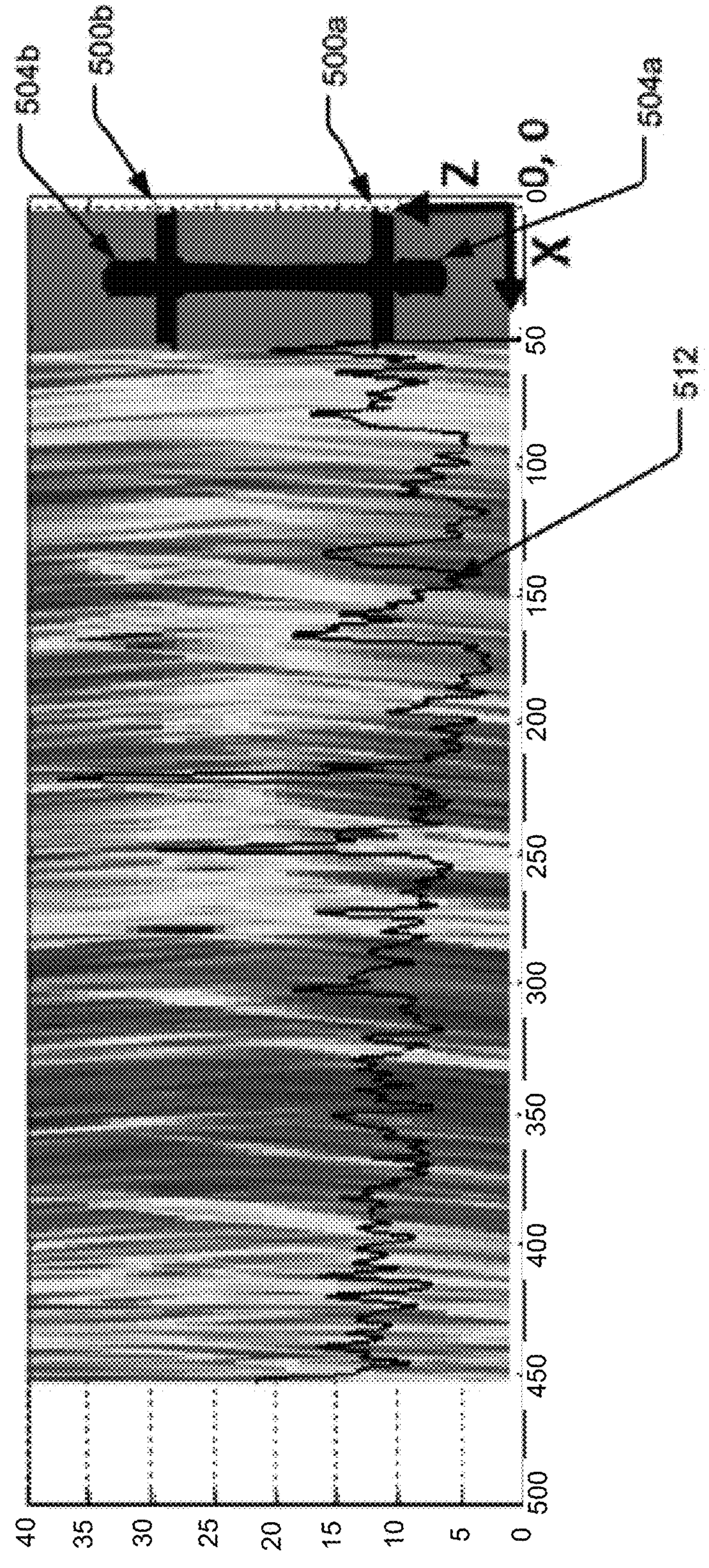
FIG. 42B depicts a waveform of the B-bearing superimposed over the two-dimensional graph of the summed correlation coefficients in the Y-direction plotted on the X-Z plane after the noise has been removed, the peaks of the waveform indicating likely origins of the noise source.

The acoustic signatures of the wheel and bearing vectors 510, 512 for the A and B wheels, after processing, can be seen in FIG. 42A. The graphs depict signal magnitude on the vertical-axis and distance in centimeters within the 3D coordinate space (which corresponds to the distance within the zone of observance) on the horizontal-axis. Referring back to FIG. 34B, step 3414 of the method 3400 may include determining the defect type based on the component acoustic signatures. From the data of FIG. 42A, accurate determinations of defects of the wheel and/or bearing can be made. As seen in FIG. 42A, the "B" bearing 504*b* associated with the bearing vector 512 shows elevated amplitudes around the 250 cm mark, indicating a possible bearing defect. Referring back to FIG. 41B, at the 250 cm mark on the X-axis, and within the bearing vector 512 for the B-side, there is a location showing low levels of correlation (i.e., high inverse proportional relationship) indicating an origin point of a noise source. FIG. 42B depicts the bearing vector or waveform 512 for the B-side superimposed onto the cleaned data of the X-Z graph of the correlation data shown in FIG. 41A. As seen in the figure, the peaks in the waveform 512 corresponds to negative correlation values shown in deep blue color, which gives an indication of where the signal originated.

Figure 43A:
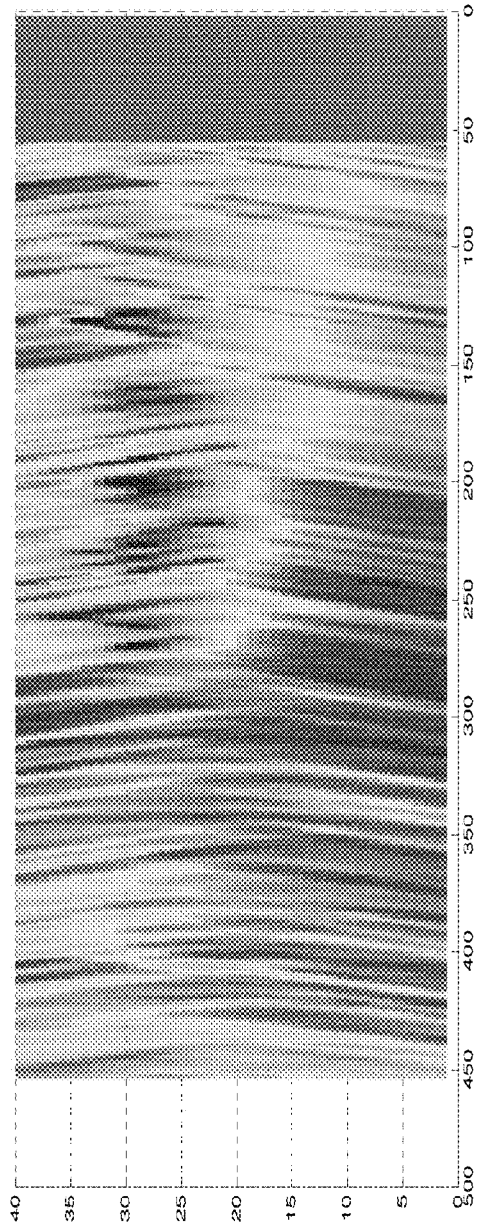
FIG. 43A depicts an acoustic location matrix for a large area spall defect.
Figure 43B:
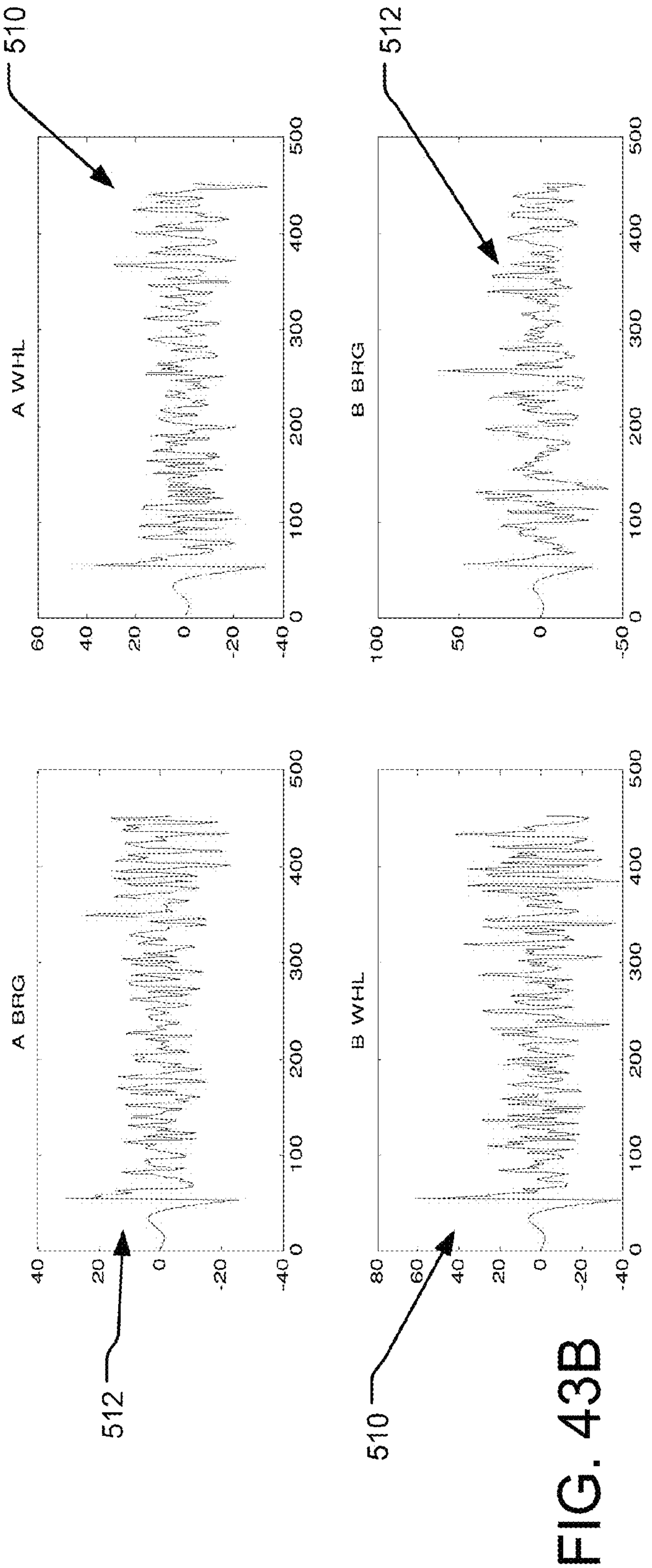
FIG. 43B depicts acoustic signatures of the A-side wheel and bearings, and the B-side wheel and bearings for a large area spall defect.

The subsequent figures depict different defect modes and their associated location information matrix, and isolated acoustic pattern. FIG. 43A depicts an acoustic location matrix for a large area spall defect (i.e., wheel spall defect), with correlation plotted in color on an X-Z plane. As can be seen in the graph, the blue and light green colors indicate high negative correlation which indicates a possible location of a defect. Wheel and bearing vectors 510, 512 can then be applied to the data, and the corresponding isolated acoustic pattern of the wheel and bearing vectors 510, 512 can be determined. The isolated acoustic patterns of the wheel and bearing vectors 510, 512 indicating a large area spall defect can be seen in FIG. 43B.

Figure 44A:
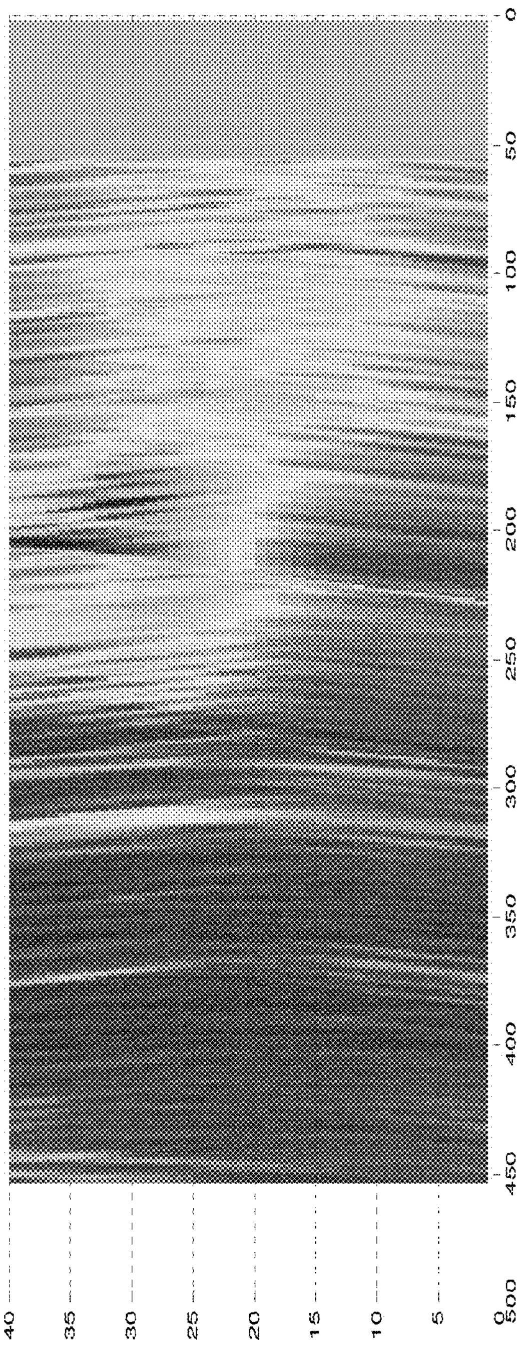
FIG. 44A depicts an acoustic location matrix for a cone defect.

FIG. 44A depicts an acoustic location matrix for a cone defect (i.e., a type of bearing defect), with correlation plotted in color on an X-Z plane. As can be seen in the graph, the blue and light green colors indicate high negative correlation which indicates a possible location of a defect. Wheel and bearing vectors 510, 512 can then be applied to the data, and the corresponding isolated acoustic pattern of the wheel and bearing vectors 510, 512 can be determined. The isolated acoustic patterns of the wheel and bearing vectors 510, 512 indicating a bearing defect at the cone can be seen in FIG. 43B.

Figure 44B:
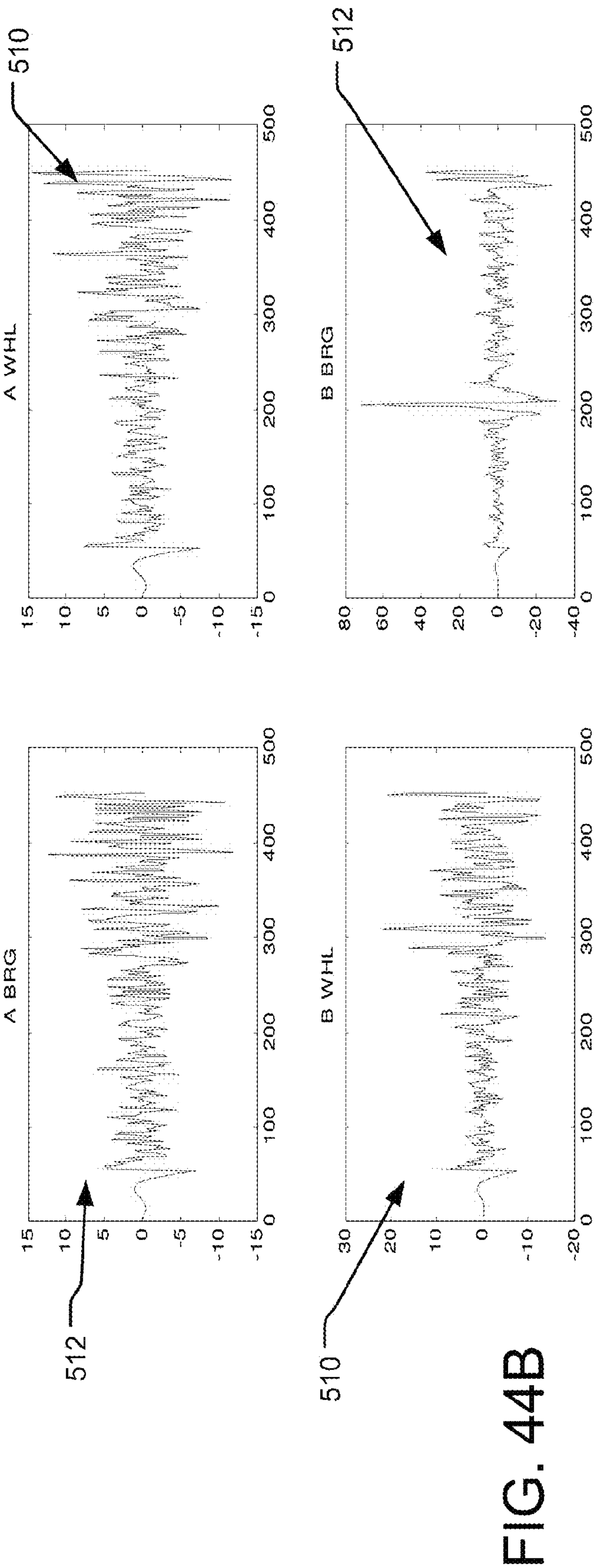
FIG. 44B depicts acoustic signatures of the A-side wheel and bearings, and the B-side wheel and bearings for a cone defect.
Figure 45:
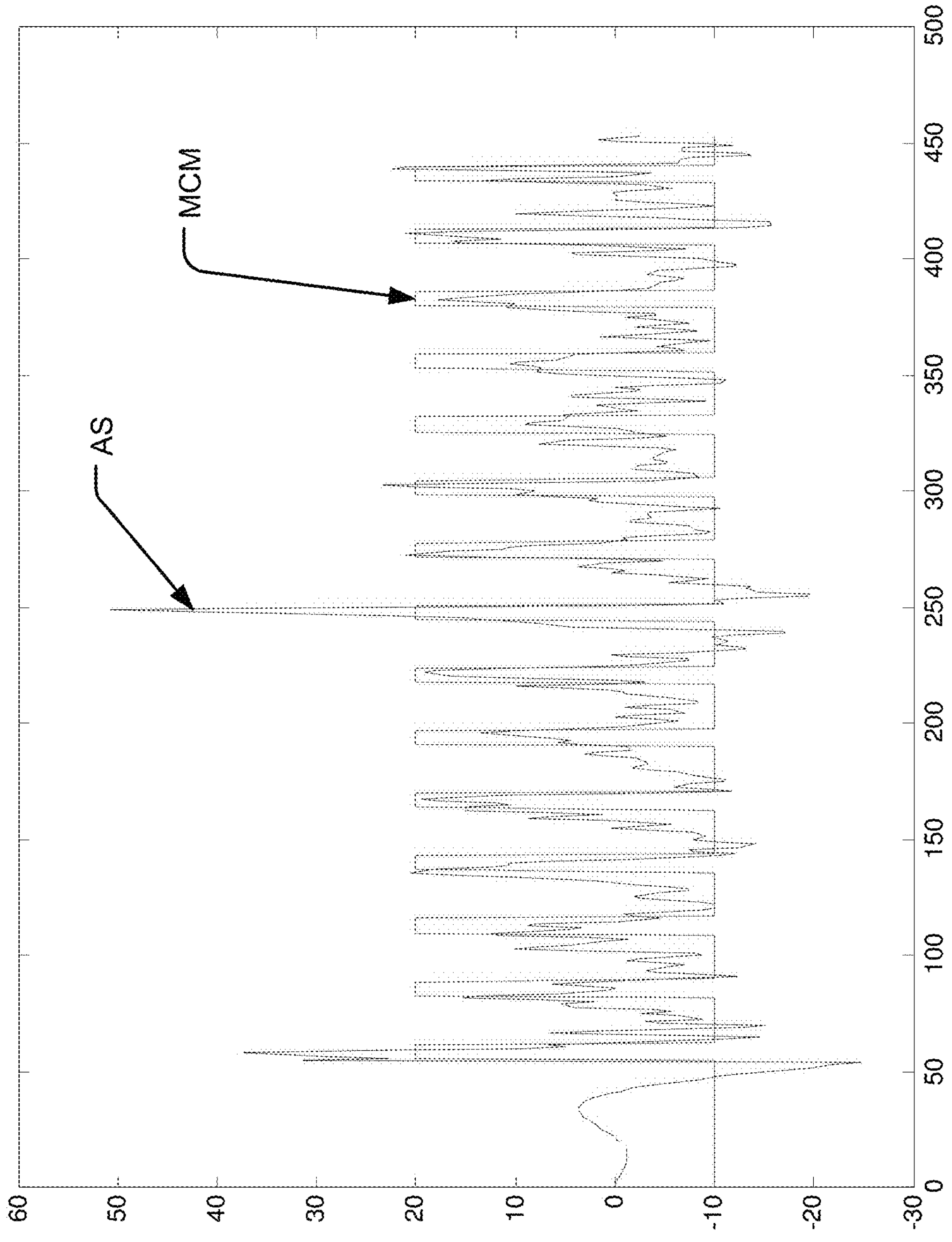
FIG. 45 depicts an acoustic signature of an actual outer race defect from a passing train overlaid with a mathematical cup model of an outer race defect.

Determination of the defect type based on the acoustic signatures may be done manually or automatically by pattern recognition software, as an example. The acoustic signatures seen in FIGS. 42A, 43B, and 44B may be typical of their respective defects. That is, other train wheelsets having bearing, large area spall, and cone defects, respectively, may exhibit similar acoustic signatures. Therefore, characteristics of the acoustic signatures may be identified and compared with a database of exemplary wheel and bearing (among other parts) defects. The system may use pattern recognition software to compare the acoustic signatures to known defects within the database and determined a defect type. As one example, reference is made to FIG. 45, which depicts an acoustic signature of an outer race defect in a graph with signal magnitude on the vertical axis, and distance along the X-axis of the zone of observance on the horizontal axis. The acoustic signature AS of the defect is seen in blue, and a mathematical cup model MCM with an outer race defect is shown in red. The cup model may be defined by the following equation:

$$\frac{F \text{ Wheel } Circum.}{F \text{ Cup Ball Pass } Freq} = dist \text{ between impacts,}$$

$$\text{and } \frac{279 \text{ cm}}{10.31} = 27 \text{ cm between impacts.}$$

The correlation between the cup model (red) and the data (blue) is about 0.6. As seen in the figure, the wave length and amplitude of the cup model mirrors the actual data indicating a correlation as well. In this example, the system may apply one or more algorithms to the acoustic signatures and determine a correlation between them. For example, algorithms associated with various types of bearing, wheel, and axle defects may be mathematically applied to the acoustic signatures, and correlation coefficients may be determined for each. Correlation coefficients above a certain threshold (e.g., 0.5) may indicate a possible defect. This may be verified by an experienced user who can listen or otherwise observe the acoustic signature, and verify the defect determined by the system.

IV. Exemplary Computing System of the Acoustic Monitoring System

Figure 32:
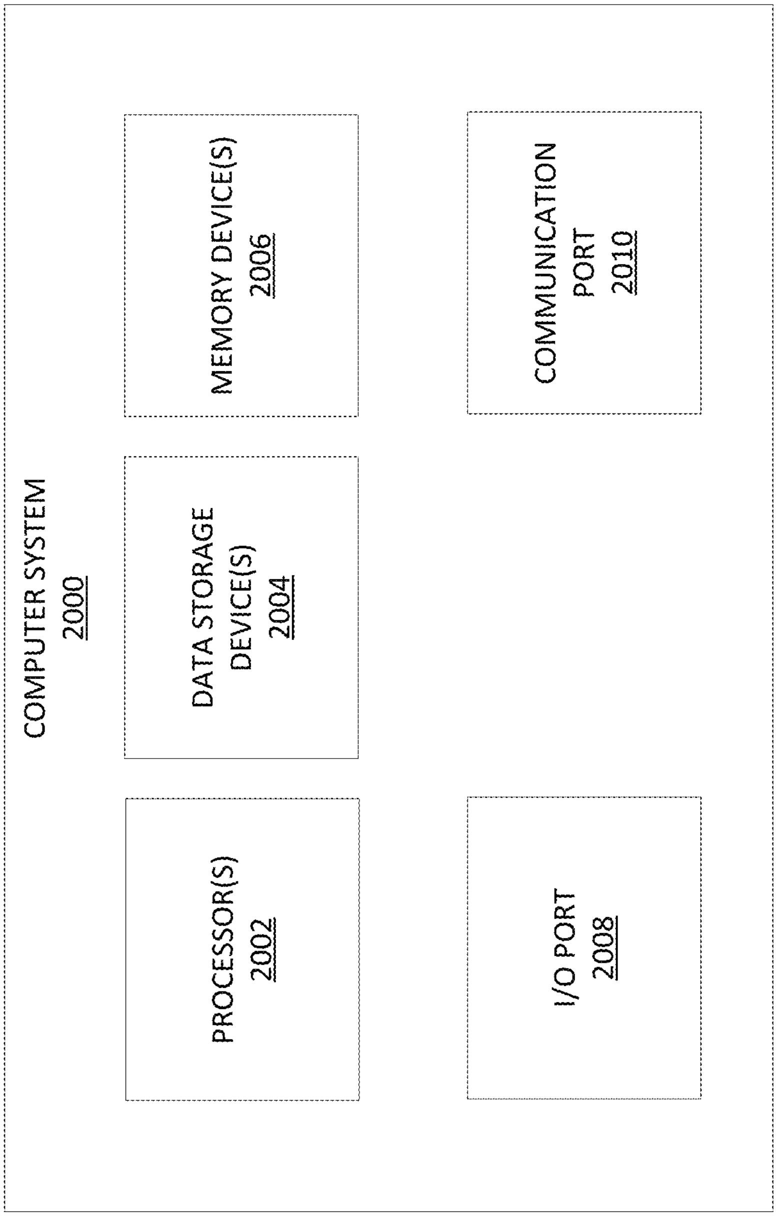
FIG. 32 is an example computing system having one or more computing units that may implement various systems and methods discussed herein is provided.

An example computing system of the acoustic monitoring system 100 capable of performing the method steps and calculations described herein is seen in FIG. 32. Referring to FIG. 32, a detailed description of an example computing system 2000 having one or more computing units that may implement various systems and methods discussed herein is provided. The computing system 2000 may be applicable to any of the computers, CPUs, or systems utilized in the field node system either trackside or in the MDS cabinet, and other computing or network devices. It will be appreciated that specific implementations of these devices may be of differing possible specific computing architectures not all of which are specifically discussed herein but will be understood by those of ordinary skill in the art.

The computer system 2000 may be a computing system that is capable of executing a computer program product to execute a computer process. Data and program files may be input to the computer system 2000, which reads the files and executes the programs therein. Some of the elements of the computer system 2000 are shown in FIG. 32, including one or more hardware processors 2002, one or more data storage devices 2004, one or more memory devices 2008, and/or one or more ports 2008-2010. Additionally, other elements that will be recognized by those skilled in the art may be included in the computing system 2000 but are not explicitly depicted in FIG. 32 or discussed further herein. Various elements of the computer system 2000 may communicate with one another by way of one or more communication buses, point-to-point communication paths, or other communication means not explicitly depicted in FIG. 32.

The processor 2002 may include, for example, a central processing unit (CPU), a microprocessor, a microcontroller, a digital signal processor (DSP), and/or one or more internal levels of cache. There may be one or more processors 2002, such that the processor 2002 comprises a single central-processing unit, or a plurality of processing units capable of executing instructions and performing operations in parallel with each other, commonly referred to as a parallel processing environment.

The computer system 2000 may be a conventional computer, a distributed computer, or any other type of computer, such as one or more external computers made available via a cloud computing architecture. The presently described technology is optionally implemented in software stored on the data stored device(s) 2004, stored on the memory device(s) 2006, and/or communicated via one or more of the ports 2008-2010, thereby transforming the computer system 2000 in FIG. 32 to a special purpose machine for implementing the operations described herein. Examples of the computer system 2000 include personal computers, terminals, workstations, mobile phones, tablets, laptops, personal computers, multimedia consoles, gaming consoles, set top boxes, and the like.

The one or more data storage devices 2004 may include any non-volatile data storage device capable of storing data generated or employed within the computing system 2000, such as computer executable instructions for performing a computer process, which may include instructions of both application programs and an operating system (OS) that manages the various components of the computing system 2000. The data storage devices 2004 may include, without limitation, magnetic disk drives, optical disk drives, solid state drives (SSDs), flash drives, and the like. The data storage devices 2004 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 2006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 2004 and/or the memory devices 2006, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 2000 includes one or more ports, such as an input/output (I/O) port 2008 and a communication port 2010, for communicating with other computing, network, navigation, or robotic devices. It will be appreciated that the ports 2008-2010 may be combined or separate and that more or fewer ports may be included in the computer system 2000.

The I/O port 2008 may be connected to an I/O device, or other device, by which information is input to or output from the computing system 2000. Such I/O devices may include, without limitation, one or more input devices, or output devices, such as, for example, the microphone assemblies described herein.

In one implementation, the input devices convert a machine-generated signal (e.g., train traveling over rails), human-generated signal, such as, human voice, physical movement, physical touch or pressure, and/or the like, into electrical signals as input data into the computing system 2000 via the I/O port 2008. Similarly, the output devices may convert electrical signals received from computing system 2000 via the I/O port 2008 into signals that may be sensed as output by a human, such as sound, light, and/or touch. The input device may be an alphanumeric input device, including alphanumeric and other keys for communicating information and/or command selections to the processor 2002 via the I/O port 2008. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"), and/or Hot Box sensing units, wheel impact load detectors, and automatic equipment identification systems. The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 2010 is connected to a network by way of which the computer system 2000 may receive network data useful in executing the methods and systems set out herein as well as transmitting information and network configuration changes determined thereby. Stated differently, the communication port 2010 connects the computer system 2000 to one or more communication interface devices configured to transmit and/or receive information between the computing system 2000 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 2010 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 2010 may communicate with an antenna or other link for electromagnetic signal transmission and/or reception. As such, communications regarding wheel and bearing defects, among others, can be transmitted through various communication means to a train operator or engineer.

In an example implementation, signal data corresponding to the noise source of the defect as received by each of the microphone assemblies, computation algorithms for determining location and intensity of the noise source, and comparison algorithms for determining the defect-type associated with the noise source, and other software and other modules and services may be embodied by instructions stored on the data storage devices 2004 and/or the memory devices 2006 and executed by the processor 2002. The computer system 2000 may be integrated with or otherwise form part of the acoustic monitoring system 100. The acoustic monitoring system may include a computer-implemented method for identifying defects of a train, where the train travels on first and second rails of a track. In certain instances, the method may include the steps of: receiving a plurality of signals from a plurality of microphone assemblies at a data acquisition module of a field sensor system when the train passes the plurality of microphones. The plurality of microphones may be in communication with the data acquisition module. The plurality of microphone assemblies may be positioned proximate the first and second rails of the track. The plurality of microphone assemblies may include a first, second, third, and fourth microphone assemblies. The first microphone assembly may be positioned on an outward of the first rail, the second microphone assembly may be positioned outward of the second rail, and the third and fourth microphone assemblies may be positioned inward of the first and second rails. The plurality of signals may include a first signal received by the first microphone assembly, a second signal received by the second microphone assembly, a third signal received by the third microphone assembly, and a fourth signal receive by the fourth microphone assembly. The first, second, third, and fourth microphone assemblies may be generally positioned in a first plane extending vertically and transverse to the first and second rails. The plurality of signals may emanate from a noise source of a defect associated with the train as the train passes the plurality of microphone assemblies. The method steps may also include identifying a location of the noise source within the first plane, identifying an intensity of the noise source at the location within the first plane, and determining a defect-type based on the location and the intensity of the noise source.

The aforementioned steps of the computer-implemented method may also be steps of a computer process on a computing system. For example, one or more tangible computer-readable storage media storing computer-executable instructions for performing a computer process on a computing system may include the aforementioned steps for identifying and locating defects in a passing train.

As another example, a computer-implemented method performed by the computer processor described herein may include the following steps: receiving data from the passing train within a zone of observance using an array of microphone assemblies of an acoustic monitoring system that are positioned around a section of the track. The array of microphone assemblies may be in communication with at least one data acquisition module of the acoustic monitoring system. The method may further include processing the data to determine pressure levels received by each of the array of microphone assemblies. The method may further include calculating a theoretical pressure level for a plurality of points within a three-dimensional space for each microphone of the array of microphone assemblies. The three-dimensional coordinate space may be defined at least partially by the zone of observance. The array of microphone assemblies may be defined in the three-dimensional coordinate space. For each of the plurality of points the theoretical pressure levels may be calculated assuming its position within the three-dimensional coordinate space is an origin point of the pressure levels received by each of the array of microphone assemblies. The method may further include determining one or more locations within the three-dimensional coordinate space that represents an origin of a noise source indicating the defect. The method may further include isolating acoustic signatures of the noise source in the one or more locations. And the method may further include determining a type of defect based on the acoustic signatures.

As yet another example, a computer-implemented method performed by the computer processor described herein may include the following steps: receiving data from the passing train within a zone of observance using a plurality of microphone assemblies of an acoustic monitoring system that are positioned around a section of the track. The plurality of microphone assemblies may be in communication with at least one data acquisition module of the acoustic monitoring system. The method may further include processing the data to determine pressure levels received by each of the plurality of microphone assemblies. The method may further include computing a four-dimensional pressure array by computing a theoretical pressure level for each of the plurality of microphone assemblies at a plurality of points within a three-dimensional coordinate space. The plurality of microphone assemblies may have defined locations within the three-dimensional coordinate space and relative to the plurality of points. The method may further include determining one or more locations within the three-dimensional coordinate space that represents an origin of a noise source indicating the defect. The method may further include isolating acoustic signatures of the noise source in the one or more locations. And the method may further include determining a type of defect based on the acoustic signatures.

The system set forth in FIG. 32 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed herein, among others, may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure including any of the methods described herein may be provided as a computer program product, software, or computerized method that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Although various representative embodiments have been described above with a certain degree of particularity, those skilled in the art could make numerous alterations to the disclosed embodiments without departing from the spirit or scope of the inventive subject matter set forth in the specification. All directional references (e.g., top, bottom, front, back) are only used for identification purposes to aid the reader's understanding of the embodiments of the present disclosure, and do not create limitations, particularly as to the position, orientation, or use of the embodiments unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In methodologies directly or indirectly set forth herein, various steps and operations are described in one possible order of operation, but those skilled in the art will recognize that steps and operations may be rearranged, replaced, or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

What is claimed is:

1. A computer-implemented method for identifying defects of a train via acoustic monitoring, the train traveling on first and second rails of a track, the method comprising the steps of:

receiving a plurality of signals from a plurality of microphone assemblies at a data acquisition module of a field sensor system when the train passes the plurality of microphones, the plurality of microphones in communication with the data acquisition module, the plurality of microphone assemblies positioned proximate the first and second rails of the track, the plurality of microphone assemblies comprising a first, second, third, and fourth microphone assemblies, the first microphone assembly positioned on outward of the first rail, the second microphone assembly positioned outward of the second rail, and the third and fourth microphone assemblies positioned inward of the first and second rails, the plurality of signals comprising a first signal received by the first microphone assembly, a second signal received by the second microphone assembly, a third signal received by the third microphone assembly, and a fourth signal receive by the fourth microphone assembly, the first, second, third, and fourth microphone assemblies generally positioned in a first plane extending vertically and transverse to the first and second rails, the plurality of signals emanating from a noise source of a defect associated with the train as the train passes the plurality of microphone assemblies;

identifying a location of the noise source within the first plane;

identifying an intensity of the noise source at the location within the first plane; and determining a defect-type based on the location and the intensity of the noise source.

2. The computer-implemented method of claim 1, wherein the first and second microphone assemblies are positioned at a first height relative to the first and second rails, respectively, and the third and fourth microphones are positioned at a second height relative to the first and second rails, respectively, the first height being greater than the second height.

3. The computer-implemented method of claim 1, wherein the defect-type is at least one of a flat wheel, a bearing defect, and an axle defect.

4. The computer-implemented method of claim 1, further comprising identifying a particular axle of the train associated with the defect.

5. The computer-implemented method of claim 1, further comprising identifying a particular wheel of the train associated with the defect.

6. The computer-implemented method of claim 1, further comprising identifying a particular bearing of the train associated with the defect.

7. The computer-implemented method of claim 1, further comprising identifying a waveform of the noise source.

8. The computer-implemented method of claim 7, wherein determining the defect-type comprises comparing the waveform to a database of waveforms having known defects.

9. The computer-implemented method of claim 1, further comprising identifying at least one of an amplitude and impact patterns of the noise source.

10. The computer-implemented method of claim 1, wherein the plurality of microphone assemblies comprising a fifth, sixth, seventh, and eighth microphone assemblies, the fifth microphone assembly positioned on an outward of the first rail, the sixth microphone assembly positioned outward of the second rail, and the seventh and eighth microphone assemblies positioned inward of the first and second rails, the plurality of signals comprising a fifth signal received by the fifth microphone assembly, a sixth signal received by the sixth microphone assembly, a seventh signal received by the seventh microphone assembly, and an eighth signal receive by the eighth microphone assembly, the fifth, sixth, seventh, and eighth microphone assemblies generally positioned in a second plane extending vertically and transverse to the first and second rails, the first and second planes being generally parallel to each other and spaced apart from each other a length.

11. The computer-implemented method of claim 10, where the length is about two meters.

12. One or more non-transitory and tangible computer-readable storage media storing computer-executable instructions for performing a computer process for identifying defects of a train via acoustic monitoring, the train traveling on first and second rails of a track, the computer process comprising:

receiving a plurality of signals from a plurality of microphone assemblies at a data acquisition module of a field sensor system when a train passes the plurality of microphones, the plurality of microphones in communication with the data acquisition module, the plurality of microphone assemblies positioned proximate the first and second rails of the track, the plurality of microphone assemblies comprising a first, second, third, and fourth microphone assemblies, the first microphone assembly positioned on outward of the first rail, the second microphone assembly positioned outward of the second rail, and the third and fourth microphone assemblies positioned inward of the first and second rails, the plurality of signals comprising a first signal received by the first microphone assembly, a second signal received by the second microphone assembly, a third signal received by the third microphone assembly, and a fourth signal receive by the fourth microphone assembly, the first, second, third, and fourth microphone assemblies generally positioned in a first plane extending vertically and transverse to the first and second rails, the plurality of signals emanating from a noise source of a defect associated with the train as the train passes the plurality of microphone assemblies;

identifying a location of the noise source within the first plane;

identifying an intensity of the noise source at the location within the first plane; and determining a defect-type based on the location and the intensity of the noise source.

13. The one or more tangible computer-readable storage media of claim 12, wherein the first and second microphone assemblies are positioned at a first height relative to the first and second rails, respectively, and the third and fourth microphones are positioned at a second height relative to the first and second rails, respectively, the first height being greater than the second height.

14. The one or more tangible computer-readable storage media of claim 12, wherein the defect-type is at least one of a flat wheel, a bearing defect, and an axle defect.

15. The one or more tangible computer-readable storage media of claim 12, further comprising identifying a particular axle of the train associated with the defect.

16. The one or more tangible computer-readable storage media of claim 12, further comprising identifying a particular wheel of the train associated with the defect.

17. The one or more tangible computer-readable storage media of claim 12, further comprising identifying a particular bearing of the train associated with the defect.

18. The one or more tangible computer-readable storage media of claim 12, further comprising identifying a waveform of the noise source.

19. The one or more tangible computer-readable storage media of claim 18, wherein determining the defect-type comprises comparing the waveform to a database of waveforms having known defects.

20. The one or more tangible computer-readable storage media of claim 12, further comprising identifying at least one of an amplitude and a wavelength of the noise source.

21. The one or more tangible computer-readable storage media of claim 12, wherein the plurality of microphone assemblies comprises a fifth, sixth, seventh, and eighth microphone assemblies, the fifth microphone assembly positioned on an outward of the first rail, the sixth microphone assembly positioned outward of the second rail, and the seventh and eighth microphone assemblies positioned inward of the first and second rails, the plurality of signals comprising a fifth signal received by the fifth microphone assembly, a sixth signal received by the sixth microphone assembly, a seventh signal received by the seventh microphone assembly, and an eighth signal receive by the eighth microphone assembly, the fifth, sixth, seventh, and eighth microphone assemblies generally positioned in a second plane extending vertically and transverse to the first and second rails, the first and second planes being generally parallel to each other and spaced apart from each other a length.

22. The one or more tangible computer-readable storage media of claim 21, wherein the length is about two meters.

* * * * *